Dec. 5, 1939.    L. L. RUSTAD ET AL    2,182,355
APPARATUS FOR POSTING ELECTRICALLY TRANSMITTED INFORMATION
Original Filed May 4, 1931    20 Sheets-Sheet 1

Inventors
Louis L. Rustad.
Victor E. Extrom
By Reif & Braddock
Attorneys

Dec. 5, 1939.   L. L. RUSTAD ET AL   2,182,355
APPARATUS FOR POSTING ELECTRICALLY TRANSMITTED INFORMATION
Original Filed May 4, 1931   20 Sheets-Sheet 3

Inventors.
Louis L. Rustad.
Victor E. Extrom.
By Reif & Braddock
Attorneys.

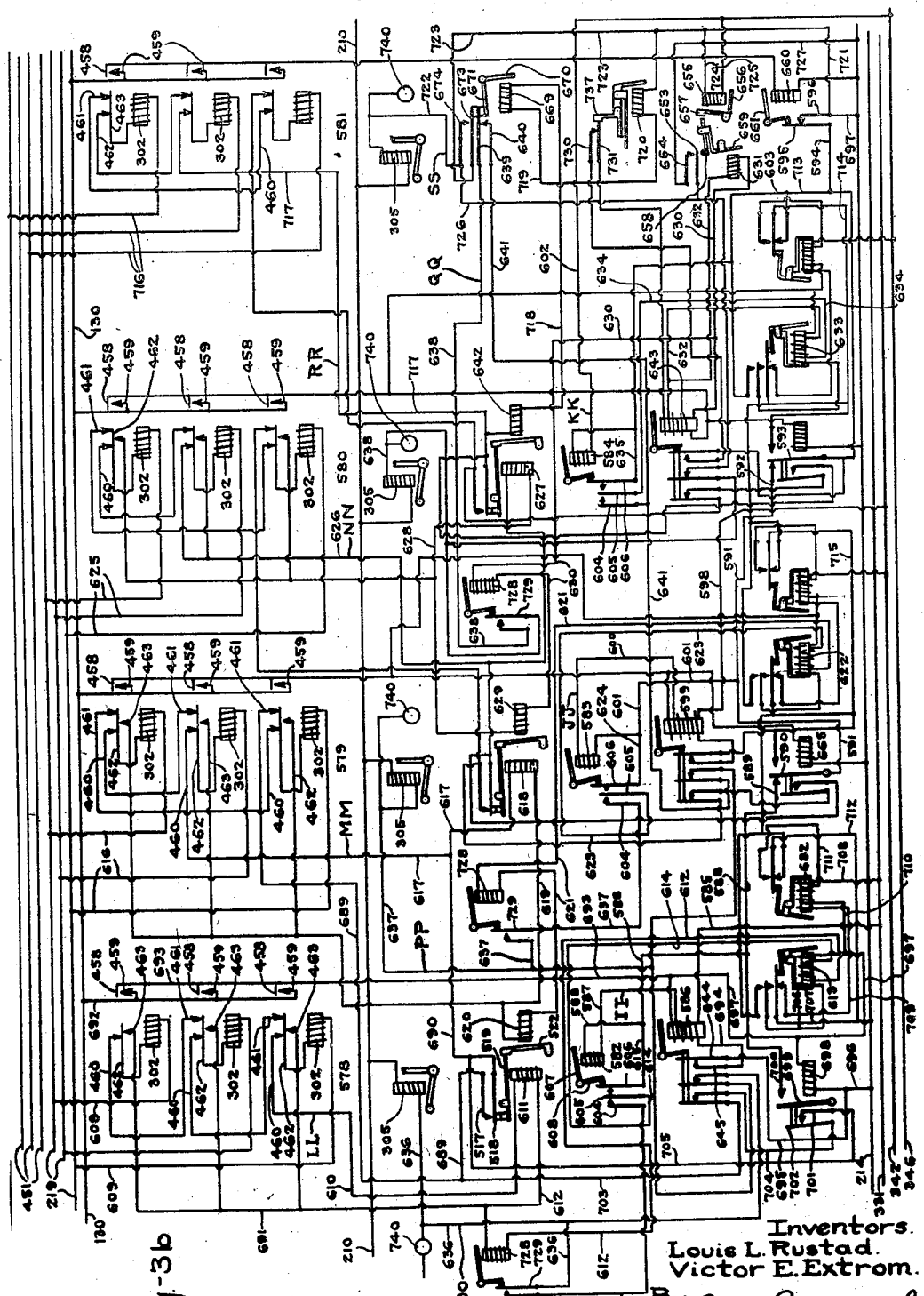

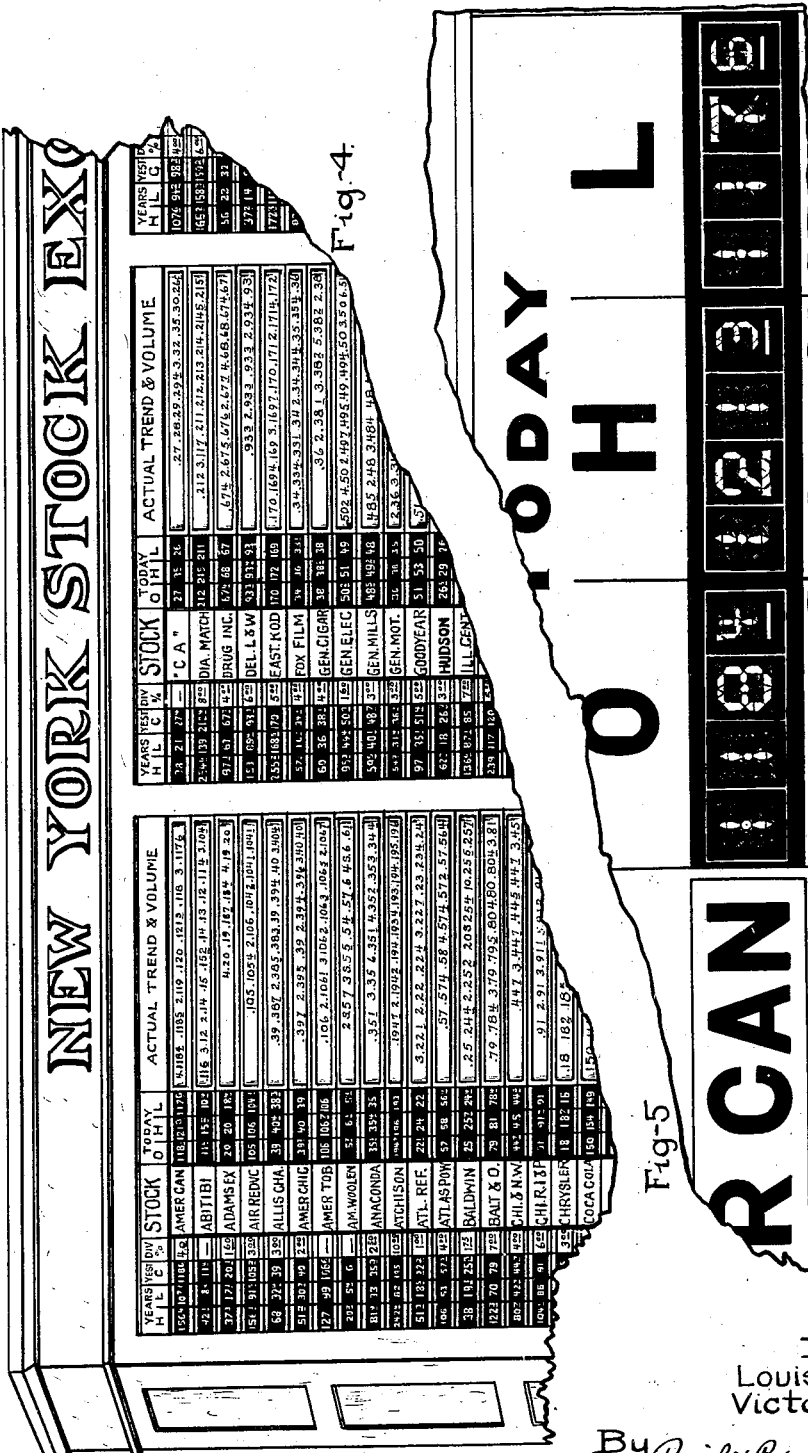

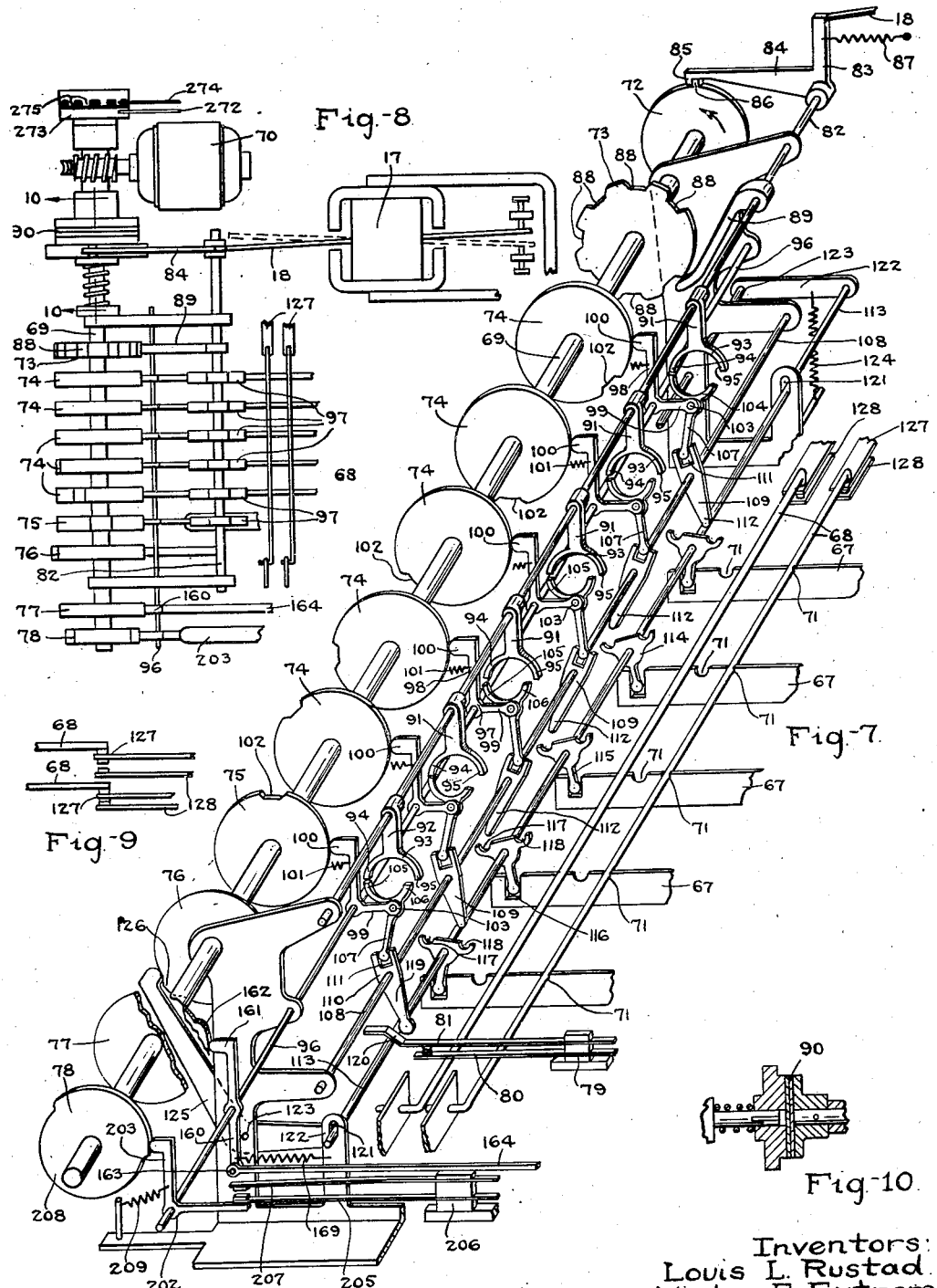

Dec. 5, 1939.   L. L. RUSTAD ET AL   2,182,355
APPARATUS FOR POSTING ELECTRICALLY TRANSMITTED INFORMATION
Original Filed May 4, 1931   20 Sheets-Sheet 8
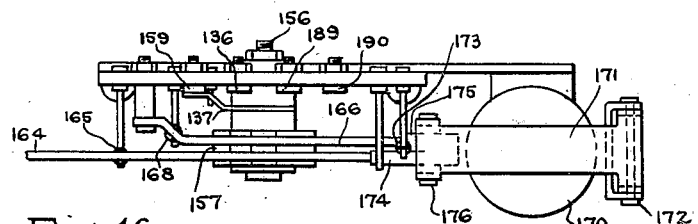
Fig-16
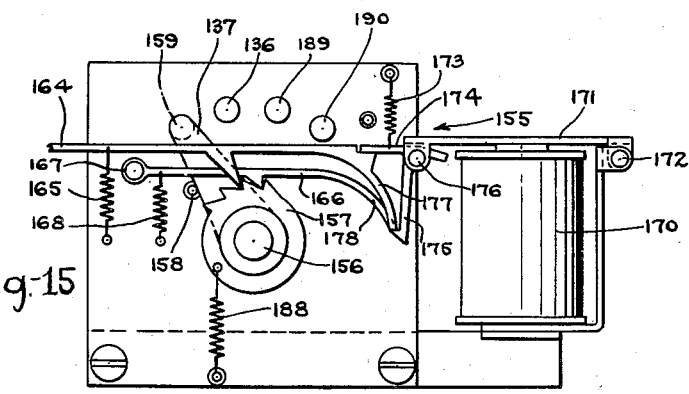
Fig-15
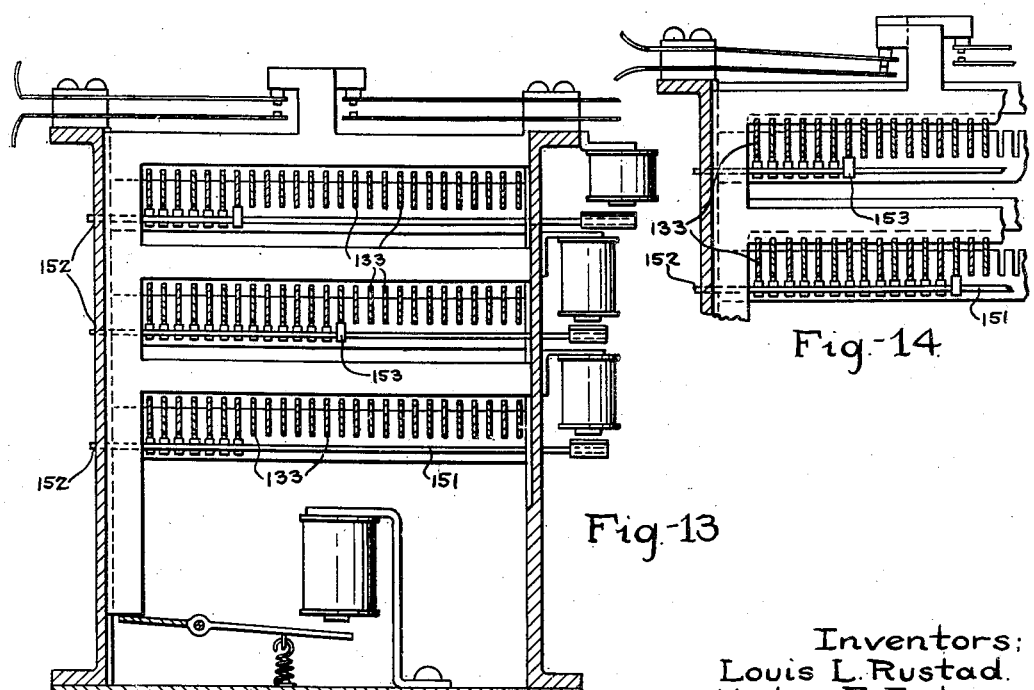
Fig-14
Fig-13
Inventors:
Louis L. Rustad.
Victor E. Extrom.
By Reif & Braddock
Attorneys.

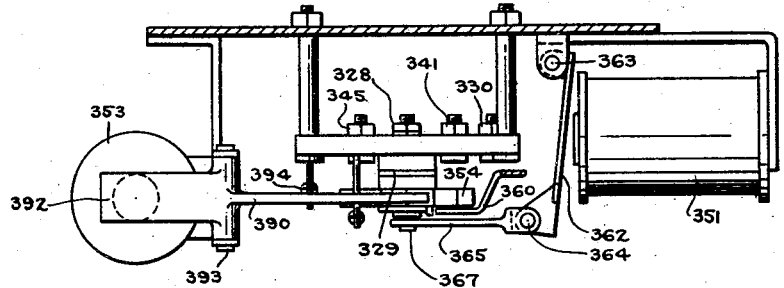
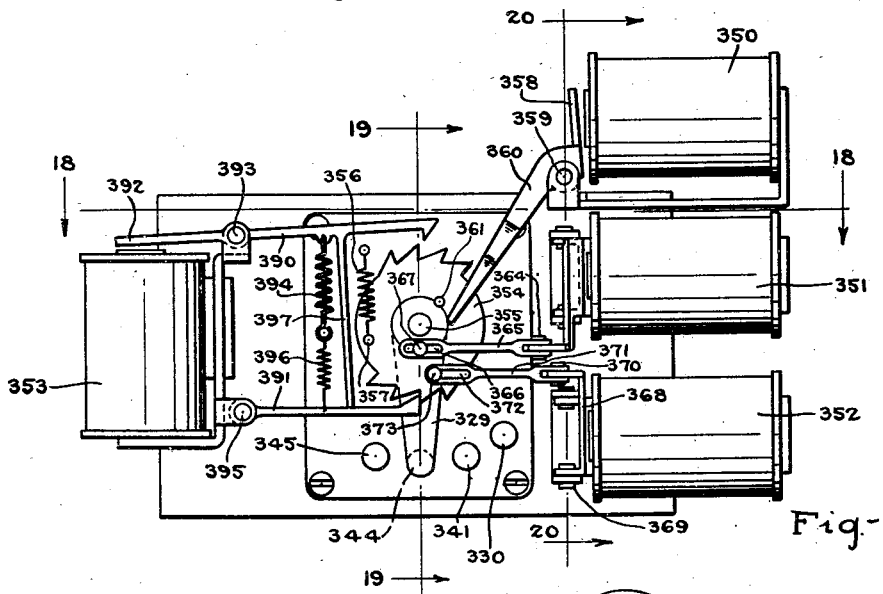
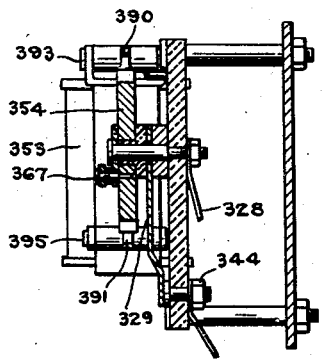
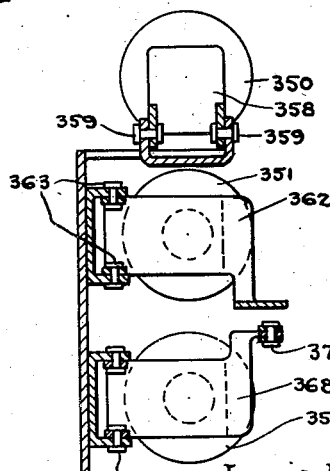

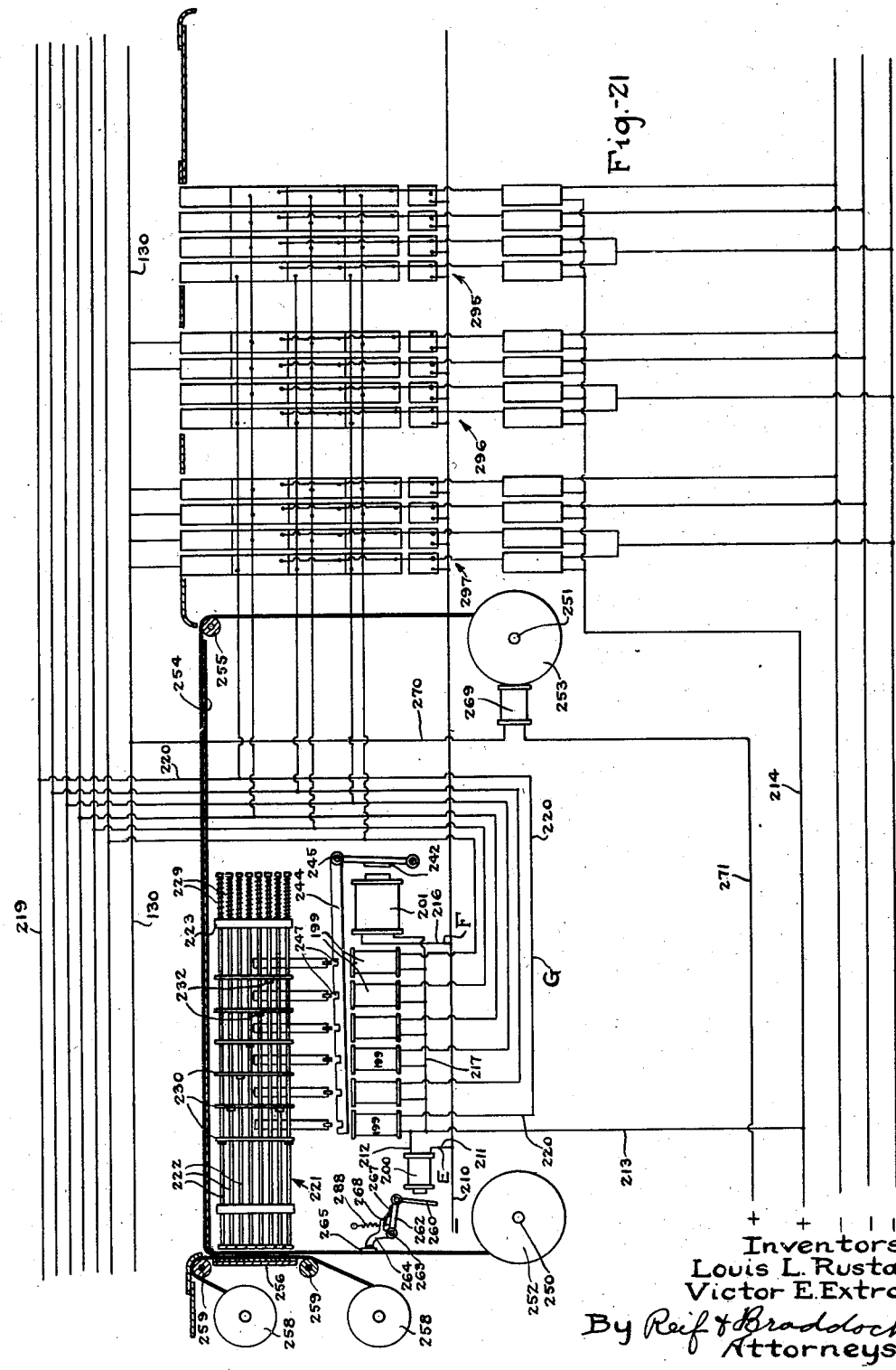

Inventors
Louis L. Rustad.
Victor E. Extrom
By Reif+Braddock
Attorneys.

Inventors
Louis L. Rustad.
Victor E. Extrom.
By Reif & Braddock
Attorneys.

Dec. 5, 1939.            L. L. RUSTAD ET AL            2,182,355
APPARATUS FOR POSTING ELECTRICALLY TRANSMITTED INFORMATION
Original Filed May 4, 1931    20 Sheets-Sheet 13
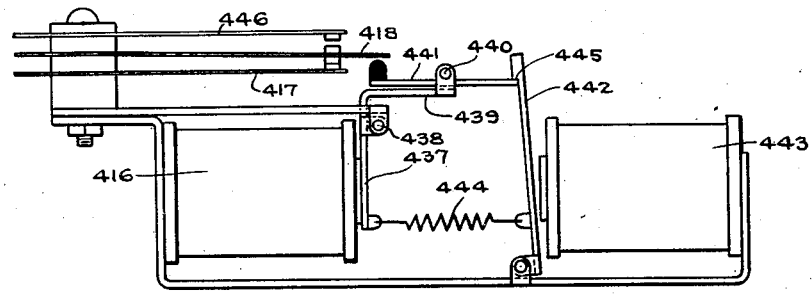
Fig.-28
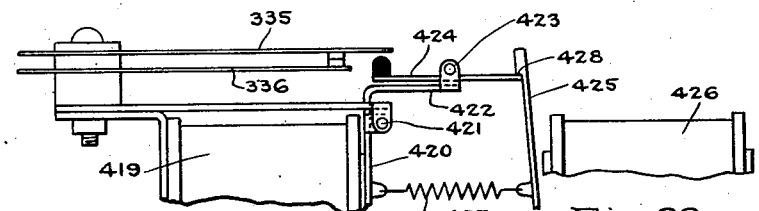
Fig.-29
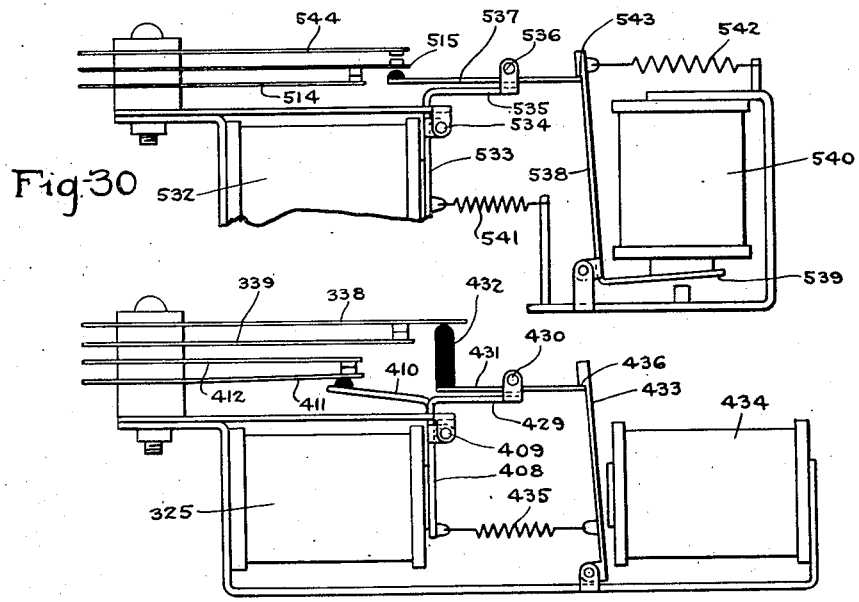
Fig.-30
Fig.-31
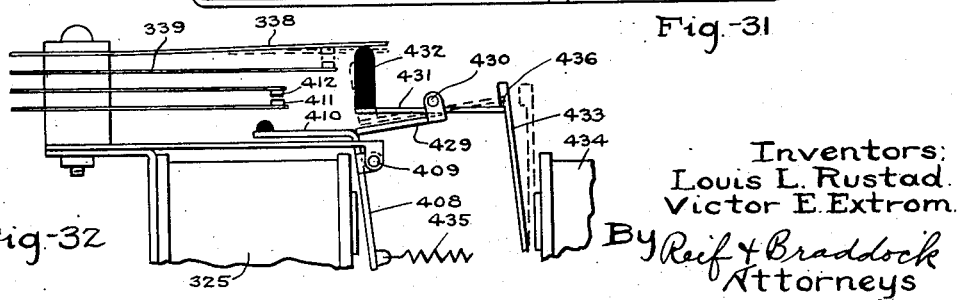
Fig.-32
Inventors:
Louis L. Rustad.
Victor E. Extrom.
By Reif & Braddock
Attorneys

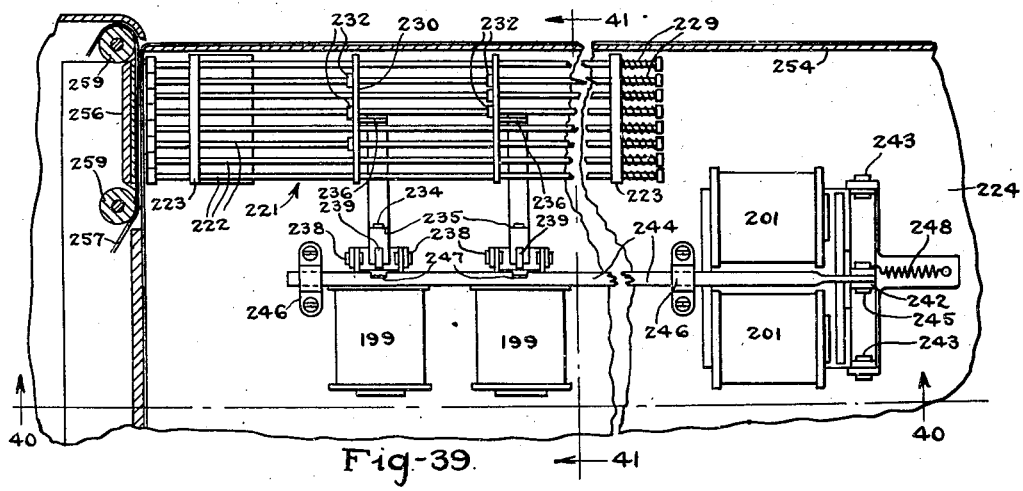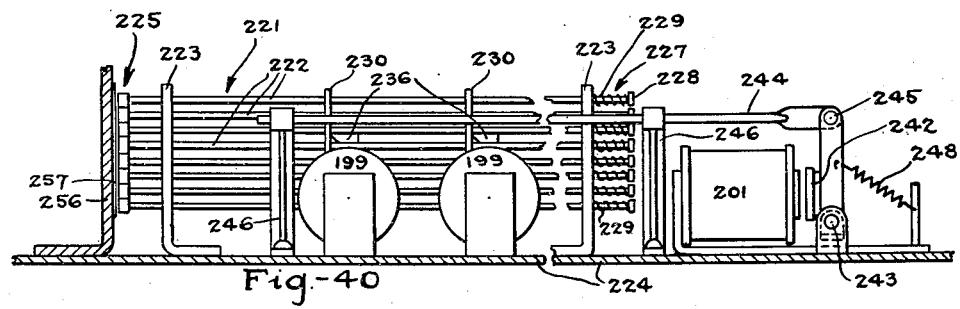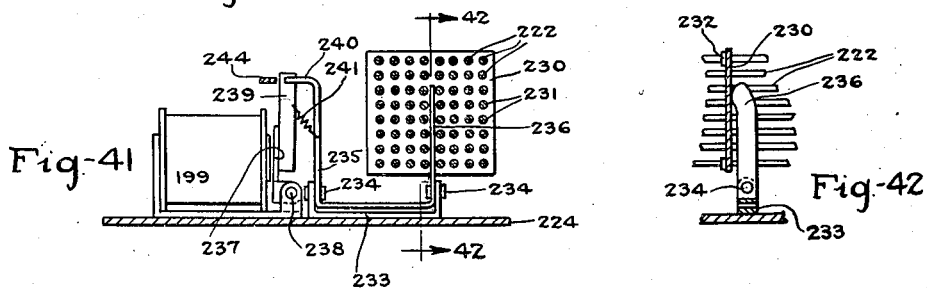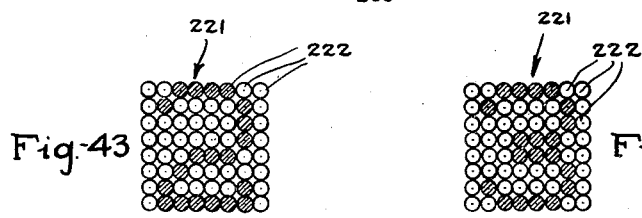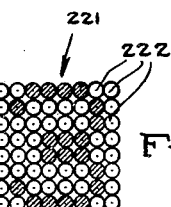

Dec. 5, 1939.  L. L. RUSTAD ET AL  2,182,355
APPARATUS FOR POSTING ELECTRICALLY TRANSMITTED INFORMATION
Original Filed May 4, 1931   20 Sheets-Sheet 15
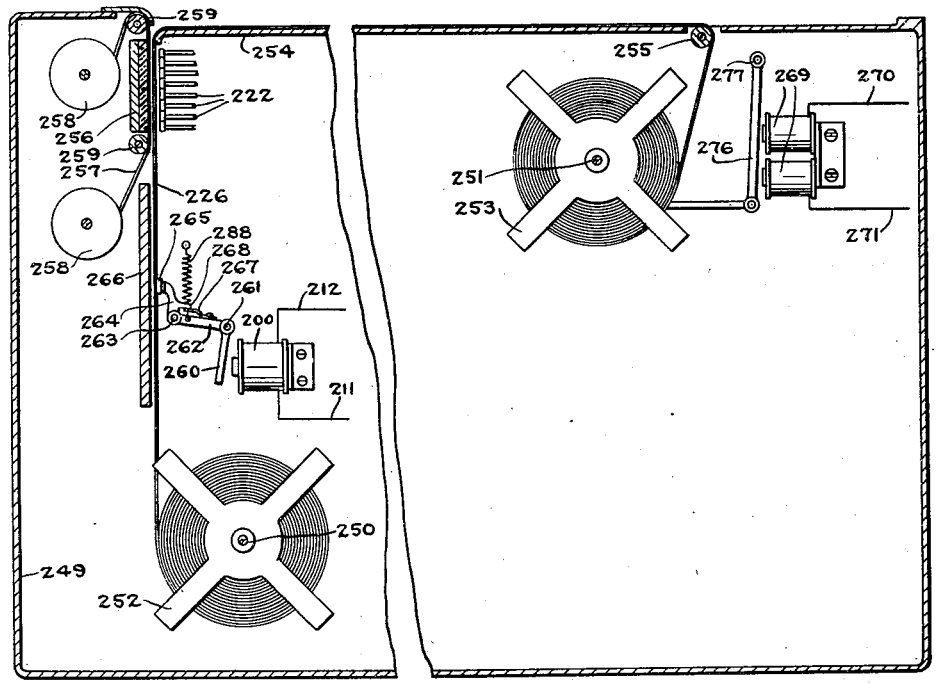
Fig.-45
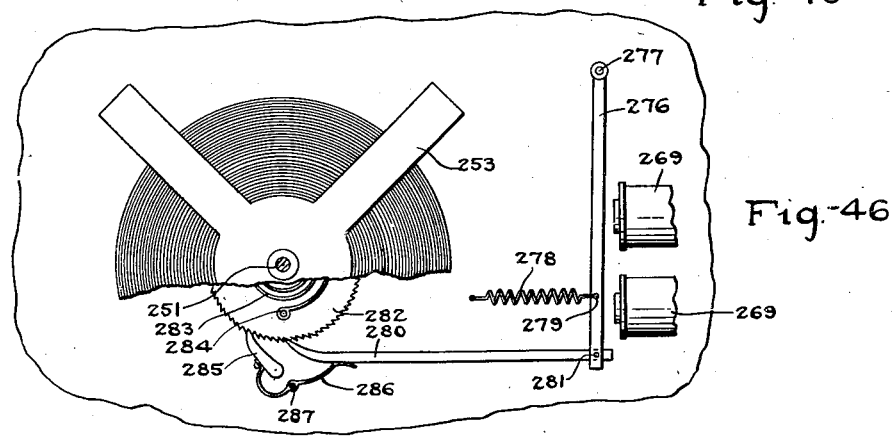
Fig.-46
Fig.-47
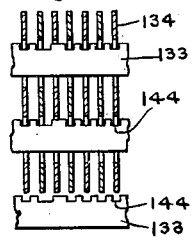
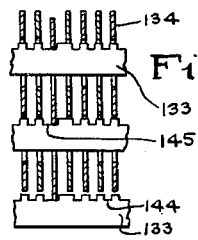
Fig.-48
Inventors:
Louis L. Rustad.
Victor E. Extrom.
By Reif & Braddock
Attorneys

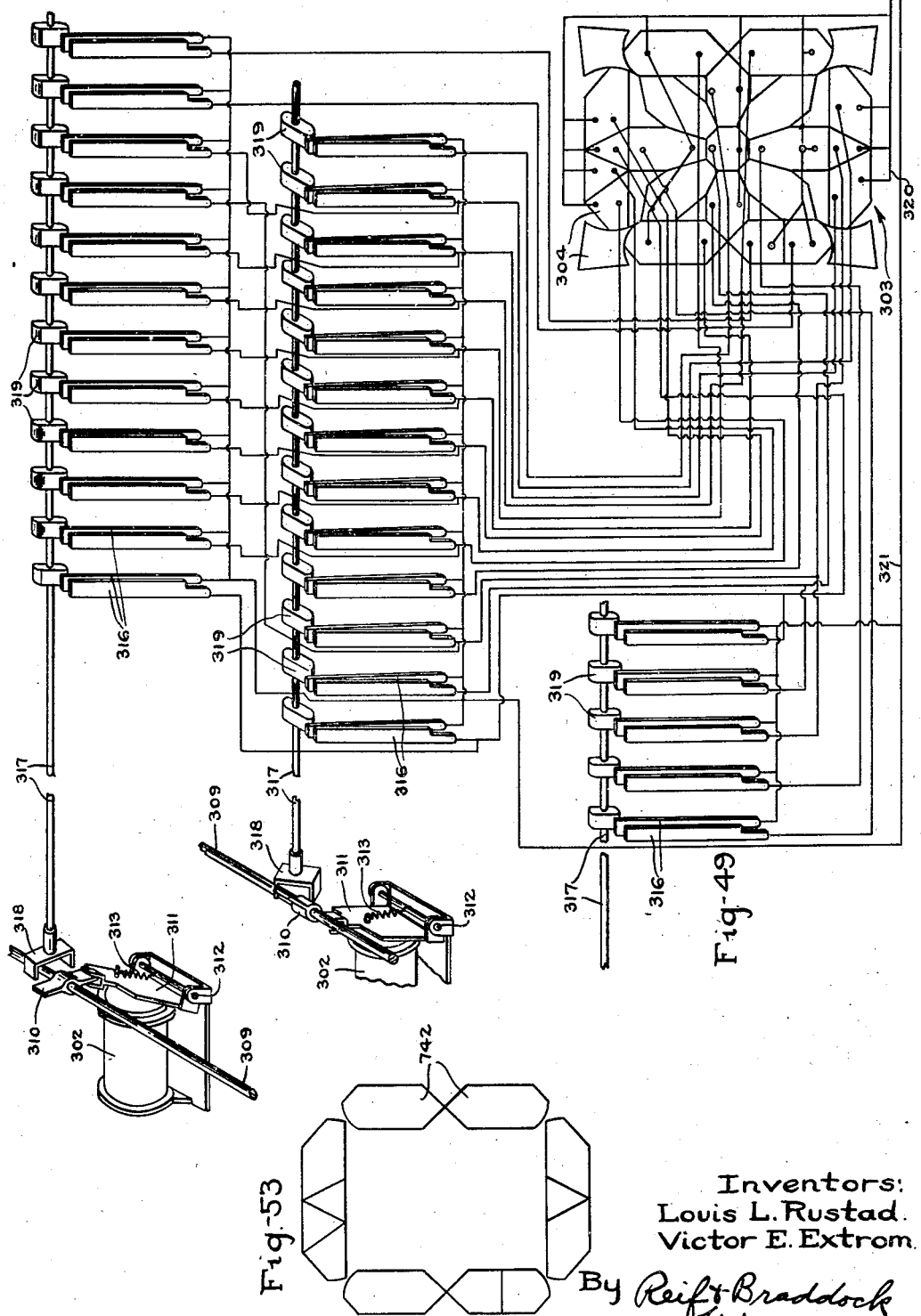

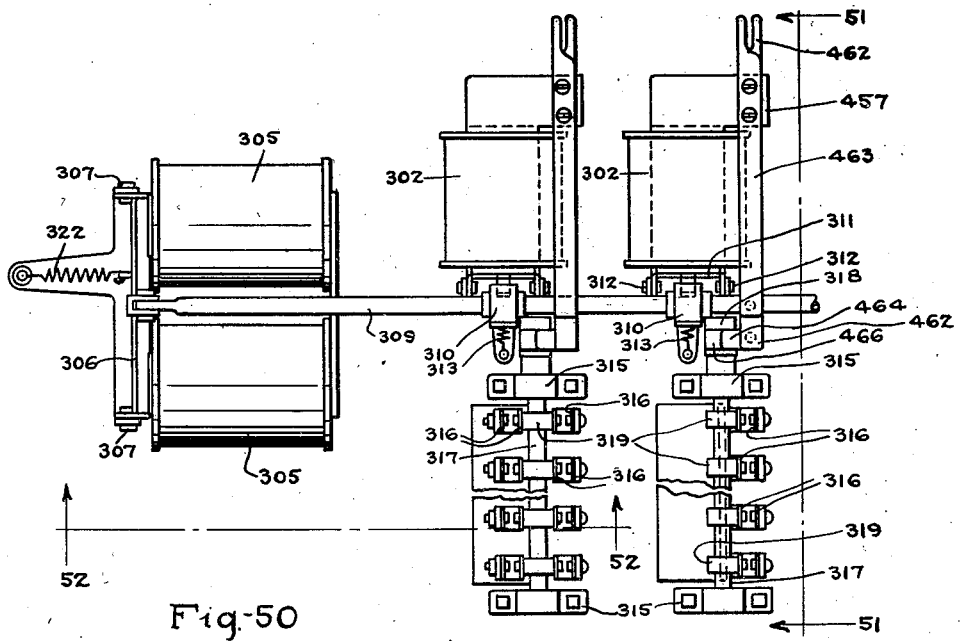
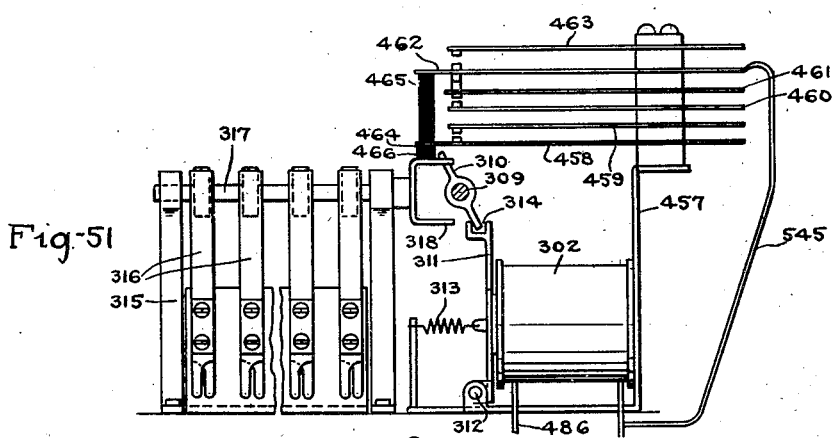
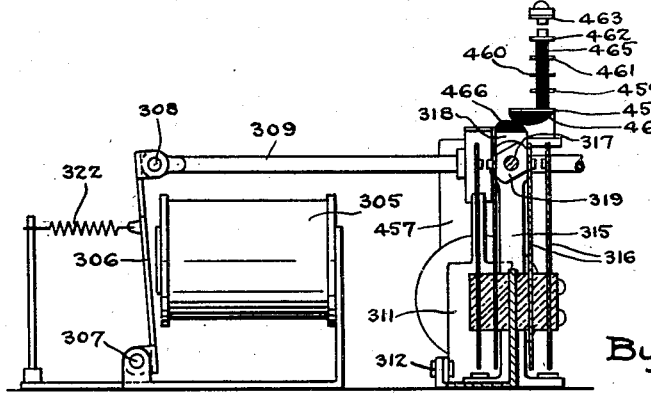

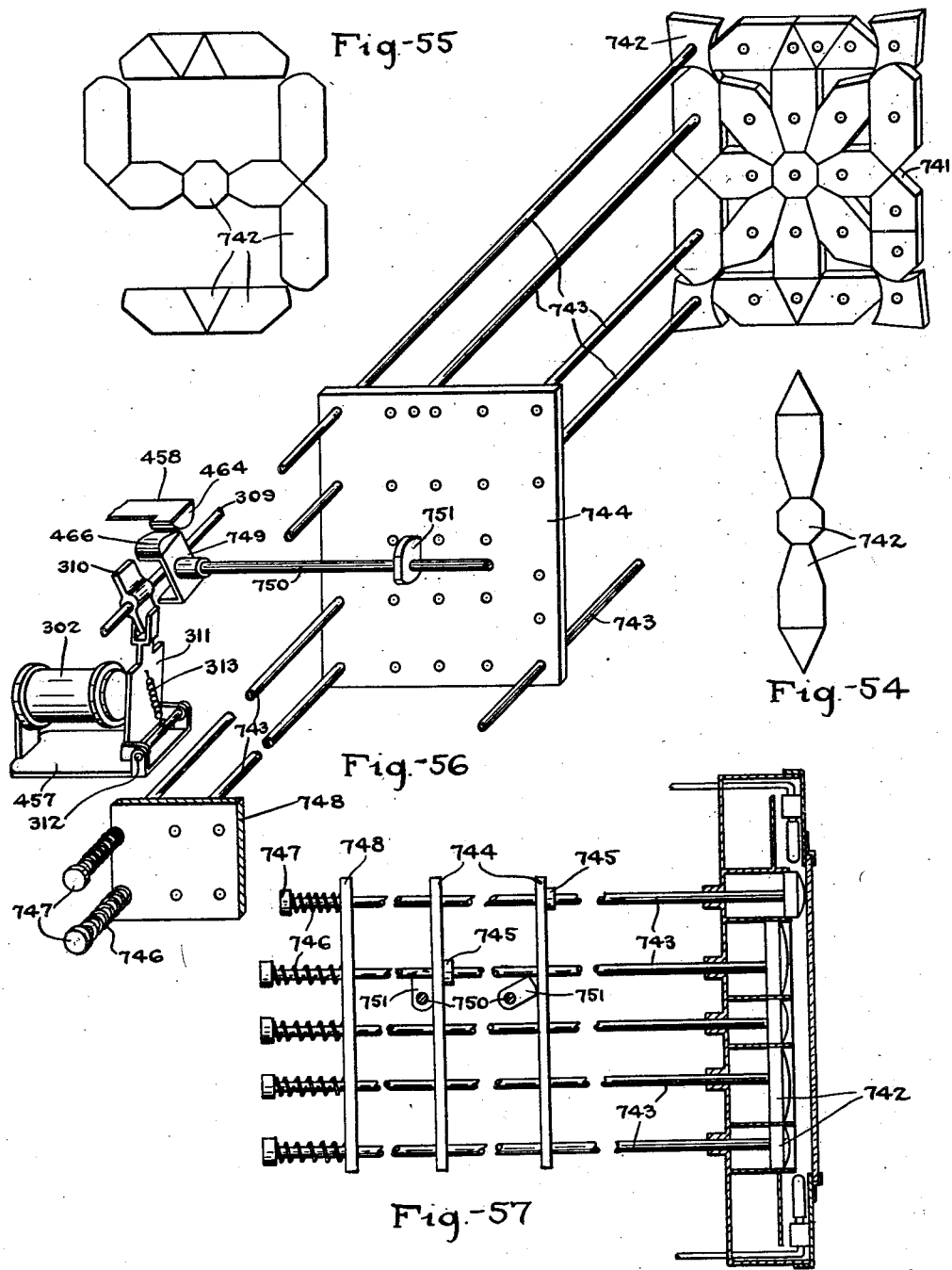

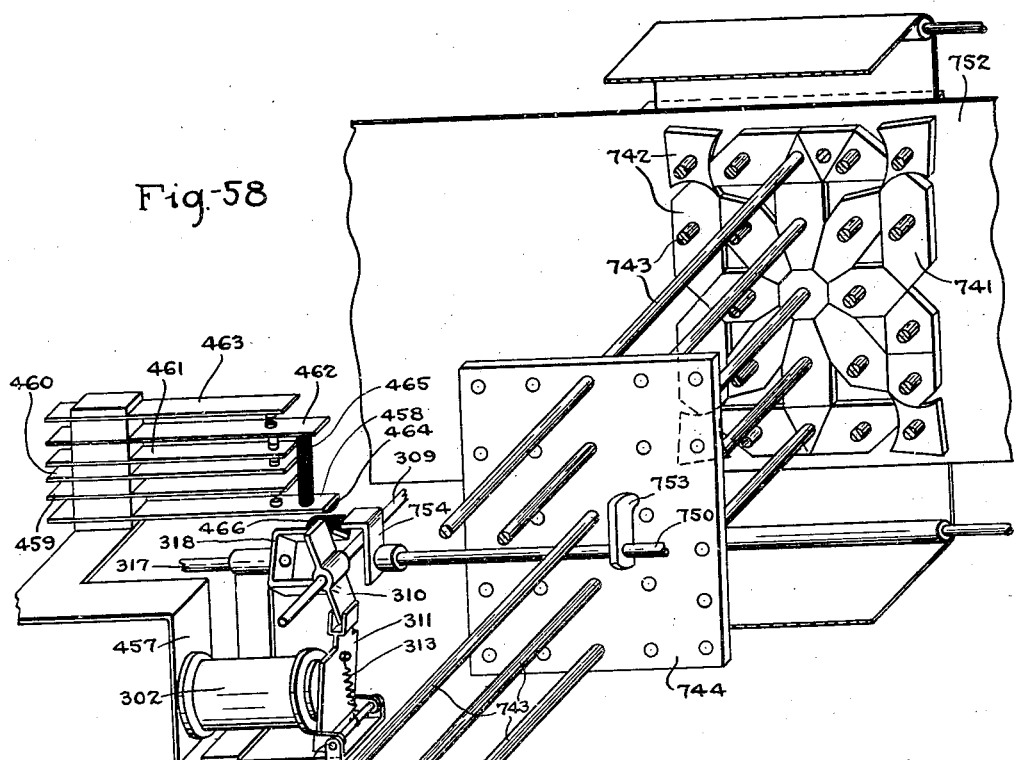
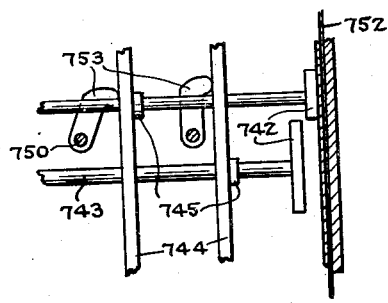
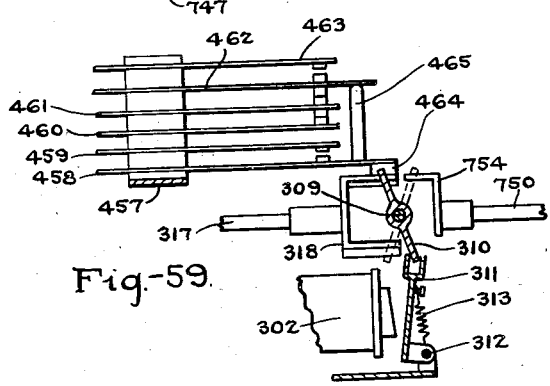

Dec. 5, 1939.  L. L. RUSTAD ET AL  2,182,355
APPARATUS FOR POSTING ELECTRICALLY TRANSMITTED INFORMATION
Original Filed May 4, 1931   20 Sheets-Sheet 20

Inventors
Louis L. Rustad.
Victor E. Extrom.
By Reif & Braddock
Attorneys.

Patented Dec. 5, 1939

2,182,355

UNITED STATES PATENT OFFICE 2,182,355

APPARATUS FOR POSTING ELECTRICALLY TRANSMITTED INFORMATION

Louis L. Rustad and Victor E. Extrom, Minneapolis, Minn., assignors to Telegraphy Improvements Company, Minneapolis, Minn., a corporation of Minnesota Application May 4, 1931, Serial No. 534,938
Renewed January 29, 1938

18 Claims. (Cl. 177—353)

This invention relates to an apparatus adapted to receive electrically transmitted signals and to transform such signals into visible, intelligible and permanent form, and the invention has reference to an apparatus which may be used for various purposes, but which is more particularly adapted to the purpose of posting stock-market quotations, as received at a broker's office, opposite the respective stocks on a "board" which may be similar in general appearance to the blackboards now in common use.

A system now in vogue of receiving and publishing stock-market quotations employs an electrical printing device known as a "ticker" which records the incoming signals on a tape or narrow ribbon of paper, this paper tape usually being torn off as it issues from the "ticker" and the abbreviated quotations on the tape being subsequently written on a large blackboard opposite the names of the corresponding stocks.

An object of the present invention is to provide an apparatus for selecting individual quotations or items of information from a group of quotations of items of information successively signalled electrically, and for posting each separate quotation or item of information selected opposite an appropriately designated stock or heading to which the said selected quotation or item of information relates.

A further object is to provide an apparatus for selecting stock-market quotations as received at a broker's office, and for posting each selected quotation upon a "ticker board" opposite a designated stock to which the selected quotation relates.

A further object is to provide an apparatus for selecting stock-market quotations as received at a broker's office, for posting each selected quotation upon a "ticker board" opposite a designated stock to which the selected quotation relates to thus exhibit the trend of the market, and for also posting the opening, the maximum, and/or the minimum quotation, as for a day's stock-market reports, opposite each designated stock so receiving a selected quotation or quotations exhibiting the market trend.

A further object is to provide the apparatus with mechanism whereby posted opening, maximum, and/or minimum quotations relating to the various stocks can be readily returned to zero or normal positions, as, for example, at the close or opening of a day's stock-market quotations, and thus positioned to be again operable to post the opening, the maximum, and/or the minimum quotations for the various stocks.

A still further object is to provide an apparatus of the present character wherein will be incorporated novel and improved features and characteristics of construction designed to render the apparatus efficient, dependable and satisfactory in the performance of its several intended functions.

Other objects and advantages of the invention will become apparent as the full description thereof proceeds, it being understood that the disclosure herein is merely illustrative of the principles of the invention and is meant in no way in a limiting sense, changes in details of construction and arrangement of parts being permissible so long as within the spirit of the invention and the scope of the claims which follow.

In the accompanying drawings forming a part of this specification,

Fig. 1 is a diagrammatic view showing a "ticker", an apparatus having the features of the invention, so much of an instrument for electrically transmitting signals to the "ticker" and apparatus as is necessary to a full understanding of our invention, and wiring connections from said instrument to said "ticker" and apparatus;

Fig. 2 is a detail view disclosing the mechanism of Fig. 1 for controlling the brush-arm shaft in a different position;

Figure 3:
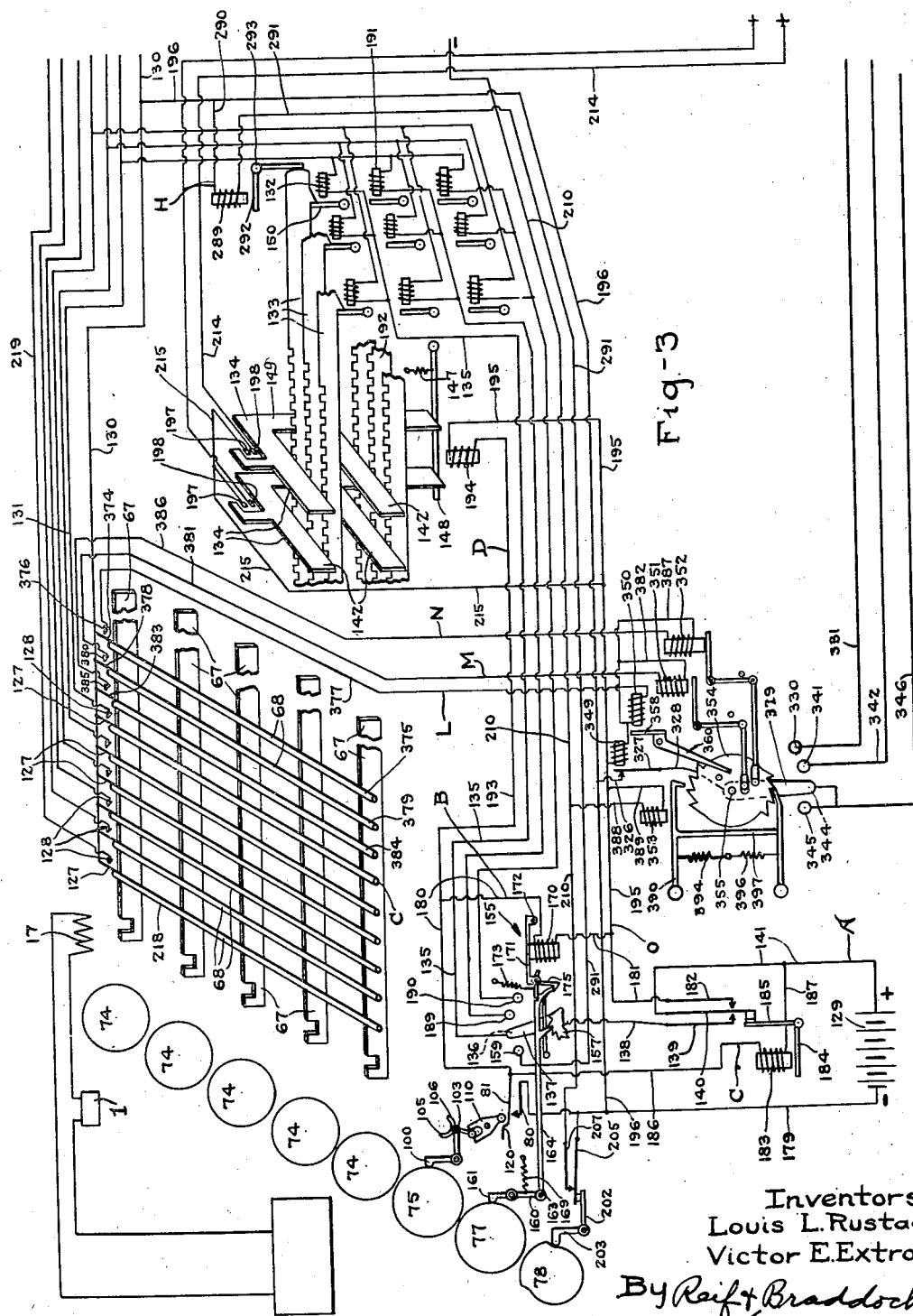
Figure 12:
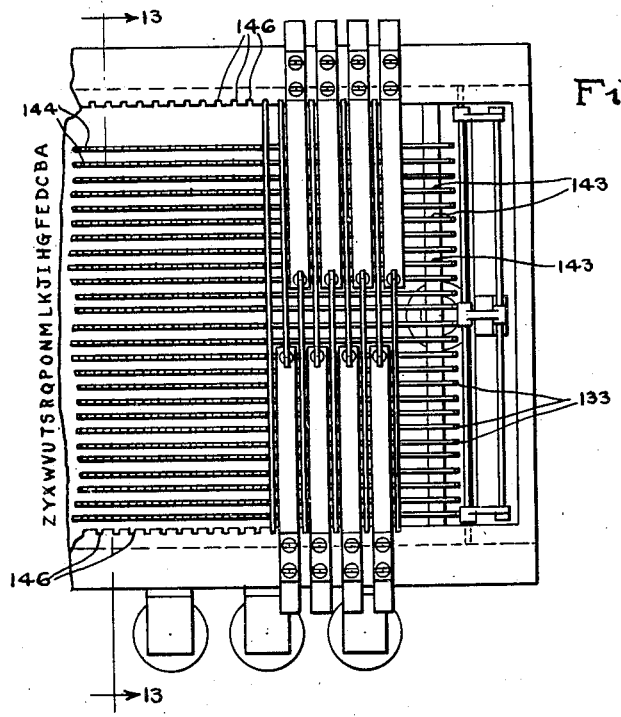
Figure 11:
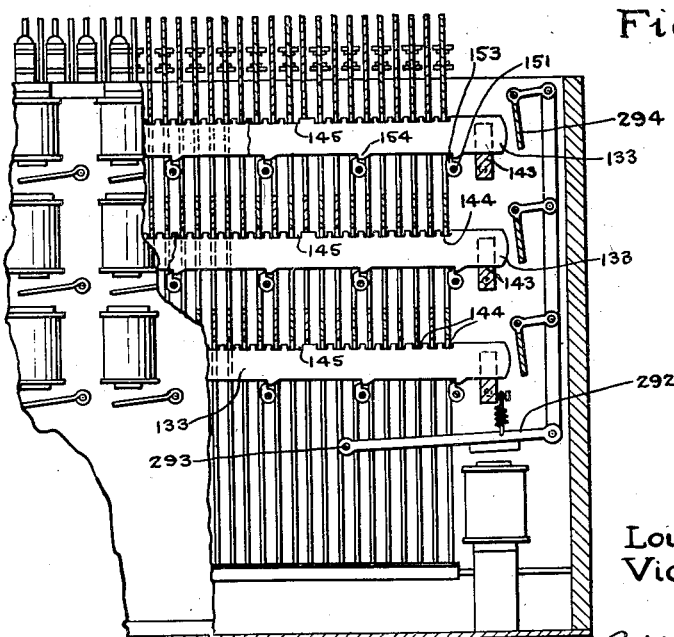
Figure 22:
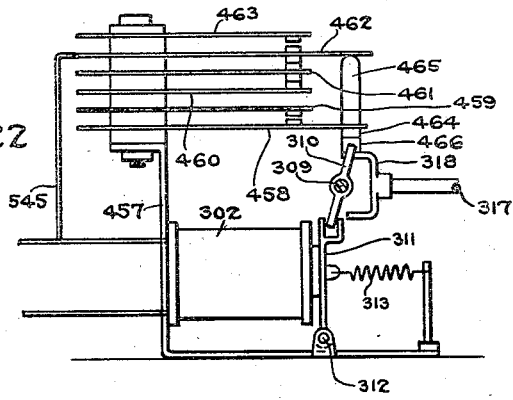
Figure 26:
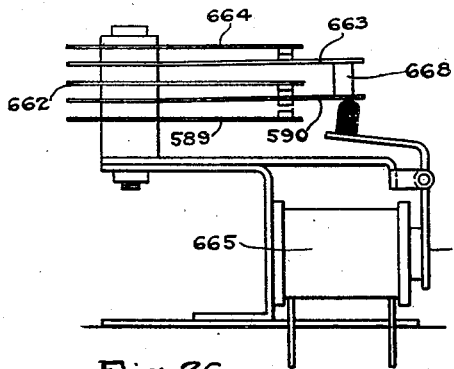
Figure 25:
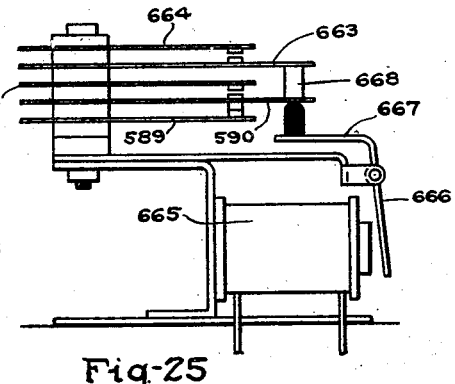
Figure 24:
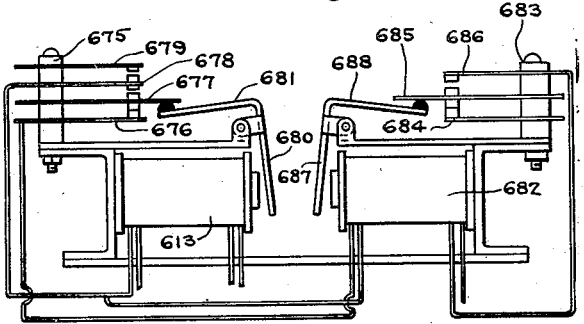
Figure 37:
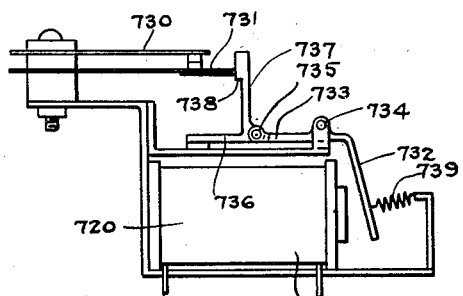
Figure 23:
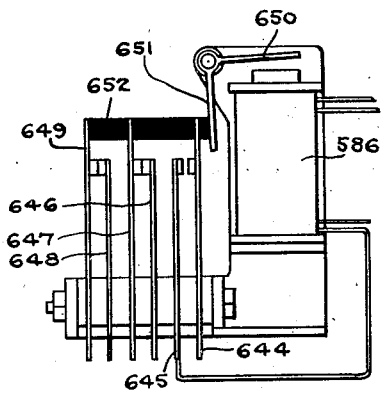
Figure 38:
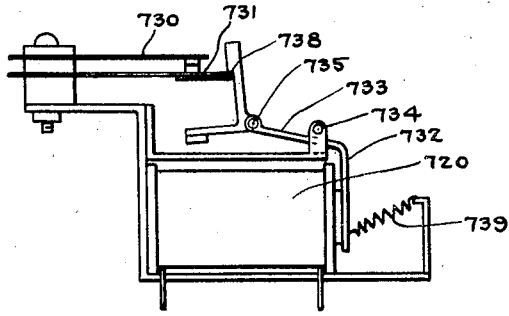
Figure 63:
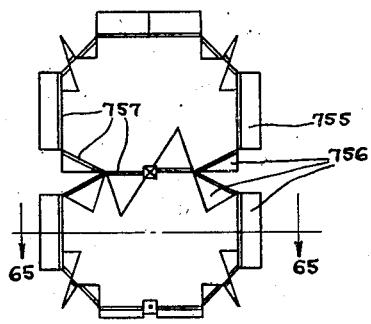
Figure 61:
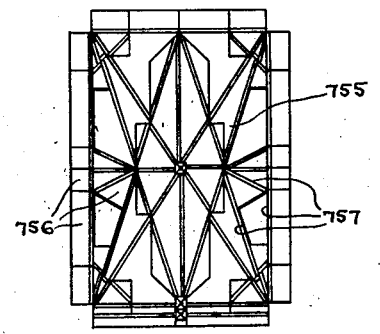
Figure 64:
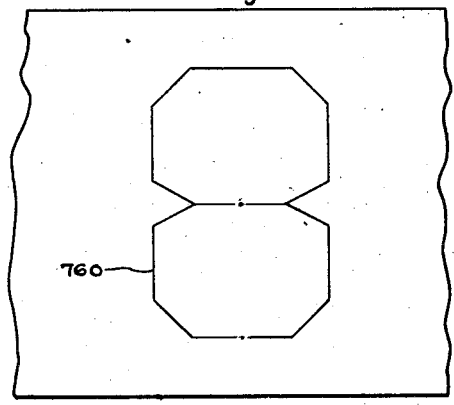
Figure 62:
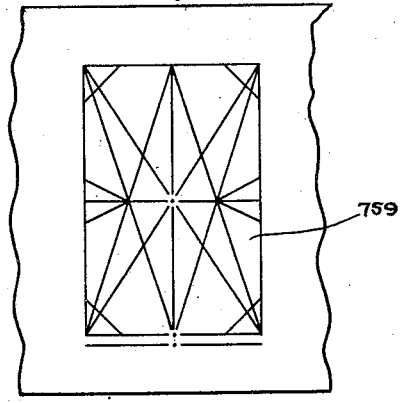
Figure 65:
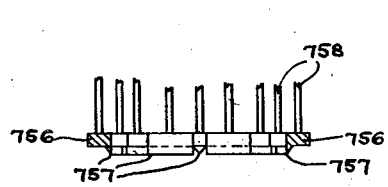

Figs. 3, 3a and 3b together constitute a diagrammatic view detailing the improved apparatus of Fig. 1, and showing the relation of said apparatus to the sending instrument and "ticker";

Fig. 4 is a fragmentary front elevational view of a board for posting stock-market quotations;

Fig. 5 is an enlarged fragmentary front elevational view of a portion of the board of Fig. 4;

Fig. 6 is a similar view of a different portion of the board of Fig. 4;

Fig. 7 is an enlarged perspective view of a portion of the main selecting mechanism of the apparatus;

Fig. 8 is an elevational view, on a smaller scale, of the mechanism disclosed in Fig. 7;

Fig. 9 is a detail view of contacts of Figs. 7 and 8;

Fig. 10 is a detail sectional view of a clutch arrangement, taken on line 10—10 in Fig. 8;

Fig. 11 is an enlarged sectional view, partially in elevation and partially broken away, of a different portion of the main selecting mechanism of the apparatus;

Fig. 12 is an elevational view as seen from the right in Fig. 11;

Fig. 13 is a sectional view, taken on line 13—13 in Fig. 12;

Fig. 14 is a fragmentary view corresponding generally with the disclosure of Fig. 13, but showing certain of the parts in different positions;

Fig. 15 is an enlarged elevational view of the group selector of Fig. 3;

Fig. 16 is a plan view of the disclosure of Fig. 15;

Fig. 17 is an enlarged elevational view of the digits position selector of Fig. 3;

Fig. 18 is a sectional view taken on line 18—18 in Fig. 17;

Fig. 19 is a sectional view taken on line 19—19 in Fig. 17;

Fig. 20 is a sectional view taken on line 20—20 in Fig. 17;

Fig. 21 is a general diagrammatic view of a single stock unit of the apparatus;

Figs. 22 and 23 are enlarged elevational views of two different types of contact controllers of the apparatus;

Fig. 24 is an enlarged elevational view of a different type of contact controller of the apparatus;

Fig. 25 is an enlarged elevational view of another type of contact controller of the apparatus;

Fig. 26 is a view similar to Fig. 25, showing parts in different positions;

Figs. 27, 28, 29 and 30 are enlarged elevational views of various other types of contact controllers of the apparatus;

Fig. 31 is an enlarged elevational view of another type of contact controller of the apparatus;

Fig. 32 is a view similar to Fig. 31, showing parts in different positions;

Figs. 33, 34, 35 and 36 are enlarged elevational views of still additional types of contact controllers of the apparatus;

Fig. 37 is an enlarged elevational view of still another type of contact controller of the apparatus;

Fig. 38 is a view similar to Fig. 37, showing parts in different positions;

Fig. 39 is an enlarged horizontal sectional view detailing a part of a printing unit of the apparatus;

Fig. 40 is a sectional view taken on line 40—40 in Fig. 39;

Fig. 41 is a sectional view taken on line 41—41 in Fig. 39;

Fig. 42 is a fragmentary sectional view taken on line 42—42 in Fig. 41;

Figs. 43 and 44 are face or end views of a kind of type element of the printing unit, the former showing the numeral "2" and the latter the numeral "3" protruded from said type element;

Fig. 45 is a further enlarged horizontal sectional view of parts of the printing unit of Fig. 39, more particularly detailing the tape movement mechanism of said printing unit;

Fig. 46 is a detail view of the tape take-up reel;

Fig. 47 is a fragmentary sectional view detailing keys and tumblers, disclosing all of the tumblers in elevated position;

Fig. 48 is a view similar to Fig. 47, but disclosing the keys actuated to allow a tumbler to fall to close the printing unit or number circuit, the said tumbler being shown as having dropped;

Fig. 49 is a diagrammatic view of a portion of a type of mechanism of the apparatus for indicating opening, maximum, and/or minimum quotations of the stock-market;

Fig. 50 is an enlarged plan view detailing features of the portion of the opening, maximum, and/or minimum quotations mechanism of Fig. 49, and also detailing other features of said mechanism;

Fig. 51 is a sectional view taken on line 51—51 in Fig. 50;

Fig. 52 is a sectional view taken on line 52—52 in Fig. 50;

Figs. 53, 54 and 55 are parts of the composite character shown in Fig. 49, Fig. 53 indicating 0, Fig. 54, 1, and Fig. 55, 9;

Fig. 56 is a perspective view disclosing a portion of a modified form of maximum and minimum quotations mechanism;

Fig. 57 is a sectional view detailing features of the maximum and minimum quotations mechanism of Fig. 56;

Fig. 58 is a perspective view disclosing a portion of a further modified form of maximum and minimum quotations mechanism;

Figs. 59 and 60 are views detailing features of the mechanism of Fig. 58;

Fig. 61 is a face or end view of a modified form of composite character which can be substituted in Figs. 43, 44 and 58 in place of the composite character there disclosed;

Fig. 62 is a facsimile of the composite character which the type element of Fig. 61, as a whole, would print;

Fig. 63 is a sectional view detailing the composite character of Fig. 61 set to print the number 8;

Fig. 64 is a facsimile of the number 8 which the composite character of Fig. 61 would print when set as in Fig. 63;

Fig. 65 is a detail sectional view taken on line 65—65 in Fig. 63; and

Figure 66:
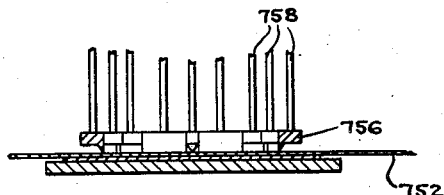

Fig. 66 is a view corresponding generally with the disclosure of Fig. 65, but additionally showing the type element as when accomplishing the printing operation.

The selecting and posting apparatus of the present invention is as disclosed dependent in its operation upon the reception of a plurality of different combinations of positive and negative impulses transmitted over a line wire, and comprises mechanisms which are responsive in the performance of their functions to each of said different combinations of positive and negative impulses.

Speaking generally, our invention contemplates the assembly in operative relation to each other, of an instrument for transmitting electrical signals, as, for example, to an ordinary "ticker", including means for transmitting a plurality of different combinations of positive and negative electrical impulses, and an apparatus which will be responsive to each of said different combinations of positive and negative impulses and which will operate in synchronism with the said instrument to both select a quotation or other item of information from a group of successively transmitted quotations or items of information and cause the selected quotation or item of information to be posted opposite an appropriately designated stock or other heading to indicate the trend of the market; and the invention also contemplates the inclusion in said apparatus of means for posting the opening, the maximum, and/or the minimum quotation opposite each designated stock so receiving a selected quotation or quotations exhibiting the market trend.

In Figs. 1, 3, 3a, and 3b we have disclosed a "ticker" 1, an apparatus 2 having the principles of our invention, an instrument 3 for electrically transmitting signals to the "ticker" and apparatus, and wiring connections 4 from said instrument to said "ticker" and apparatus.

The instrument 3 for electrically transmitting signals is illustrated in a more or less conventional manner. As shown in Fig. 1, it includes a stationary segment surface or disc 5 having spaced apart conducting segments 6 suitably arranged in its periphery, and a rotatable shaft 7 driven in any suitable manner, as by a motor 8, said shaft being concentrically mounted in the segment surface or disc 5 and including a brush arm 9 having an outer brush 10 ridable over the conducting segments 6 and an inner brush 11 ridable over a circular or continuous contact member 12 upon the segment surface or disc 5 extending about the shaft 7 and arranged within the confines of the conducting segments 6 in spaced relation thereto. The signaling code employed to transmit characters from the sending instrument to our apparatus is a six unit "start-stop" code which consists of six selecting impulses used in various combinations of positive and negative intervals. Each group of six selecting impulses is preceded by a "start" impulse to maintain unison between the sending instrument 3 and the "ticker" 1 and apparatus 2. To this end, the segment surface or disc 5 includes eight conducting segments 6, the first, designated 13, corresponding to the "start" impulse, and the last, designated 14, corresponding to the "stop" impulse. The brush arm in Fig. 1 rotates in the direction of the arrow shown. The six conducting segments 6 between said conducting segments 13 and 14 correspond to the six selecting impulses of the signaling code. The sending instrument also includes key levers 15 each adapted to be depressed to transmit a character to the "ticker" and apparatus, and a shift lever 16 for determining, speaking generally, whether the character transmitted shall be a letter or a number.

The sending instrument also includes a plurality of electrical circuits manipulable by each of said levers 15, in cooperation with said lever 16 and mechanism of the sending instrument yet to be described, for obtaining each of a plurality of different combinations of positive and negative electrical impulses, each of which different combinations is adapted to be independently effective upon mechanism of the receiving apparatus, whereby to select in said receiving apparatus, by means of a particular combination of positive and negative electrical impulses, the same character as selected in said sending instrument by actuation of a key lever 15 thereof. More specifically, the receiving apparatus includes a polarized magnet 17 having an armature 18 for regulating mechanism of said receiving apparatus movable in synchronism with the operating parts of the sending instrument, in a manner to be hereinafter described, the positive and negative electrical impulses of said sending instrument varying and controlling the position of said armature 18 during each series or combination of positive and negative electrical impulses, and said armature 18 in turn varying and controlling a selecting mechanism of said receiving apparatus. To this end, each of the electrical circuits of the sending instrument includes said polarized magnet 17.

The sending instrument includes selecting keys 19, five in number, and a starting key 20, said keys 19 and 20 being located directly beneath and arranged transversely of the key levers 15. The key levers 15 are adapted to be depressed to in turn depress the keys 19, 20, and said key levers 15 and keys 19 and 20 are equipped with suitable means (not shown) for returning them to elevated position when the key levers are released. The rotatable shaft 7 is provided with a start and stop cam 21 arranged adjacent the motor 8, and with a retaining cam 22 arranged adjacent the segment surface or disc 5. Said shaft 7 also includes a suitable slip clutch 23 between the cam 21 and the motor 8 for the purpose of allowing the motor to operate while the portion of the shaft 7 having said cams 21 and 22 remains stationary. The end of the rotatable shaft 7 opposite the segment surface or disc 5 and the motor 8 can be supported in any suitable manner.

A circuit controller shaft 24, suitably mounted in a manner not shown, is arranged parallel with the key levers 15 at position adjacent an end of each of the keys 19. Said circuit controller shaft 24 rotatably supports T-elements 25, one for each key 19, one arm 26 of each T-element extending directly beneath a key 19, the second arm 27 of each T-element extending directly upwardly, and the third arm 28 of each T-element as disclosed alining with the arm 26 and supporting a movable contact 29. The shift lever 16 is fixedly supported upon a short shaft 30, mounted in any suitable manner, which carries an actuating arm 31 engaging under an end portion of a movable contact 32. A small bracket 33 beneath the shift lever 16 includes a flexible member providing spaced pockets 34 for receiving a lug 35 fixed to the shaft 30, said lug 35 being adapted to lie in the pocket at the left in Fig. 1 when the actuating arm 31 is depressed and in the pocket at the right when said arm is elevated.

A battery 36 for supplying current to the circuits of the sending instrument for providing positive and negative electrical impulses is attached at one of its sides by a lead wire 37 with fixed contacts 38, one for each movable contact 29, including a contact 38 directly beneath each contact 29, and is attached at its other side by a lead wire 39 with fixed contacts 40, one for each movable contact 29, including a contact 39 directly above each contact 29. A fixed contact 41 attached to the lead wire 37 is arranged directly beneath the movable contact 32, and a fixed contact 42 attached to the lead wire 39 is arranged directly above said movable contact 32. Each movable contact 29 is attached by a lead wire 43 to one of each of the first five conducting segments 6 corresponding to the first five selecting impulses of the signal code employed, and the movable contact 32 is attached by a lead wire 44 to the sixth conducting segment 6 corresponding to the sixth selecting impulse of said signal code. A lead wire 45 connects the lead wire 37 with the conducting segment 13 of the segment surface or disc 5 corresponding to the "start" impulse, and a lead wire 46 connects the lead wire 39 with the conducting segment 14 of said segment surface or disc corresponding to the "stop" impulse. A lead wire 47 connects the circular or continuous contact member 12 with the "ticker" 1, and continues from said "ticker" to the polarized magnet 17, and a lead wire 48 extends between an intermediate part of the battery 36 and said polarized magnet.

A trip dog 49, pivotally supported adjacent the cam 21, as at 50, normally engages said cam in the manner shown in Fig. 2 to hold the shaft 7 against rotation. A trip lever 51 is pivotally supported upon the adjacent end of the starting key 20, as at 52, and extends upwardly there-from. A coil spring 53 attached to lower portions of said trip dog and trip lever urges said trip dog into engagement with the shoulder of said cam 21 and the upper portion of said trip lever into engagement with a stationary pin 54 supported in any convenient manner. The trip dog 49 includes a lug 55 which is engaged beneath a shoulder 56 of said trip lever, as in Fig. 2, when the starting key 20 is in elevated position and the pin 54 is situated in a concavity 57 of said trip lever. Upon depression of said starting key 20, the shoulder 56 first pushes down on the lug 55 to release the trip dog from the cam 21, and later the upper end portion of said trip lever rides on said pin 54 to release the trip lever from the lug 55 as shown in Fig. 1. It will be apparent that the motor 8 will cause the shaft 7 to revolve, and that the trip dog 49 will engage the cam 21 as shown in Fig. 2 upon completion of one revolution of said shaft 7, the trip lever upon being depressed having released the trip dog to the action of the coil spring 53 after causing said trip dog to be released from the shoulder of said cam 21 to allow it to start a revolution. Upon the return of the starting key to its elevated position the coil spring 53 will cause the shoulder 56 to engage over the lug 55 and the pin 54 to be positioned in the concavity of said trip lever, as these parts are shown in Fig. 2.

The selecting keys 19 include slots 58 in their upper edges, the slots of the different selecting keys bearing definite and predetermined relations to each other and to the various key levers 15, the arrangement being such that when a particular key lever 15 is depressed, selecting keys having slots directly beneath said key lever will not be depressed, while selecting keys not having slots below said key lever will be depressed. For example, in Fig. 1 we have shown the outermost selecting keys 19 provided with slots directly beneath the key lever 15 at the right and the three intermediate selecting keys provided with no slots beneath said key lever at the right, so that when this key lever is depressed, said three intermediate keys will be depressed, while the outermost keys will not be depressed. No matter which key lever 15 is depressed the starting key 20 will be depressed. The three lowermost selecting keys 19 in Fig. 1 are provided with slots beneath the key lever 15 at the left while the two uppermost keys are not slotted at the location of said key lever at the left, so that when this key lever is depressed said two uppermost selecting keys 19 are also depressed while the three lowermost selecting keys are not depressed. For each different character to be transmitted by the sending instrument there is a group of slots in the selecting keys directly beneath a key lever corresponding to said key lever, the whole so arranged that upon depression of any key lever a combination of selecting keys 19 different from every other combination will be depressed, as will also the starting key 20.

The movable contacts 29 are as disclosed of resilient nature to engage the lower fixed contacts 38 when the selecting keys 19 are in elevated position. Upon depression of a selecting key, the arm 26 engaged thereby is depressed to move the corresponding movable contact 29 into engagement with the adjacent fixed contact 40. It will be seen, then, that upon depression of any key lever 15 one or more of the movable contacts 29 will be caused to engage an equal number of adjacent fixed contacts 40. Likewise, the movable contact 32 is of resilient nature to engage the lower fixed contact 41 when the actuating arm 31 is depressed and the lug 35 is engaged in the pocket 34 at the left.

Let us suppose that the key lever 15 at the right in Fig. 1 is set up, with relation to the remainder of the mechanism of the sending instrument, to be capable of transmitting the letter C when the shift lever 16 is positioned as shown in said Fig. 1. Upon depression of said key lever 15 at the right, the starting key 20 is depressed and the shaft 7 commences to rotate as disclosed in Fig. 1 and as already described. Depression of said key lever 15 at the right also depresses the three intermediate selecting keys 19 and moves the upstanding arms 27 of the corresponding T-elements 25 toward the left. Numeral 59 designates a U-shape retaining frame or member including a base 60 arranged parallel with and above the circuit controller shaft 24, and also including legs 61 pivotally supported, as at 62, in any convenient manner. An extension 63 of one of said legs 61, opposite the base 60, includes a protuberance 64 adapted to enter a concavity 65 in the retaining cam 22 when the trip dog 49 is positioned as in Fig. 2 to hold the shaft 7 in stationary position, a coil spring 66 attached to said extension 63 of the leg and also suitably attached to a fixed part being for the purpose of urging said extension 63 toward said cam 22. The mounting and arrangement of the U-retaining frame 59 is such that when the protuberance 64 rides in the concavity 65, the base 60 of the said frame is above the elevation of the free ends of the arms 27 of the T-elements 25. The arrangement of the T-elements is such that whenever a selecting key 19 is elevated, the arm 27 of the T-element 25 corresponding thereto is to the right of said base 60 as disclosed in Fig. 1, while each selecting key 19 upon being depressed moves the corresponding T-element to position its arm 27 to the left of said base 60 as disclosed in said Fig. 1.

It will now be clear that upon depression of a key lever 15, say, for example, the one at the right in Fig. 1, to depress certain selecting keys 19 and thus close circuits including contacts 29, 40 and open corresponding contacts 29, 38, and to also depress the starting key 20 to release the shaft 7 to rotative movement and cause the protuberance 64 to ride out of the concavity 65, the base 60 which was above the free ends of all of the arms 27 of the T-elements 25 when the shaft 7 was stationary will now be depressed to position between arms 27 at the right and arms 27 moved to the left by depression of said key lever to hold said arms at the left in stationary position to maintain the corresponding contacts 29, 40 in closed position and the corresponding contacts 29, 38 in open position as disclosed in Fig. 1 until the shaft 7 completes one revolution and returns to position as in Fig. 2. It will be understood that the key lever 15 which was depressed can be released immediately after it is struck; that is to say, after the trip dog 49 has released the cam 21. Upon the stopping of the shaft 7 by the trip dog 49 at the completion of the revolution of said shaft, the coil spring 66 causes the protuberance 64 to ride into the concavity 65 of the cam 22 to thus elevate the base 60 above the free ends of the arms 27 to allow the movable contacts 29 which were elevated to become depressed to break the corresponding contacts 29, 40 and make the corresponding contacts 29, 38. Thus the sending instrument is set to be capable of transmitting a character which is to succeed one already transmitted.

It will be apparent that with the electrical circuits arranged as in Fig. 1, the key lever 15 at the right being depressed, positive and negative impulses will be transmitted to the polarized magnet 17 by rotation of the brush arm 9 from its start position to its stop position. As disclosed, the first impulse, which is the "start" impulse, will be positive, the current flowing from the plus side of the battery through lead wire 37 and lead wire 45 to the "start" conducting segment 13, through the brush arm 9 and the circular or continuous contact member 12 and the lead wire 47 to the "ticker" 1 and the polarized magnet 17, and by the lead wire 48 back to an intermediate portion of the battery. The second impulse, which is the first selecting impulse, will also be positive, the current flowing from the battery 36 by the lead wire 37 to the fixed contact 38 and through the movable contact 29 and the lead wire 43 to the corresponding conducting segment 6, and thence to the "ticker" and polarized magnet and back to the battery over the route already described. The third impulse, which is the second selecting impulse, will be negative, the current flowing from the battery 36 by the lead wire 39 to the fixed contact 40 and through the movable contact 29 and the lead wire 43 to the corresponding conducting segment 6 and thence to the "ticker" and polarized magnet and back to the battery over the same route as before. The fourth impulse, which is the third selecting impulse, will also be negative, the current flowing from the battery 36 by the lead wire 39 to the fixed contact 40 and through the movable contact 29 and the lead wire 43 to the corresponding conducting segment 6 and thence to the "ticker" and polarized magnet and back to the battery as before. The fifth impulse, which is the fourth selecting impulse, will also be negative, the current flowing from the battery 36 by the lead wire 39 to the fixed contact 40 and through the movable contact 29 and the lead wire 43 to the corresponding conducting segment 6 and thence to the "ticker" and polarized magnet and back to the battery as before. The sixth impulse, which is the fifth selecting impulse, will be positive, the current flowing from the battery 36 by the lead wire 37 to the fixed contact 38 and through the movable contact 29 and the lead wire 43 to the corresponding conducting segment 6, and thence to the "ticker" and polarized magnet and back to the battery as before. The seventh impulse, which is the sixth selecting impulse, will be positive, the current flowing from the battery 36 by the lead wire 37 to the fixed contact 41 and through the movable contact 32 and the lead wire 44 to the corresponding conducting segment 6, and thence to the "ticker" and polarized magnet and back to the battery as before. The eighth impulse, which is the "stop" impulse, will be negative, the current flowing from the battery 36 by the lead wire 39 and the lead wire 46 to the "stop" conducting segment 14, and through the brush arm 9 and the member 12 and the lead wire 47 to the "ticker" and polarized magnet and back to the battery as before. As will be understood, each positive impulse made to pass through the polarized magnet 17 will move the armature 18 in one direction, while each negative impulse made to pass through said polarized magnet will move said armature in opposite direction.

Speaking generally, the shift lever 16 is positioned as in Fig. 1 when letters are to be transmitted by the sending instrument to the receiving apparatus, and each key lever which will transmit a letter with the shift lever positioned as in Fig. 1 will transmit a predetermined number when said shift lever is manipulated, by depression of the left side thereof, to engage the contacts 32, 42. That is to say, each key lever is designed to transmit two characters, desirably a letter and a number, the former when the contacts 32, 41 are engaged and the latter when the contacts 32, 42 are engaged. It will of course be understood that any desired character, letter or number, can be transmitted with the contacts 32, 41 engaged, and any desired character, number or letter, can be transmitted with the contacts 32, 42 engaged.

In Figs. 3, 7 and 8 we have very clearly disclosed mechanism of the receiving apparatus which is directly controlled by and responsive to the actuations of the armature 18 of the polarized magnet 17, as said actuations are caused by depression of each of the different key levers 15 of the sending instrument.

The apparatus as disclosed incorporates five keys 67, including a key corresponding with each of the five selecting keys 19 utilized in the manner as already described to procure in the sending instrument the first five of the six selecting impulses hereinbefore referred to. The apparatus also incorporates a plurality of tumblers 68, there being a tumbler 68 for each character to be transmitted by the sending instrument resting upon the keys 67 and arranged transversely of said keys.

A selecting shaft 69, mounted in any suitable manner and driven by a motor 70 in synchronism with the shaft 7 of the sending instrument, or preferably about one-twelfth of a revolution ahead of said shaft 7, is under the direct control of the armature 18, and by the instrumentality of devices upon said shaft 69 and associated therewith, manipulates each of the keys 67 to cause any tumbler 68 corresponding with a particular key lever 15 which has been depressed to drop into slots 71 of said keys 67 while all of the others of said tumblers remain in elevated position.

The shaft 69 fixedly carries a start and stop cam 72, a flutter cam 73, five impulse cams 74, one corresponding to each of the keys 67, a shift cam 75, a transfer and shift cam 76, a group switch cam 77, and a print cam 78. The shift cam 75 is for the especial purpose of opening and closing a shift switch 79 in the receiving apparatus which corresponds to the switch 41, 32 in the sending instrument and includes a fixed contact 80 and a movable contact 81. The transfer and shift cam 76, the group switch cam 77, and the print cam 78 are for purposes to be hereinafter fully set forth.

An oscillatable shaft 82, which is conveniently mounted parallel with the selecting shaft 69 in spaced relation to the several cams thereof, fixedly carries at one of its ends an L-shape lever including an upstanding arm 83 and a horizontal arm 84 having a hook 85. The start and stop cam 72 includes a lug 86 upon its periphery which is engaged by the hook 85 when the shaft 7 is in stationary position as shown in Fig. 2. As will be obvious, the free end of the armature 18 is at this time in engagement with the arm 83, to hold the hook 85 against the lug 86 to thus preclude rotation of the shaft 69 in the direction of the arrow shown in Fig. 7. A coil spring 87 attached to said arm 83 and to a fixed part is for the purpose of moving said arm toward the right as in Fig. 7 to thus swing the arm 84 upwardly and release the hook 85 from the lug 86 of the start and stop cam 72. It should be here remarked that a negative impulse will cause the armature 18 to be positioned as in Fig. 7 and as in full lines in Fig. 8, in alignment with said arm 83, while a positive impulse will cause said armature to be moved to the dotted line position of Fig. 8, out of alinement with said arm 83. By reference to Fig. 1, and as already described, the "stop" impulse of the sending instrument is negative, so that said armature 18 alines with said arm 83 at the termination of each revolution of the shaft 7. It will also be obvious by reference to said Fig. 1, that the "start" impulse is positive, so that upon the commencement of rotation of the shaft 7, the armature 18 is removed from the arm 83. Immediately, the coil spring 87 acts to swing the arm 84 and its hook 85 away from the lug 86 on the start and stop cam, and to permit the shaft 69 to start a revolution.

The flutter cam 73 includes a series of depressions 88 in its periphery. A flutter cam arm 89 fixed upon the oscillatable shaft 82 rides over the periphery of said flutter cam 73 when the selecting shaft 69 rotates and into and out of the depressions 88, the coil spring 87 urging said arm 89 toward the flutter cam. One of the depressions in said flutter cam 73 is adapted to receive the arm 89 at the instant the coil spring 87 acts to release the hook on the arm 84 from the lug 86 of the start and stop cam 72, and said arm 89 rides upon the periphery of said flutter cam, clear of all of its depressions, during the interval just before the completion of a rotation of the selecting shaft 69, to hold the arm 83 as shown in Fig. 7 to the left of the free end of the armature 18 against the action of the coil spring 87, so that upon the occurrence of the negative (stop) impulse in the sending instrument, said armature 18 can position itself in alinement with said arm 83. It will thus be seen that the selecting shaft 69 makes one complete revolution in synchronism with the shaft 7 and is brought to rest by engagement of the hook 85 with the lug 86 substantially concurrently with the bringing to rest of said shaft 7. Obviously, since each "start" impulse of the sending instrument is positive, and each "stop" impulse of said sending instrument is negative, the selecting shaft 69 when positioned as in Figs. 7 and 8 can be started to rotate, by depression of any key lever 15, substantially concurrently with the start of rotation of the shaft 7, and brought to rest at the completion of a single revolution, as is also said shaft 7. The shaft 69 includes a suitable slip clutch 90 between the cam 72 and the motor 70 for the purpose of allowing said motor to operate while the portion of said shaft 69 having the several cams remains stationary.

The oscillatable shaft 82 fixedly carries five downwardly extending levers 91, one arranged opposite each impulse cam 74 and a downwardly extending lever 92 arranged opposite the shift cam 75. Each of the levers 91, 92 has a lower arc-shaped portion 93 providing spaced apart link setting elements, designated 94 and 95, arranged in alinement with the corresponding cam 74 or 75, as the case may be.

A shaft 96, suitably mounted parallel with the shaft 82, beneath said shaft 82 and at the side thereof adjacent the shaft 69, supports independently oscillatable strike levers 97, including a strike lever for each of the five cams 74 and for the cam 75. Each of the strike levers 97 is of L-shape, including a substantially vertical arm 98 and a substantially horizontal arm 99. Each arm 98 includes a protuberance 100 ridable upon the perimeter of a cam 74 or 75, as the case may be, and a coil spring 101 attached to each arm 98 and to a fixed part urges the protuberance against the cam. Each of the cams 74 and 75 includes a depression 102 adapted to be entered by the corresponding protuberance 100. The arm 99 of each strike lever 97 oscillatably supports, as at 103, an intermediate portion of a link including an upper arcuate part 104 providing portions 105 and 106 adapted to strike against the link setting elements 94 and 95, respectively. An arm 107 of each of the link setting elements carried by the arms 99 extends downwardly from the axis 103.

A shaft 108, suitably mounted parallel with the shaft 82 and beneath said shaft 82 at the side thereof opposite the shaft 69, oscillatably supports five transfer levers 109, one for each cam 74, and a shift lever 110 arranged opposite the cam 75. A portion of each lever 109 and 110 above the shaft 108 includes a slot 111 receiving the lower end of a corresponding arm 107, and a lower portion 112 of each lever 109 and 110 extends downwardly below the shaft 108.

A transfer and shift shaft 113, mounted parallel with the shaft 108, below said shaft 108, oscillatably supports five additional transfer levers 114, one for each transfer lever 109, with which the lower portions 112 of said transfer levers 109 are adapted to cooperate, there being a transfer lever 114 for each key 67. Each transfer lever 114 includes a portion 115 below the shaft 113 which is arranged in an elongated slot 116 of the corresponding key 67, and depressions 117 and 118 above said shaft 113 and at opposite sides thereof, said depressions of each different transfer lever 114 being adapted to be selectively engaged by the lower portion 112 of each of the corresponding transfer levers 109.

The shift lever 110 includes a portion 119 adapted to wipe over an angular part 120 of the movable contact 81 either to cause said movable contact to engage the fixed contact 80 or to allow said movable contact to be disengaged from said fixed contact by reason of the inherent resiliency of said movable contact.

It has been hereinbefore stated that when the "start" impulse, which is a positive impulse caused by passage of the brush arm 9 over the "start" conducting segment 13, is transmitted to the receiving apparatus, the armature 18 is positioned as in dotted lines in Fig. 8 to allow the coil spring 87 to release the hook 85 on the arm 84 from the lug 86 of the start and stop cam 72 to allow the shaft 69 to complete one revolution. After the arm 84 swings away from the lug 86, the flutter cam arm 89 rides into the corresponding depression in the flutter cam 73. Upon continued rotation of said shaft 69, the arm 89 rides up out of the depression which it has entered and the next depression in the cam 73 approaches said arm 89. As the rotation of the shaft 69 further continues, said arm 89 positions itself at the location of the next depression 88 in the sequence at the time the depression 102 of the first impulse cam 74, (controlling the first key 67), comes to position beneath the corresponding protuberance 100. The corresponding coil spring 101 causes said protuberance to ride down into said depression 102 to elevate the corresponding arm 99 and with it, its link including the arcuate part 104. When a positive impulse is transmitted to the polarized magnet at this interval, the armature 18 will be positioned as in Fig. 7 to resist action of the coil spring 87 tending to rock the shaft 82 in direction to move the arm 89 into the depression 88 which it is opposite. Thus the lever 21 opposite said first impulse cam 74 will be held to the right in Fig. 7, and when the protuberance 100 upon the strike lever 97 enters the depression 102 by reason of the pull of the coil spring 101, the portion 105 of the arcuate part of the corresponding link will strike against the link setting element 94 just above it, the one at the left in Fig. 7, to cause the lower portion 107 of said link to be swung to the right in a manner which is apparent. When, however, a negative impulse is upon the polarized magnet when a protuberance 100 is opposite a depression 102 and the flutter cam arm 89 is opposite a corresponding depression 88, the armature 18 will be positioned as in dotted lines in Fig. 8 and the coil spring 87 will rock the shaft 82 to swing the corresponding lever 91 to the left to cause the portion 106 of the arcuate part 104 of the corresponding link to strike against the link setting element 95 at the right to thus swing the lower portion 107 of said link to the left. In turn, the swinging of the lower portion 107 of a link to the left will swing the lower portion 112 of a transfer lever 109 to the right, and the swinging of the lower portion 107 of a link to the right will swing the lower portion 112 of a transfer lever 109 to the left.

The transfer and shift shaft 113 is mounted in elongated slots 121 upon the frame of the apparatus to be vertically movable. A frame 122, suitably mounted as at 123, is adapted to be actuated to swing said shaft 113 upwardly, and a coil spring 124 attached to said frame 122 and to a fixed part is adapted to normally hold the shaft 113 in its depressed position. An arm 125 upon the frame 122 is adapted to be engaged by a protuberance 126 upon the transfer and shift cam 76 to swing said frame 122, together with the shaft 113, upwardly. When the transfer and shift cam 113 moves upwardly, it carries with it the transfer levers 114. Upon upward movement of said levers 114, the lower portions thereof move upwardly in the elongated slots 116 but do not become disengaged from said slots. Upward movement of the transfer and shift shaft 113 by engagement of the protuberance 126 on the cam 76 with the arm 125, moves a depression 117 or 118 of each transfer lever 114 to strike against a transfer lever 109, those transfer levers which are positioned at the left when said shaft 113 is elevated being struck by the depressions 117, and those transfer levers 109 which are positioned at the right when said shaft 113 is elevated being engaged by the depressions 118. The striking engagements between the transfer levers 109 and the transfer levers 114 cause each transfer lever 114 to move its corresponding key 67 toward the right when the impact is at the location of the depression 117 at the left, and to move its corresponding key 67 toward the left when the impact is at the location of the depression 118 at the right, as will be understood.

As shown in Fig. 7, the keys 67 are positioned to permit the tumbler 68 corresponding to the letter C to drop in slots 71 of said keys 67 which aline beneath said tumbler 68, the letter C being the same letter shown as being transmitted by the sending instrument. In said Fig. 7 the shaft 69 and its several cams are in position corresponding with the position of the shaft 7 in Fig. 2 but the transfer levers 109, the shift lever 110 and the transfer levers 114 are shown as having been actuated to move the keys 67 to the positions which they would occupy at the completion of the rotation of the shaft 7 which has just been started in Fig. 1. During the rotation of said shaft 69 which moved said levers 109, 110 and 114 to the positions shown in said Fig. 7, the uppermost transfer lever 109 was the first one actuated, when the corresponding strike lever rode into its depression 102. At this time the impulse was positive to position the lower portion 112 of the corresponding transfer lever 109 at the right by striking of the portion 106 against the link setting element 95. The next adjacent transfer lever 109 was then actuated, when the corresponding strike lever rode into its depression 102. At this time the impulse was negative to position the lower portion 112 of the corresponding transfer lever 109 at the left by striking of the portion 105 against the link setting element 94. The next transfer lever 109 actuated was the one corresponding to the third impulse cam 74 from the top in Fig. 7. At this time the impulse was also negative to position the lower portion 112 of the corresponding transfer lever 109 at the left as before. The next transfer lever 109 actuated was the one corresponding to the fourth impulse cam 74 from the top in said Fig. 7. At this time the impulse was also negative to position the lower portion 112 of the corresponding transfer lever 109 at the left as before. The next transfer lever 109 actuated was the one corresponding to the fifth impulse cam 74 from the top in Fig. 7. At this time the impulse was positive to position the lower portion 112 of the corresponding transfer lever 109 at the right, in the same manner as described in connection with the first impulse cam 74.

As shown in Fig. 1, the shift lever 16 being disclosed in its shift to letters position, the impulse at the polarized magnet 17 was positive when the corresponding protuberance 100 rode into the depression 102 of the shift cam 75. Accordingly, the lower portion of the shift lever 110 was moved to the right to ride clear of the angular part 120 of the movable contact 81 to cause the contacts 80 and 81 to be disengaged. It will be evident that when the shift lever 16 is in shift to numbers position, the lower portion of the shift lever 110 will be moved to the left in engagement with the angular part 120 to cause the contacts 80 and 81 to engage. When then all of the transfer levers 109 had been set by rotation of the shaft 69 to the extent as just described, upon continued rotation of said shaft 69, the protuberance 126 of the transfer and shift cam 76 rode against the arm 125 and thus swung the transfer and shift shaft 113 upwardly. This caused all of the depressions 117 of the transfer levers 114 to strike against all of the lower portions 112 of the transfer levers 109 positioned at the left, and all of the depressions 118 of said transfer levers 114 to strike against all of the lower portions 112 of said transfer levers 109 positioned at the right. The lower portions 115 of the transfer levers 114 which received impact at the depressions 117 were moved to the right, and the lower portions 115 of all of said transfer levers 114 which received impact at the depressions 118 were moved to the left. As disclosed, the first and fifth keys 67 were moved to the left and the second, third and fourth keys 67 were moved to the right, this being the C combination of said keys 67 when the contacts 80 and 81 are disengaged. Were the contacts 80 and 81 engaged, the arrangement of the keys 67 as just described would be a number arrangement, as for example, the number 3, the tumbler 68 corresponding to this number being thus alined with slots 71 in all of the keys 67. As more clearly shown in Figs. 3 and 7, when a tumbler 68 falls into alined slots 71 of the keys 67, as, for example, the tumbler corresponding with the letter C, it causes a movable contact 127 to engage a fixed contact 128 to complete a circuit, designated A, for the letter C as now described, traced from a battery 129 by a lead wire 179, a lead wire 196, and a lead wire 130 to the contact 127, thence by the contact 128 and a lead wire 131 to a magnet 132 for operating a group-one key 133 assisting in the control of a tumbler 134, thence by a lead wire 135 to group-one fixed contact 136, thence through a movable contact 137 of said group switch which is at this time in engagement with fixed contact 136, thence by a lead wire 138 to a fixed contact 139 of a transfer switch, and thence by a movable contact 140 of said transfer switch and a lead wire 141 back to the battery 129.

The apparatus incorporates a plurality of tumblers 134, one for each stock or heading opposite which a quotation or item of information is adapted to be positioned, and each tumbler controls an electric circuit leading to a printing mechanism, one for each stock or heading, of a print unit presently to be described. The apparatus also incorporates a plurality of groups of keys 133, there being a key group under each of the arms of the tumblers 134, and each key of each group is operated by a magnet 132 controlled by a circuit such as the circuit A which is adapted to operate the group-one key for assisting in the control of a tumbler 134, say, for example, a tumbler for a stock designated CA.

Each tumbler 134 will have as many arms 142 as there are call letters, as, for example, of a stock in the particular call combination. Each group of keys 133 may desirably include twenty-six keys, one for each letter of the alphabet, and the arrangement will be such that no tumbler can be dropped to close its corresponding printing mechanism circuit until a notch in the proper key under each of its arms has been moved into alinement with the tumbler.

As disclosed, the opposite ends of each key 133 of each group are supported to be slid horizontally and are guided in any suitable manner, as indicated at 143, and notches 144 in the keys normally aline with all of the tumblers except the particular tumbler controlled by a key which includes a notch 145 situated at one side of the tumbler. The tumblers are guided, as indicated at 146, for vertical movement. A coil spring 147 normally holds a support or armature 148 in elevated position against the lower extremities of the tumblers to insure that each tumbler will normally remain in elevated position. The notches of the keys are so spaced that when a key moves into alinement with its corresponding tumbler or tumblers, all other tumblers will be out of alinement with the notches of the key which has moved.

When the circuit A having the magnet 132 for operating the group-one key assisting in, say, the control of the CA tumbler, designated 149 in Fig. 3, is closed by the movable contact 127 engaging the fixed contact 128 corresponding to the letter C as above described, the said magnet attracts pivoted pole piece 150 turning shaft 151, suitably mounted as at 152, having cam 153, and the cam engages a lug 154 upon the corresponding key 133, sliding said key endwise to bring its notch 145 into alinement with the upper arm of the corresponding tumbler 149. There may be other stocks or headings beginning with the letter C, and, if so, the group-one key assisting in the control of the CA tumbler will include a notch 145 for each of said stocks or headings.

Group-one fixed contact 136 and movable contact 137 are included in a group selector or switch, designated 155, more clearly shown in Figs. 3 and 15. Said group selector or switch 155 includes a suitably mounted shaft 156 fixedly carrying a ratchet wheel 157 which is urged by a coil spring 188 attached to said ratchet wheel and to a fixed part, to rotate in counter-clockwise direction to position the movable contact 137 against a stop pin 158 when said movable contact 137 is engaging an initial fixed contact 159 which is in advance of the group-one fixed contact 136. See Fig. 15.

An intermediate part of a group switch actuating lever 160, more clearly disclosed in Figs. 3 and 7, is mounted upon the shaft 96, the upper arm of said lever 160 having a lug 161 ridable upon the periphery of the group switch cam 77 and over a protuberance 162 thereon, and the lower arm of the lever 160 being pivotally attached, as at 163, to an actuating pawl 164 urged against the teeth of the ratchet wheel 157 by a coil spring 165 attached to said actuating pawl and to a fixed part. A checking pawl, designated 166, for the ratchet wheel is pivotally supported at 167, and a coil spring 168 attached to the checking pawl and to a fixed part urges said checking pawl 166 toward the ratchet wheel. A coil spring 169 attached to the lower arm of the group switch actuating lever 160 and to a fixed part urges the lug 161 against the cam 77.

A magnet 170 of the group selector or switch 155 is normally deenergized, and an armature 171, pivoted as at 172 adjacent said magnet 170, is held away from the magnet, as in Fig. 3, by a coil spring 173 when said magnet is deenergized. The coil spring 173 is attached to an arm 174 of a latch 175 pivoted upon the free end of the armature 171, as at 176, and when the magnet 170 is energized, as in Fig. 15, to attract said armature 171, the latch 175 is positioned beneath extensions 177 and 178 of the actuating pawl 164 and the checking pawl 166, respectively. At this same time the arm 174 of said latch 175 rests upon said actuating pawl 164 to aline with a shoulder thereof.

The magnet 170 is included in a circuit, designated B, traced from the battery 129 through the lead wire 179 to the fixed contact 80, thence to the movable contact 81 and through a lead wire 180 to said magnet 170, thence through a lead wire 181 to a fixed contact 182 of the transfer switch having the movable contact 140, said movable contact being adapted to engage the fixed contact 182 as well as the fixed contact 139, and thence by said movable contact 140 and the lead wire 141 back to the battery. It will be apparent that when the contacts 80 and 81 are disengaged, the magnet 170 will be deenergized. The transfer switch including the contacts 139, 140 and 182 also includes a magnet 183 which when deenergized allows the contacts 139 and 140 to be engaged and the contacts 140 and 182 to be disengaged by reason of the resiliency of said contact 140, and which when energized causes the contacts 140 and 182 to be engaged and the contacts 139 and 140 to be disengaged, a pivoted armature 184 for said magnet 183 having fixed thereto an arm 185 adapted to move said contact 180 away from the contact 139 and against the contact 182 when said armature 184 is attracted by said magnet 183. The magnet 183 is included in a circuit, designated C, which is traced from the battery 129 by the lead wire 179 to the contact 80, thence to the contact 181 and through a lead wire 186 to said magnet 183, and thence by a lead wire 187 to the lead wire 141 and back to the battery. It will thus be seen that when the contacts 80 and 81 are engaged, the magnet 183 will be energized to cause the contacts 140 and 182 to be engaged to thus close the circuit including the magnet 170.

For the sake of clearness, it should be here remarked that the ratchet wheel 157 is set in position against the stop pin 158 by deenergization of the magnet 170. When said magnet is deenergized, with the parts positioned as in Fig. 15, the coil spring 173 acts to raise the latch 175, and said latch upon being raised lifts the actuating pawl 164 and the checking pawl 166 clear of the teeth of the ratchet wheel 157. Immediately, the coil spring 188 acts to rotate the ratchet wheel 157 in counter-clockwise direction and swing the movable contact 137 to its position against the stop pin 158, when said movable contact 137 engages the initial fixed contact 159 as in Fig. 15. Thereafter, upon further upward swinging movement of the armature 171 with the latch 175, the actuating pawl 164 and the checking pawl 166 are released from said latch 175 to the actions of the coil springs 165 and 168 which returns said pawls 164 and 166 against the teeth of the ratchet wheel arranged opposite said pawls when in said initial position, as also shown in Fig. 15. Supposing the parts of the group selector or switch 155 to be positioned as just described and the magnet 170 to be deenergized so that the coil spring 174 holds the armature 171 away from said magnet and the latch 175 clear of the pawls when the shaft 69 is rotating at or adjacent its position causing the corresponding protuberance 100 to ride into the depression 102 of the shift cam 75 and the lug 161 on the group switch actuating lever 160 is struck by the protuberance 162 upon the group switch cam 77, the actuating pawl 164 will be drawn rearwardly of the ratchet wheel 157 to position itself behind the next preceding tooth of said ratchet wheel, and upon said lug 161 clearing said protuberance 162, the coil spring 169 will act upon the arm 160 to push the actuating pawl 164 ahead, to the right as shown in Figs. 3, 7 and 15, to thus rotate the movable contact 137 from its position as in Fig. 15 to its position as in Fig. 3, into engagement with the group-one fixed contact 136. Upon succeeding rotations of the shaft 69, the movable contact 137 will be rotated step by step to a group-two fixed contact 189 and a group-three fixed contact 190, in the manner as already described. The group-two fixed contact 189 and the group-three fixed contact 190 are in all circuits for the second and third groups of keys, which circuits are similar to circuit A.

Supposing that upon release of the C key lever 15 of the sending instrument the next lever depressed corresponds to A, the A tumbler 68 becomes depressed, in the manner as already described, (while the C tumbler 68 which was depressed is elevated as will be obvious), to close a circuit, corresponding to the circuit A, but through a magnet 191 of group-two keys 192 corresponding to the letter A, it being remembered that upon the next rotation of the shaft 69, responsive to the depression of the key lever 15 corresponding to the letter A, the movable contact 137 of the group selector or switch 155 moves from its position of engagement with the group-one fixed contact 136 to its position of engagement with the group-two fixed contact 189. The magnet 191 is for operating the group-two key corresponding with the letter A assisting in the control of the tumbler or tumblers the second call letter of which is A, as, for example, the CA tumbler as disclosed, and actuates said key in the manner as already described in connection with the group-one keys and the letter C. Provided the CA tumbler has but two arms 142 controlled by keys of two groups of keys, a notch 145 of each corresponding key will now be alined with each arm of said CA tumbler, but all other tumblers will be engaged by flat surfaces of the corresponding keys between the notches 144. The CA tumbler cannot yet drop, however, because it, as well as the other tumblers, is held in elevated position by the cooperation of the armature or support 148 and the coil spring 147.

The A key of the second group will also include a notch 145 for each stock or heading whose second call letter is A, as will each key of each group have a notch 145 to correspond with each stock or heading having a corresponding call letter.

Assuming that the shift lever 16 is now operated to shift to numbers position and that a key lever 15 upon the sending instrument is depressed, the circuits B and C are closed when the cam 75 reaches position, as the shaft 69 rotates, to actuate the movable contact 81 to engage the fixed contact 80, as already described, and a circuit, designated D, is also made, the said circuit D being traced from the battery 129 through the lead wire 179 to the contact 80, thence by the contact 81 and through the lead wire 180 to a lead wire 193, thence through said lead wire 193 to a magnet 194, and thence by a lead wire 195 to the lead wire 181 and back to the battery by the contacts 182 and 140 and the lead wire 141. The magnet 194 is arranged adjacent the support or armature 148, below said support or armature. Energization of said magnet 194 causes the support or armature 148 to be attracted against the action of the coil spring 147, and removal of the support from beneath the CA tumbler allows this, or any other tumbler all of the arms of which aline with key slots, to drop. After a tumbler 134, such as the CA tumbler, is selected, the succeeding action in the receiving apparatus is to post a quotation opposite the corresponding stock, and movement of the shift lever 16 to shift to numbers position is a prerequisite to the accomplishment of the posting operation, as well as to the accomplishment of the dropping of the selected tumbler 134. Each tumbler 134, as, for example, the CA tumbler 149, upon dropping, causes a movable contact 197 to engage a fixed contact 198.

Each printing unit, as, for example, the CA printing unit disclosed in Fig. 21, includes a plurality of selecting magnets 199, a tape-feed magnet 200, and a printing magnet 201.

A printing switch actuating lever 202 is mounted upon the shaft 96 and includes an arm 203 ridable upon the periphery of the print cam 78, and an arm 204 situated below a movable contact 205 of a switch 206 having a fixed contact 207. The periphery of the print cam 78 includes a cut-away portion 208 extending about more than one-half of said periphery, and a coil spring 209 attached to the arm 203 and to a fixed part urges the printing switch actuating lever 202 against the print cam 78. As the shaft 69 rotates, the contacts 205 and 207 are caused to be disengaged when the arm 203 is riding upon the higher part of the print cam 78, and to be engaged when said arm 203 is riding upon the lower part of said cam 78. That is to say, when the arm 203 is upon the higher part of the cam 78, the contact 205 is moved by its resiliency away from the contact 207, and when said arm 203 is riding over the lower part of said cam, the coil spring 209 acts to cause the arm 204 to elevate the contact 205 into engagement with the contact 207. Preferably, the arrangement is such that the arm 203 of the printing switch actuating lever 202 rides from the higher to the lower portion of said cam 78 after the transfer and shift cam 76 in a cycle is actuated and before the first cam 74 in the next succeeding cycle is actuated, and said arm 203 desirably rides upon the lower portion of said cam 78 until the interval between the actuations of the fifth cam 74 and the cam 75, when said arm 203 rides upon the higher portion of said cam 78.

When the contacts 205 and 207 are engaged while the contacts 197 and 198 are also engaged, as by the CA tumbler 149 when depressed, a circuit, designated E, is made through the tape-feed magnet 200, said circuit being traced from the battery 129 through the lead wire 179 to the contact 205, thence to the contact 207 and through a lead wire 210 and a lead wire 211 to said magnet 200, thence through a lead wire 212 and a lead wire 213 to a lead wire 214, thence through the lead wire 214 to the contact 198, thence through the contact 197 and a lead wire 215 to the lead wire 195, and thence through the lead wires 195 and 181, the contacts 182 and 140, and the lead wire 141 back to the battery.

Likewise, when the contacts 205 and 207 are engaged while the contacts 197 and 198 are also engaged, a circuit, designated F, is made through the printing magnet 201, said circuit being traced from the battery 129 through the lead wire 179 to the contact 205, thence to the contact 207 and through the lead wire 210 and a lead wire 216 to said magnet 201, thence through a lead wire 217 and the lead wire 213 to the lead wire 214, and back to the battery as before.

Likewise, when the contacts 205 and 207 are engaged while the contacts 197 and 198 are also engaged, and a tumbler 68, as, for example, the one designated 218, in Fig. 3, is depressed to close the corresponding contacts 127 and 128, a circuit, designated G, is made through the one of said selecting magnets 199 corresponding to said tumbler, such as 218, which is depressed. All of the circuits through the selecting magnets 199 are similar, the one including the tumbler 218 being traced from the battery 129 through the lead wires 179, 196 and 130 to the contact 127 of said tumbler 218, thence to the corresponding contact 128 and through a lead wire 219 and a lead wire 220 to a selecting magnet 199, the one at the left as shown, and thence through the lead wire 213 and the lead wire 214 back to the battery as before. Lead wires shown parallel to the lead wire 219 in Figs. 3 and 21 are each connected to other selecting magnets 199, respectively, which are suitably connected to the lead wire 213 by the lead wire 217, as will be apparent.

Referring more particularly to Figs. 21 and 39 to 46, each printing unit includes, in addition to the selecting magnets 199, the tape-feed magnet 200, and the printing magnet or magnets 201, a type element 221 composed of parallel rods 222 which are slidably mounted in brackets 223 fixed upon a base 224 which supports the magnets 199 and 201. The rods 222 together form a composite character, and different combinations each consisting of various numbers of said rods are adapted to engage the rearward face of a tape 226. The opposite end portions 227 of said rods include heads 228, one on each rod, and coil springs 229 on the rods and between the heads and the adjacent bracket 223 normally hold all of the ends 225 of the rods in receded, alining position. Each combination of rods which is distended at the ends 225 thereof is adapted to form a number, or other character, as, for example, the heavy line numbers 2 and 3 in Figs. 43 and 44. To this end, a plurality of spaced apart plates 230, each having openings 231 receiving the rods 222, are arranged on the rods transversely thereof, as will be most clear from Fig. 41. Each plate 230 is capable of being separately actuated in direction toward the end 225 of the rods 222 to distend its own particular combination of rods to provide a number, or other character, there being as many plates 230 arranged along the rods as there are characters to be printed. The rods 222 are freely slidable in the plates, with the exception that rods which are to be manipulated by a plate to provide its print character are equipped with fixed collars, designated 232, which are engaged by said plate when moved toward the ends 225 of said rods. That is to say, each plate 230 upon being actuated, toward the left in Figs. 39, 40 and 42, carries with it a combination of rods to provide a character when distended by engagement of a collar fixed upon each rod of said combination at position adjacent to or contiguous with said mentioned plate. It will be evident that the coil springs 229 will hold the remainder of the rods in receded position, no matter what combination of rods is distended, and that the rods of a distended combination will return to receded position upon release of the corresponding plate 230.

There is in the apparatus a selecting magnet 199 for each plate 230, and each selecting magnet 199 is adapted to the purpose of assisting in the actuation of its corresponding plate 230. The base 224 supports U-brackets 233, one for each magnet 199, positioned below the corresponding plate 230. The arms of each U-bracket 233 pivotally support, as at 234, upstanding arms 235 and 236 of a U-shape actuating element. The arm 236 of each actuating element is arranged in contiguous relation with the face of the corresponding plate 230 which is opposite the corresponding collars 232. The arm 235 of each actuating element is of resilient nature to be bendable from and toward the arm 236, but is of dimension to be non-bendable in direction perpendicular to the direction in which it is bendable. An armature 237 for each magnet 199 is pivotally supported adjacent the magnet as at 238, and carries a flexible element 239 which extends upwardly from said armature. Each arm 235 includes a slotted upper flange 240 fitted about said flexible element 239, and a coil spring 241 attached to said arm 235 and to said flexible element 239 holds these parts to each other.

An armature 242 for the printing magnet or magnets 201 is pivoted upon the base 224, as at 243. A printing lever 244 is pivoted to the free end of the armature 242, as at 245, and extends parallel to all of the flexible elements 239, in closely adjacent relation to said flexible elements, said printing lever 244 being suitably guided in brackets 246 upon said base 224. The printing lever 244 is provided with slots 247, one for each flexible element 239, which slots are arranged in alining relation to said flexible elements when the magnet 201 is deenergized and the armature 242 is held in withdrawn position, as by a coil spring 248 attached to said armature and to a fixed part.

A housing 249 supports a pair of shafts 250 and 251, the former carrying a rotatable reel 252 which supports the tape 226 fed to the printing or type element 221, and the latter carrying a rotatable take-up reel 253 which eventually receives all of the printed tape. The course of the tape 226 from the reel 252 to the reel 253 is past the ends 225 of the rods 222 and about a frame or board 254 and a roller 255, the tape when printed being read from the side of the frame 254 opposite the reels 252 and 253.

A printing press plate 256 is arranged at the side of the tape 226 opposite the rods 222, and a type ribbon 257 is made to travel over said plate, between the tape and plate, in any suitable manner. As shown, the type ribbon 257 is carried by larger rolls 258 and passes over smaller rolls 259 situated at the opposite ends of the printing press plate 256. It will be evident that the rods 222 strike against the rearward face of the tape 226, and that the impression of the rods is made by the type ribbon upon the forward face of said tape, which face eventually rides over the outer surfaces of the frame or board 254 to be there visible.

The tape-feed magnet 200 assists in the feeding of the tape from the reel 252 to the printing or type element 221. An armature 260 for said magnet 200 is pivotally supported at 261, as more clearly shown in Fig. 45, and integrally carries an arm 262 which pivotally supports, as at 263, a feed device 264 which has a presser foot 265 adapted to engage the tape 226 and hold it against a presser plate 266 at the side of said tape opposite said magnet 200. A small leaf spring 267 is suitably attached to the arm 262 to lie beneath a lug 268 upon the feed device 264 to hold the presser foot 265 in engagement with the tape when a coil spring 288, attached to the arm 262 and to a fixed part, holds the armature 260 away from the magnet 200 when said magnet is deenergized. Supposing the magnet 200 to be deenergized and the parts as just described to be positioned as shown in Fig. 45, upon energization of said magnet 200, the armature 260 is attracted to swing the arm 262 toward the reel 252 and the leaf spring 267 away from the lug 268 to thus allow the feed device 264 to ease away from the tape 226 and move rearwardly thereover without pressing said tape against the presser plate 266 and without moving said tape. When then the magnet 200 is deenergized, the coil spring 288 acts to swing the arm 262 in direction away from the reel 252 and toward the printing or type element 221, and the leaf spring 267 engages against the lug 268 to actuate the feed device to push its foot 265 against the tape, to thus cause said tape to be pushed against the presser plate 266 and to be given a feeding movement. When the magnet 200 is again energized, the presser foot 265 will, obviously, be eased away from the tape as before and returned back to position for starting a new feeding movement of said tape.

Each printing unit includes a take-up reel magnet or magnets 269, the one disclosed being suitably connected in a circuit (not shown) from the battery 129, said circuit including lead wires 270 and 271 which are attached directly to said magnet 269, and also including in the plus side of the circuit a contact 272, shown more clearly in Fig. 8, which engages a circumferential contact portion 273 fixed on the shaft 69 to rotate therewith, and a contact 274 which intermittently wipes spaced apart contact portions 275 upon said circumferential contact portion 273 as said shaft 69 rotates. The take-up reel magnet or magnets 269 are constructed to respond to the making and breaking of the circuit therethrough, as the contact 274 wipes over the spaced apart contact portions 275, to intermittently attract an armature 276 pivoted as at 277, and a coil spring 278, attached to the armature at 279 (see Fig. 46) and to a fixed part, is adapted to withdraw said armature from said magnet each time the circuit through the magnet is broken. A pawl or link 280 pivoted upon the armature 276, as at 281, includes a free pointed end adapted to engage teeth of a ratchet 282 rotatable upon the shaft 251, and a coil spring 283 about said shaft and attached to said ratchet as at 284 and also attached to the reel 253 provides a resilient connection between the ratchet and reel. A suitable detent 285 attached to the pawl or link 280, as by a spring 286 supported upon the housing as at 287, prevents return movement of the ratchet. It will be evident that the actuations of the armature 276 caused by the spring 278 and energizations and deenergizations of the magnets 269, will actuate the pawl or link 280 to rotate the ratchet 282 and thus rotate the reel 253 to keep the length of tape between the reels 252 and 253 taut. We could, of course, incorporate mechanism in our apparatus to keep the circuit through the magnets 269 broken at all times except when there is slack in the tape, and such a mechanism will be incorporated in the apparatus in practice.

The manner in which each printing unit operates will be obvious. As before mentioned, when the shift lever 16 is at shift to numbers position the circuit G is made. Said circuit will be through the particular selecting magnet 199 corresponding to the number tumbler, such as 218 in Fig. 3, depressed. Said magnet 199 will, accordingly, attract its magnet 237 to cause the corresponding flexible element 239 to engage in the adjacent slot 247 in the printing lever 244. When then the printing switch actuating lever 202 immediately thereafter rides from the higher to the lower portion of the print cam 78, the circuits E and F also become closed. The circuit E, which is through the tape-feed magnet 200, energizes said magnet to move the feed device 264 to feeding position, as already described. The circuit F, which is through the printing magnets 201, energizes said magnets and causes the armature 242 and the printing lever 244 to be moved toward the printing press plate 256. Said printing lever being at this time interengaged with the flexible element 239, to which the arm 235 is attached, said flexible element is flexed or bent, to the left in Figs. 39 and 40, and the arms 235 and 236 are rocked in their bearings 234, said arm 236 moving the corresponding plate 230 toward the printing press plate, which plate 230, through the instrumentality of the corresponding collars 232 on the appropriate rods 222, causes this set of rods to move forwardly and strike the rearward face of the tape and push the forward face of said tape against the type ribbon 257 upon said printing press plate 256. Thereafter, the circuit G is broken, during the next succeeding rotation of the shaft 69, when the transfer and shift arm 125 is actuated to shift the keys 67 to thus disengage the contacts 127 and 128 in said circuit G, and the circuits E and F are broken, during the mentioned succeeding rotation of said shaft 69, when the printing switch actuating lever 202 rides from the low to the high part of said print cam 78. Breaking of the circuits E, F and G causes the selecting magnet 199 which was energized and the tape-feed magnet 200 and the printing magnets 201 to become deenergized. The flexible element 239 which was engaged in the slot 247 is pulled from said slot by the coil spring 241, and the coil springs 229 return the rods 222 which were distended to their receded positions. Upon the release of the flexible element 239 from the printing lever 244, the coil spring 246 withdraws the armature 242 from the magnet 201 and returns said printing lever 244 to its inoperative position with a slot 247 alining with each flexible element 239. Upon release of the armature 260 by the tape-feed magnet 200, the coil spring 288 moves the arm 262 toward the printing or type element 221, to thus actuate the feed device 264 to advance the tape 226 one step, ready for the next printing operation. Thus the printing unit is reset, ready for the printing of the next succeeding number or character, and said printing unit operates in the manner as already set forth to print said next succeeding, and all succeeding numbers or characters.

When the selecting and posting or printing of a quotation opposite a heading, such as a CA heading, on a board is complete, and it is desired to reset the apparatus to select and post an additional quotation or item of information opposite a different stock or heading, the shift lever 16 is actuated to shift to letters position and the first call letter of said different stock or heading is depressed. When during the next succeeding rotation of the shaft 69 the shift cam 75 allows the contacts 80 and 81 to become disengaged, all of the circuits B, including the magnet 170, C, including the magnet 183, and D, including the magnet 194, are deenergized, said circuits B, C and D being traced through said contacts 80 and 81. Deenergization of the magnet 170 allows the movable contact 137 of the group switch to position itself against the stop pin 158 and in engagement with the initial fixed contact 159, in the manner as already fully described. Deenergization of the magnet 183 allows the movable contact 140 to become disengaged from the fixed contact 182 and to engage the fixed contact 139. Deenergization of the magnet 194 allows the coil spring 147 to act to elevate the depressed tumbler 134.

The engagement of the movable contact 137 with the initial fixed contact 159 makes a circuit, designated H, through a magnet 289, said circuit being traced from the battery 129 through the lead wire 179 and the lead wire 196 to a lead wire 290, thence through said magnet 289 and a lead wire 291 to said initial fixed contact 159, thence through the movable contact 137 and the lead wire 138 to the contact 139, and thence to the contact 140 and through the lead wire 141 back to the battery. Energization of the magnet 289 causes the armature 292, suitably pivoted at 293, to be attracted, and an arm 294 of said armature, (there being an armature 292 with arm 294 for each group of keys 133), to return keys which were actuated by magnets 132, as, for example, the C key in group one and the A key in group two, to their normal positions.

It is to be understood that each magnet 132 was deenergized when the corresponding contacts 127 and 128 were disengaged, to break the circuit, such as the circuit A, which energized a magnet 132, so that these magnets 132 will offer no interference to the action of the magnets 289 returning the actuated key 132 in each group to normal position.

When then the shift lever 16 is actuated from shift to letters position to shift to numbers position, the operations as described are repeated.

Assuming that the apparatus as thus far described is being used for receiving and posting stock-market quotations, then each stock will have its name preferably permanently located on a board, such as the board in Fig. 4, and the printing mechanism circuits will be duplicated to include a printing unit of the general construction as described for each stock. The tape for each printing unit will be arranged in about the manner as disclosed in Figs. 4, 21, 39 and 45, so that each quotation directly after being posted will desirably be opposite the heading designating the stock to which the quotation relates.

The apparatus includes, (in addition to the mechanism as described for selecting stock-market quotations and for posting each selected quotation upon a "ticker board" opposite a designated stock to which the selected quotation relates, to thus exhibit the trend of the market), mechanism for posting the opening, the maximum, and/or the minimum quotation, as for a day's stock-market reports, opposite each designated stock so receiving a selected quotation exhibiting the market trend, as well as mechanism whereby posted opening, maximum, and/or minimum quotations relating to the various stocks can be readily returned to zero or normal positions at the close or opening of a day's stock-market quotations, and thus positioned to be again operable to post the opening, the maximum, and/or the minimum quotations for the various stocks.

In Fig. 49 we have disclosed a portion of a type of mechanism of the apparatus for posting opening, maximum, and/or minimum quotations of the stock-market. In Figs. 50, 51 and 52 we have disclosed features detailing the portion of the mechanism of Fig. 49, and additionally detailing features relating specifically to the mechanism for indicating maximum and/or minimum quotations, but not present in the mechanism for indicating opening quotations. It is to be understood that there will be a separate mechanism for indicating opening, maximum, and/or minimum quotations associated with each stock unit, as, for example, the stock unit of Fig. 21, of the apparatus; the mechanism for indicating opening quotations being designated 295, the mechanism for indicating maximum quotations being designated 296, and the mechanism for indicating minimum quotations being designated 297 in said Fig. 21.

As shown more clearly in Fig. 3a, the mechanism for indicating opening quotations includes four groups of magnets, one group designated 298 corresponding to hundreds, a second group 299 corresponding to tens, a third group 300 corresponding to units, and a fourth group 301 corresponding to fractions. The individual magnets of the various groups 298, 299, 300 and 301 are indicated 302 in Figs. 49, 50 and 51.

In Fig. 49 we have disclosed a composite character 303 suitably made up of separate sections 304, each of which sections is adapted to be individually lighted, as by an electric lamp or lamps, not shown, in such manner that a group or combination of lighted lamps will present a definite and predetermined number or character to the vision. There will be as many magnets 302 as there are to be separate numbers or characters visible upon the composite character 303, and each magnet 302 assists in the controlling of a plurality of circuits for lighting and extinguishing its own particular group of combination of lamps.

It will be necessary to specifically describe the manner in which a single magnet 302 assists in lighting and extinguishing its group or combination of lamps, all of the different groups or combinations of lamps being lighted and extinguished according to the same principle. A set of posting magnets 305, one for each of the groups 298, 299, 300 and 301, each have a single armature 306 pivoted adjacent said magnets as at 307. The free end of the armature 307 is pivoted, as at 308, to a posting bar 309 extending past all of the magnets 302 of the set and fixedly carrying actuator wings 310, including a wing 310 for each magnet 302 of said set of magnets. Each magnet 302 has an armature 311 which is suitably pivoted at 312, and a coil spring 313 normally holds said armature away from the magnet 302. The free end of each armature 311 includes a concavity 314 which receives an arm of the corresponding wing 310. The other arm of said wing 310 extends at the side of the posting bar 309 opposite the armature 311.

A suitably mounted frame 315, one for each magnet 302, supports spaced apart contact clips 316. An oscillatable shaft 317 which is suitably mounted in the frame 315 carries a yoke 318 upon one of its ends, and also carries spaced apart cam elements 319 along its length, including a cam element 319 for each set of spaced apart contact clips 316. Each yoke 318 is arranged adjacent a wing 310 in such manner that when the posting bar 309 is actuated by energization of the magnets 305, one arm or the other of all of the wings 310 will strike against a single arm of each yoke 318, the arm of the yoke which the wing strikes depending upon whether or not the corresponding magnet 302 is energized or deenergized. That is to say, and referring more specifically to Fig. 51, when a magnet 302 is energized to hold its armature to it, the adjacent arm of the corresponding wing 310 will be clear of the adjacent arm of the yoke and the opposite arm of said wing 310 will engage the opposite arm of said yoke, and when a magnet 302 is deenergized, so that its coil spring 313 holds its armature away from said magnet, the opposite arm of said corresponding wing 310 will be clear of the opposite arm of said yoke and the adjacent arm of wing 310 will engage the adjacent arm of said yoke. Obviously, a wing 310 engaging an arm of a yoke 318 will rotate its corresponding shaft 317 in one direction, and a wing 310 engaging the opposite arm of a yoke 318 will rotate its corresponding shaft 317 in opposite direction. The arrangement is such as to actuate the corresponding cam elements 319 to cause the corresponding contact clips 316 of each set to be engaged when a wing 310 strikes an arm of a yoke 318 while the corresponding magnet 302 is energized, and to actuate said corresponding cam elements 319 to cause said corresponding contact clips 316 of each set to be disengaged when a wing 310 strikes an arm of a yoke 318 while the corresponding magnet 302 is deenergized. And the arrangement is also such that the cam elements 319 when once actuated by oscillation of the corresponding yoke 318 will remain in the position to which actuated.

The circuit for each lamp of the composite character 303 is across lead wires 320 and 321 from a source of current supply, and each lamp circuit includes a set of contact clips 316.

It will now be obvious that when the posting magnets 305 are energized while a magnet 302 is also energized, electric circuits will be made to light lamps making visible upon the composite character 303 a number or character corresponding to said energized magnet 302. Upon deenergization of said magnets 305 a coil spring 322 attached to the armature 306 and to a fixed part will return the posting bar 309 to normal position, to move all of the wings 310 away from all of the yokes 318, without changing the positions of the yokes. A yoke which has been actuated to close circuits will be actuated to open said circuits only when the posting bar is again actuated by energization of the magnets 305 while the corresponding magnet 302 is deenergized. At this time the opposite arm of the corresponding wing 318 will engage the opposite arm of the yoke to positively return the shaft 317 to position to cause the corresponding cam elements to release a contact clip of each different set of contact clips to thus allow said contact clips to spring apart.

It might be here remarked, that in Figs. 53, 54 and 55 we have shown several individual numbers, designated 0, 1 and 9, which can be made visible by lighting various combinations of the lamps of the composite character 303. In addition to these numbers 0, 1 and 9 which said composite character 303 can be made to show, are all of the other numbers, 2, 3, 4, 5, 6, 7 and 8, as well as letters of the alphabet and characters other than numbers and letters.

Referring more particularly to Fig. 3a, 323 denotes a magnet for controlling circuits through the magnets 302 and 305 of the hundreds group 298, 324 denotes a magnet for controlling circuits through the magnets 302 and 305 of the tens group 299, and 325 denotes a magnet for assisting in the control of circuits through the magnets 302 and 305 of the units and fractions groups 300 and 301, respectively.

Referring more particularly to Figs. 3 and 3a, a circuit, designated I, is traced through the magnet 323 from the battery 129 through the lead wire 179 and the lead wire 196 to a fixed contact 326 of the digits position selector of the apparatus, thence to a movable contact 327 and through a lead wire 328 to a movable contact 329 of said digits position selector, thence to a fixed contact 330, with which said movable contact 329 is adapted to at times engage, and through a lead wire 331 to a lead wire 332, thence through said magnet 323 and a lead wire 333 to a lead wire 334, thence through said lead wire 334 to a movable contact 335, thence to a fixed contact 336 and through a lead wire 37 to a movable contact 338, thence to a fixed contact 339 and through a lead wire 340 to the lead wire 214, and thence through contacts 198 and 197, the lead wire 215, the lead wire 195, the lead wire 181, the contacts 182 and 140, and the lead wire 141 back to the battery.

A circuit, designated J, is traced through the magnet 324 from the battery 129 through the lead wire 179 and the lead wire 196 to the fixed contact 326, thence to the movable contact 327 and through the lead wire 328 to the movable contact 329, thence to a fixed contact 341, with which said movable contact 329 is adapted to at times engage, and through a lead wire 342 to a lead wire 343, thence through said magnet 324 and the lead wire 333 to the lead wire 334, and thence back to the battery as before.

A circuit, designated K, is traced through the magnet 325 from the battery 129 through the lead wire 179 and the lead wire 196 to the fixed contact 326, thence to the movable contact 327 and through the lead wire 328 to the movable contact 329, thence to either a fixed contact 344 or a fixed contact 345, with which said movable contact 329 is adapted to at times engage, and through a lead wire 346 to a lead wire 347, thence through said magnet 325 and a lead wire 348 to the lead wire 344, and thence back to the battery as before.

The movable contact 327 of the digits position selector constitutes the armature of a magnet 349 of said digits position selector. The digits position selector additionally includes a hundreds magnet 350, a tens magnet 351, a units magnet 352, and a ratchet wheel control magnet 353. A ratchet wheel 354 of said digits position selector is fixed upon a suitably mounted shaft 355 which fixedly carries the movable contact 329. A coil spring 356, attached to the ratchet wheel 354, as at 357, and to a fixed part, tends to urge said ratchet wheel to position the movable contact 329 in engagement with the fixed (fractions) contact 345. An armature 358, pivotally supported as at 359, integrally carries an arm 360 adapted to engage a pin 361 to rotate the ratchet wheel 354 to cause the movable contact 329 to engage the fixed (hundreds) contact 330 when said magnet 350 is energized. An armature 362, pivotally supported as at 363, has its free end pivotally attached, as at 364, to an arm 365 including an elongated slot 366 receiving a pin 367 upon said ratchet wheel 354, the whole arranged to cause the movable contact 329 to engage the fixed (tens) contact 341 when said magnet 351 is energized. An armature 368, pivotally supported as at 369, has its free end pivotally attached, as at 370, to an arm 371 including an elongated slot 372 receiving a pin 373 upon said ratchet wheel 354, the whole arranged to cause the movable contact 329 to engage the fixed (units) contact 344 when said magnet 352 is energized.

The hundreds magnet 350 is included in a circuit, designated L, traced from the battery 129 through the lead wire 179, the lead wire 196 and the lead wire 130, to a hundreds contact 374 on a hundreds tumbler 375 of the tumblers 68, thence to a corresponding contact 376, thence through a hundreds lead wire 377 to the magnet 350, thence through the magnet 349 to the lead wire 195, and thence through the lead wire 195, the lead wire 181, the contacts 182 and 140 and the lead wire 141 back to the battery. The tens magnet 351 is included in a circuit, designated M, traced from the battery 129 through the lead wire 179, the lead wire 196 and the lead wire 130, to a tens contact 378 on a tens tumbler 379 of the tumblers 68, thence to a corresponding contact 380, thence through a tens lead wire 381 to the magnet 351, thence through a a lead wire 382 to the magnet 349, and back to the battery as before. The units magnet 352 is included in a circuit, designated N, traced from the battery 129 through the lead wire 179, the lead wire 196 and the lead wire 130 to a units contact 383 on a units tumbler 384 of the tumblers 68, thence to a corresponding contact 385, thence through a units lead wire 386 to the magnet 352, thence through a lead wire 387 to the lead wire 382, and thence through said lead wire 382 and the magnet 349 back to the battery as before. It will be noted that the magnet 349 is included in each of the circuits L, M and N. The ratchet wheel control magnet 353 is included in a circuit, designated O, traced from the battery 129 through the lead wire 179 to the contacts 205 and 207, thence through the lead wire 210 and a lead wire 388 to said magnet 353, and thence through a lead wire 389 to the lead wire 195, and through said lead wire 195, the lead wire 181, the contacts 182 and 140 and the lead wire 141 back to the battery.

A pair of escapement pawls, designated 390 and 391, are associated with the ratchet wheel control magnet 353 and the ratchet wheel 354 in such manner as to allow the movable contact 329 to move step by step from the fixed contacts 330 to 341, 341 to 344, and 344 to 345, during the operation of the apparatus in the manner presently to be explained. The escapement pawl 390 is integral with the armature 392 of said magnet 353, which armature is pivotally supported at 393. A coil spring 394 urges said escapement pawl 390 into engagement with teeth of said ratchet wheel 354. The escapement pawl 391 is pivoted at 395, and a coil spring 396 urges said escapement pawl 391 into engagement with teeth of said ratchet wheel 354 directly opposite the teeth engaged by the escapement pawl 390. An arm 397 which is integral with the escapement pawl 390 has its free end arranged to engage the pawl 391. The coil spring 394 is stronger than the coil spring 396, and the arm 397 is of length to hold the escapement pawl 391 out of engagement with the ratchet wheel when the magnet 353 is deenergized and the coil spring 394 is acting to hold the escapement pawl 390 against said ratchet wheel, but to allow the coil spring 396 to act upon said escapement pawl 391 and cause it to engage said ratchet wheel when said magnet 353 is energized to move the escapement pawl 390 away from the ratchet wheel against the action of said coil spring 394.

It should be here remarked that the key levers 15 of the sending instrument will include a key lever corresponding with each of the hundreds tumbler 375, the tens tumbler 379, and the units tumbler 384. In practice, one of said key levers, corresponding to one of the tumblers 375, 379 or 384, will ordinarily be depressed directly after a tumbler 134 has dropped, and before the printing unit starts to post the corresponding quotations in the manner as already described. Depression of a key lever 15 corresponding to a tumbler 374, 379 or 384 can cause said printing unit to advance the tape one step without posting anything thereon, or can post any desired character, as, for example, a period, for which there will be a corresponding plate 230, as will be understood without necessity for further description. Assuming that the ratchet wheel 354 is in its normal position with the movable contact 329 engaged with either the fixed units contact 344 or the fixed fractions contact 345 at the time when a tumbler 134 drops, upon the dropping of a tumbler 375, 379, or 384, one of the magnets 350, 351, or 352, as the case may be, will be energized, as will also the magnet 349, and the magnet 350, 351, or 352, which is energized will cause the movable contact 329 to engage the fixed contact 330, 341 or 344, depending upon the particular magnet 350, 351 or 352 which is energized, and will break the circuit through said movable contact 329 at this time, (while wiping backward over all or certain of the fixed contacts 345, 344 and 341), by causing the movable contact 327 to be disengaged from the fixed contact 326. The particular key lever 15 struck will depend upon the particular digit which is to be posted; that is to say, whether the first digit to be posted falls in the hundreds column, as represented in the opening quotation by any of the group of magnets 298, in the tens column, as represented in said opening quotation by any of the group of magnets 299, or in the units column, as represented in said opening quotation by any of the group of magnets 300. Supposing that the hundreds tumbler 375 is the one which is caused to drop, so that the movable contact 329 engages the fixed contact 330, the magnet 323, in the now closed circuit I, is energized. After the key lever 15 corresponding to said tumbler 375 was depressed, the printing switch actuating lever 202 rode on the lower portion of the print cam 78 to cause the contacts 205 and 207 to engage and close the circuit O including the magnet 353, which caused the escapement pawl 390 to be released from the ratchet wheel 354. When the arm 360 engaged the pin 361 to rotate said ratchet wheel, the escapement pawl 391 rode backwardly over the ratchet wheel teeth. Thereafter, when the "hundreds" digit is printed, in the manner as already described, the contacts 205 and 207, after having become disengaged, again engage each other to again energize the magnet 353. At this time the escapement pawl 390 is again removed from the teeth of the ratchet wheel 354, and upon the release of a tooth of the ratchet wheel by said escapement pawl 390, the escapement pawl 391 engages the next tooth, in a manner which will be apparent, to thus allow the movable contact 329 to advance one step and stop in engagement with the fixed contact 341. Then when the "tens" digit is printed, the movable contact 329 advances to the fixed contact 344 in the same manner as described, and also advances to the fixed contact 345 in the manner as described, provided a fraction is posted at any location in the apparatus. It will be seen then that the normal position of the movable contact 329 is in engagement with either the fixed contact 344 or the fixed contact 345, depending upon whether the last digit posted in the apparatus is a "units" digit or a "fractions" digit. It will also be seen that when the following selection of a tumbler 134 is made, in the manner as already set forth, all of the circuits L, M, N and O, including the magnets 349, 350, 351, 352 and 353 will be broken by disengagement of the contacts 140 and 182, so that the ratchet wheel 354 will remain in said normal position with the movable contact 329 engaging either one of said fixed contacts 344 or 345, as the case may be. Thus the digits position selector is ready to again operate, in the manner as set forth, when a succeeding tumbler 134 is made to drop.

The magnet 323 has an armature 398 which constitutes a movable contact adapted to engage a fixed contact 399 when said magnet 323 is energized, to make a circuit, designated P, through the magnets 302 of the group 298, said circuit being traced from the battery 129 through the lead wires 179, 196 and 130 to the contact 127 of a tumbler 68, thence to the corresponding contact 128 and through the lead wire 219 and one of lead wires 400 to the corresponding magnet 302 in said group 298, (see Fig. 3a), thence through a lead wire 401 to the contacts 399 and 398, thence through a lead wire 402 to the lead wire 333, thence through the lead wire 334, the contacts 335 and 336, the lead wire 337, the contacts 338 and 339, the lead wire 340, the lead wire 214, the corresponding contacts 198 and 197, the lead wire 215, the lead wire 195, the lead wire 181, the contacts 182 and 140, and the lead wire 141 back to the battery. When the contacts 398 and 399 are in engagement, a circuit, designated Q, is made through the posting magnet 305 of group 298, said circuit being traced from the battery 129 through the lead wire 179 to the contacts 205 and 207, thence through the lead wire 210 to said magnet 305 of group 298, and thence through the lead wire 401 and the contacts 399 and 398 and back to the battery along the same route as just described.

The magnet 324 has an armature 403 which constitutes a movable contact adapted to engage a fixed contact 404 when said magnet 324 is energized to make a circuit, designated R, through the magnets 302 of the group 299, said circuit being traced from the battery 129 through the lead wires 179, 196 and 130 to the contact 127, thence to the corresponding contact 128 and through the lead wire 219 and one of lead wires 405 to the corresponding magnet 302 in said group 299, thence through a lead wire 406 to the contacts 404 and 403, thence through a lead wire 407 to the lead wire 334, and thence back to the battery along the same route as described in connection with the circuit P. When the contacts 403 and 404 are in engagement, a circuit, designated S, is made through the posting magnet 305 of group 299, said circuit being traced from the battery 129 through the lead wire 179 to the contacts 205 and 207, thence through the lead wire 210 to said magnet 305 of group 299, and thence through the lead wire 406 and the contacts 404 and 403 and the lead wire 407 and the lead wire 334 back to the battery over the same route as in circuit A.

The magnet 325 has an armature 408 pivoted at 409 and carrying an integral arm 410 for actuating a movable contact 411 adapted to engage a fixed contact 412 when said magnet 325 is energized to make a circuit, designated T, traced from the battery 129 through the lead wires 179, 196 and 130 to the contact 127, thence to the corresponding contact 128 and through the lead wire 219 and one of lead wires 413 to the corresponding magnet 302 of group 300, thence through a lead wire 414 to the contacts 412 and 411, thence through the lead wire 348 to the lead wire 334 and back to the battery over the same route as described in connection with the circuits P and R. When the contacts 411 and 412 are in engagement, a circuit, designated U, is made through the posting magnet 305 of group 300, said circuit being traced from the battery 129 through the lead wire 179 to the contacts 205 and 207, thence through the lead wire 210 to said magnet 305 of group 300, and thence through a lead wire 415 to a magnet 416, thence to a fixed contact 417 and a movable contact 418 cooperating with said fixed contact, thence to the lead wire 414, and thence back to the battery over the same route as just described.

The movable contact 335 and the fixed contact 336 are elements of a unit more clearly disclosed in Fig. 29. Said contacts 335 and 336 are suitably mounted adjacent a magnet 419 of said unit having an armature 420 pivoted at 421. An arm 422 integral with said armature 420 pivotally supports, as at 423, the midlength of a lever 424. One end of said lever 424 is arranged adjacent an end portion of the movable contact 335 to be capable of engaging said movable contact. The other end of the lever 424 is arranged adjacent a suitably pivoted armature 425 of a magnet 426 of said unit of Fig. 29, and the armatures 420 and 425 are urged toward each other by a coil spring 427. The parts of the unit of Fig. 29 are positioned as in Fig. 3a when the apparatus is set to post an opening quotation on the "ticker board". The first action upon the unit of Fig. 29 during the operation of the apparatus, is energization of the magnet 419, in a manner to be made clear, to cause said magnet to attract its armature 420 and thus move the end of the lever 424 adjacent the armature 425 to engaging position back of a shoulder 428 upon said armature 425, so that the parts will be positioned as in said Fig. 29. Later, when said magnet 419 is deenergized, the coil spring 427 acts in conjunction with the shoulder 428 to cause the end of said lever 424 adjacent the movable contact 335 to engage said movable contact and disengage it from the fixed contact 336. As will be hereinafter set forth, the magnet 419 is controlled by a circuit including the contacts 335 and 336, and the unit of Fig. 29 when once actuated can only be set to position, as in Fig. 3a, to be again operable in the apparatus, by energization of the magnet 426.

The magnet 325, its armature 408 with arm 410, and the movable contacts 338, 411 and the fixed contacts 339, 412, are elements of a unit more clearly disclosed in Figs. 31 and 32. Said contacts 338, 339, 411 and 412 are suitably mounted adjacent the magnet 325, the contacts 411 and 412 being positioned to be normally disengaged, but to be caused to engage by actuation of the arm 410 when said magnet 325 is energized to attract its armature 408, as already hereinbefore set forth. An arm 429 integral with said armature 408 pivotally supports, as at 430, the midlength of a lever 431. One end of said lever 431 is arranged adjacent an end portion of the movable contact 338 and carries an insulating member 432 capable of engaging said movable contact. The other end of the lever 431 is arranged adjacent a suitably pivoted armature 433 of a magnet 434 of said unit of Figs. 31 and 32, and the armatures 408 and 433 are urged toward each other by a coil spring 435. The parts of the unit of Figs. 31 and 32 are positioned as in Fig. 3a when the apparatus is set to post an opening quotation on the "ticker board". The first action upon the unit of Figs. 31 and 32 during the operation of the apparatus is energization of the magnet 325 to cause said magnet to attract its armature and move the arm 410 to position to make engagement between the contacts 411 and 412 as already set forth. Energization of said magnet 325, and the consequent attraction of its armature 408, moves the end of the lever 431 adjacent the armature 433 to engaging position back of a shoulder 436 upon said armature 433, so that the parts will be positioned as in Fig. 31. Later, when said magnet 325 is deenergized, the coil spring 435 acts to remove the arm 410 from the contacts 411 and 412 to allow these to become disengaged, and acts in conjunction with the shoulder 436 to cause the member 432 upon the end of the lever 431 adjacent the movable contact 338 to engage said movable contact and disengage it from the fixed contact 339, to position the parts as shown in full lines in Fig. 32. As has been stated, the magnet 325 is controlled by the circuit K, which includes the contacts 338 and 339, and the unit of Figs. 31 and 32 when once actuated can only be set to position, as in Fig. 3a and in dotted lines in Fig. 32, to be again operable in the apparatus, by energization of the magnet 434.

The magnet 416, the movable contact 418, and the fixed contact 417 are elements of a unit more clearly disclosed in Fig. 28. Said contacts 418 and 417 are suitably mounted adjacent the magnet 416, and said magnet has an armature 437 pivoted at 438. An arm 439 integral with said armature 437 pivotally supports, as at 440, the midlength of a lever 441. One end of said lever 441 is arranged adjacent an end portion of the movable contact 418 to be capable of engaging said movable contact. The other end of the lever 441 is arranged adjacent a suitably pivoted armature 442 of a magnet 443 of said unit of Fig. 28, and the armatures 437 and 442 are urged toward each other by a coil spring 444. The parts of the unit of Fig. 28 are positioned as in Fig. 3a when the apparatus is set to post an opening quotation on the "ticker board". The first action upon the unit of Fig. 28 during the operation of the apparatus is energization of the magnet 416, in a manner to be made clear, to cause said magnet to attract its armature 437 and thus move the end of the lever 441 adjacent the armature 442 to engaging position back of a shoulder 445 upon said armature 442, so that the parts will be positioned as in said Fig. 28. Later, when the magnet 416 is deenergized, the coil spring 444 acts in conjunction with the shoulder 445 to cause the end of said lever 441 adjacent the movable contact 418 to engage said movable contact, disengage it from the fixed contact 417, and cause it to engage a suitably supported fixed contact 446 of said unit of Fig. 28 arranged adjacent the movable contact 418 at the side thereof opposite the fixed contact 417. As will be hereinafter set forth, the magnet 416 is controlled by a circuit including the contacts 417 and 418, and the unit of Fig. 28 when once actuated can only be set in position, as in Fig. 3a, to be again operable in the apparatus, by energization of the magnet 443.

During the operation of the apparatus, when the circuit I is closed to actuate the armature 398 to make the circuits P and Q through the corresponding magnets 302 and 305 of the group 298, said magnets 302 and 305 operate in the manner as set forth to light the corresponding lamps of the composite character 303. Then when the movable contact 329 is caused to become disengaged from the fixed contact 330 and to engage the fixed contact 341, the circuit through the magnet 323 is broken to break the circuits P and Q through the magnets 302 and 305 of said group 298. Concurrently, the circuit J is made through the magnet 324 as described. Said magnet 324 attracts its armature 403 and makes the circuits R and S through the magnets 302 and 305 of group 299, which now operate in the manner as before set forth. When then the movable contact 329 moves from the fixed contact 341 to the fixed contact 344, the magnet 324 is deenergized to break the circuits R and S, and the magnet 325 is energized to attract its armature 408 to make the circuits T and U through the magnets 302 and 305 of group 300. When the circuit through the magnet 325 is made, the armature 408 causes the lever 431 to engage back of the shoulder 436 in the manner as shown in Fig. 31. The circuit U for the magnet 305 of the group 300 is through the magnet 416, and when said circuit U is made, the armature 437 is attracted to move the lever 441 back of the shoulder 445 as shown in Fig. 28. Thereafter, in the operation of the apparatus, the movable contact 329 disengages the fixed contact 344 and engages the fixed contact 345, both of said contacts being connected with the lead wire 346, to maintain the magnet 325 energized to attract the armature 408, but when a new selection is next made at the sending instrument, by depression of a key lever 15, the circuit U having the magnet 305 of group 300 is broken at the print cam. Said circuit U including the magnet 416, this magnet is, naturally, deenergized upon the breaking of the circuit U. Upon deenergization of said magnet 416, the coil spring 444 acts to move the armature 437 away from the magnet 416 and rotate the lever 441 about the shoulder 445 as an axis and thus cause the movable contact 418 to be disengaged from the fixed contact 417 and to engage the fixed contact 446.

When the magnet 325 is energized to attract the armature 408, an additional circuit, designated V is made, said circuit V being traced from the battery 129 through the lead wires 179, 196 and 130 to the appropriate contact 127, thence to the corresponding contact 128 and through a fractions lead wire 451 and one of lead wires 447 to the corresponding magnet 302 of group 301, thence through a lead wire 448 to the lead wire 414, and thence back to the battery over the same route as is taken by the circuit T. When the contacts 418 and 446 are in engagement, a circuit, designated W, is made through the posting magnet 305 of group 301, said circuit being traced from the battery 129 through the lead wire 179 to the contacts 205 and 207, thence through the lead wire 210 to said magnet 305 of group 301, thence through a lead wire 449 to the magnet 419, thence through a lead wire 450 to the contact 446, and thence to the contact 418 and through the lead wire 448 back to the battery over the same route as before.

Upon a key lever 15 corresponding to a "fractions" digit to be posted by magnets 302 and 305 of group 301 now being depressed, and the circuits V and W being thereafter closed, in a manner as will be apparent from the description already given, said magnets 302 and 305 of said group 301 operate in the manner as stated to post said "fractions" digit. The magnet 419 is in the circuit W for the magnet 305 of group 301 and becomes energized when said magnet 305 of said group 301 is energized. Energization of the magnet 419 attracts the armature 420 to position the lever 424 back of the shoulder 428, as said lever is shown in Fig. 29. Then when the corresponding circuits K and W are broken, during the commencement of the selection of the next tumbler 134 to be made to drop, as will be understood, the magnets 419 and 325 are deenergized. The coil spring 427 now actuates the lever 424 about the shoulder 428 as an axis to disengage the contacts 335 and 336, and the coil spring 435 now actuates the lever 431 about the shoulder 436 as an axis to disengage the contact 338 and 339. Said coil spring 435 also removes the arm 410 from the contact 411 to allow the contacts 411 and 412 to become disengaged. The parts of the unit of Figs. 31 and 32 will thus be positioned as shown in full lines in Fig. 32. It will be seen that none of the circuits through the magnets 302 and 305 of the different groups 298, 299, 300 and 301 of magnets can hereafter be made until the armatures 442, 425 and 433 are released from their corresponding levers by energization of the magnets 443, 426 and 434. Said magnets 443, 426 and 434 are included in a short circuit having a switch button 452 for connecting said mentioned magnets in a closed circuit from battery. Upon energization of the magnets 443, 426 and 434, their armatures will be released from the corresponding levers, and the coil springs 444, 427 and 435 will act to move said levers to their positions as in Fig. 3a. All of the parts of the units of Figs. 28, 29, 31 and 32 will thus be situated in their normal positions, as in said Fig. 3a, ready to be again operated as described.

It will be seen from the foregoing that a quotation including digits in each of the groups 298, 299, 300 and 301 can be posted, and thereafter the mechanism for posting "opening" quotations will be inoperative, until set by energization of the magnets 443, 426 and 434, as at the close or opening of a day's stock-market quotations. It will be obvious that should the digits quoted not include the "hundreds" and "tens" digits, these will become inoperative upon the posting of the "units" digit and the consequent disengagement of the contacts 335 and 336, each of the circuits through the magnets 302 and 305 of the groups 298 and 299 being through said contacts 335 and 336.

Should an "opening" quotation not include a "fractions" digit, the apparatus cares for such condition. In the event that the quotation includes no "fractions" digit, the circuit through the magnet 325 will be broken immediately after the posting of the "units" digit by actuation of the magnets 302 and 305 of the group 300, at the commencement of the selection of the next succeeding tumbler 134. When said magnet 305 of said group 300 is energized and then deenergized to energize and then deenergize the magnet 416, the contacts 418 and 446 are made to engage, as already stated. Thus the posting magnet 305 of the "fractions" group 301, included in the circuit having the contacts 418 and 446, will be energized to actuate its armature 306, which, in turn, will cause the "fractions" zero to be posted on the "ticker board", for the reason that at this time no magnet 302 in said group 301 has been selected. It will be apparent that the magnet 305 of the group 301 will operate under the present condition at the same instart in the sequence of operations in the apparatus at which it will operate to post a selected "fractions" digit, and upon deenergization of said magnet 305 of group 301 and deenergization of the magnet 325 under the condition as set forth in the present paragraph, all of the parts of all the units of Figs. 28, 29, 31 and 32, will have the same positions as after posting a "fractions" digit by operation of magnets 302 and 305 in said group 301; that is to say, said units of Figs. 28, 29, 31 and 32 will be situated to be later returned to their normal positions, ready to be again operated, by energization and deenergization of the magnets 443, 426 and 434.

In Fig. 3a we have disclosed a diagram of the mechanism for posting the maximum quotation opposite each designated stock receiving a selected quotation exhibiting the market trend. As hereinbefore stated, in Figs. 50, 51 and 52 we have disclosed features detailing the portion of the mechanism of Fig. 49, for posting opening, maximum, and/or minimum quotations, and additionally detailing features relating specifically to the mechanism for indicating maximum and/or minimum quotations, not present in the mechanism for indicating opening quotations. These latter features are also shown in Fig. 22.

As shown more clearly in Fig. 3a, the mechanism for indicating maximum quotations includes four groups of magnets, one group designated 453 corresponding to hundreds, a second group 454 corresponding to tens, a third group 455 corresponding to units, and a fourth group 456 corresponding to fractions. The individual magnets of the various groups 453, 454, 455 and 456 are also indicated 302 in Figs. 22, 49, 50 and 51.

Referring more specifically to Figs. 22, 50, 51 and 52, a frame 457 carrying each magnet 302 of the groups 453, 454, 455 and 456 of magnets, suitably supports a series of spaced apart contacts, including a movable contact 458, a fixed contact 459, a fixed contact 460, a fixed contact 461, a movable contact 462, and a fixed contact 463. Normally, the contacts 458 and 459 are disengaged, the contacts 460, 461 and 462 are in electrical engagement, and the contact 463 is disengaged from the contact 462, as said contacts are shown in Figs. 22 and 50. An actuator for certain of these contacts includes a cam surface 464 suitably attached to an extension of the movable contact 458, and said actuator also includes an insulating post 465 upon said cam surface 464 and engaging an extension of the movable contact 462. A cam surface 466, upon the leg of each yoke 318 which is opposite the armature 311 of the corresponding magnet 302, is adapted to ride beneath a corresponding cam surface 464 whenever the corresponding shaft 317 is oscillated to make visible a number or other character upon the composite character 303, in the manner as already described, to thus cause the contacts 458 and 459 to engage, and to move the contact 462 away from the contact 461 into engagement with the contact 463, leaving the contacts 460 and 461 in engagement. Each cam surface 466 is adapted to remain in position under its cam surface 464 as long as the corresponding yoke 318 is positioned to close the contacts to said number or other character made visible, as already set forth, and to release its cam surface 464 when said yoke 318 is oscillated, also in the manner as hereinbefore stated, to allow the contacts to said visible number or other character to become broken. Upon release of the cam surface 464 by the cam surface 466, the contacts 458, 459, 460, 461, 462 and 463 return to their normal positions, as in Figs. 22 and 50, by reason of the natural resiliency of the movable contacts 458 and 462. In Fig. 3a we have shown magnets 302 of the groups 453, 454, 455 and 456 of magnets, each associated with contacts such as 458, 459, 460, 461, 462 and 463, and said mentioned contacts are disclosed in said Fig. 3a in their normal positions, as in Figs. 22 and 50.

Referring more particularly to Fig. 3a, 467 denotes a magnet for controlling circuits through the magnets 302 and 305 of the hundreds group 453, 468 denotes a magnet for controlling circuits through the magnets 302 and 305 of the tens group 454, and 469 denotes a magnet for controlling circuits through the magnets 302 and 305 of the units group 455, and for assisting in the control of circuits through the magnets 302 and 305 of the fractions group 456.

Referring more particularly to Figs. 3 and 3a, a circuit, designated X, is traced through the magnet 467 from the battery 129 through the lead wire 179 and the lead wire 196 to the fixed contact 326 of the digits position selector of the apparatus, thence to the movable contact 327 and through the lead wire 328 to the movable contact 329, thence to the fixed contact 330 and through the lead wire 331 to a lead wire 470, thence through said magnet 467 and a lead wire 471 to the lead wire 214, and thence through contacts 198 and 197, the lead wire 215, the lead wire 195, the lead wire 181, the contacts 182 and 140, and the lead wire 141 back to the battery.

A circuit, designated Y, is traced through the magnet 468 from the battery 129 through the lead wire 179 and the lead wire 196 to the fixed contact 326, thence to the movable contact 327 and through the lead wire 328 to the movable contact 329, thence to the fixed contact 341 and through the lead wire 342 to a lead wire 472, thence through said magnet 468 and a lead wire 473 to a fixed contact 474 adapted to be engaged by an armature 475 of a magnet 476, thence through a lead wire 477 to the lead wire 214, and thence back to the battery as before.

A circuit, designated Z, is traced through the magnet 469 from the battery 129 through the lead wire 179 and the lead wire 196 to the fixed contact 326, thence to the movable contact 327 and through the lead wire 328 to the movable contact 329, thence to either the fixed contact 344 or the fixed contact 345 and through the lead wire 346 to a lead wire 478, thence through said magnet 469 and a lead wire 479 to a fixed contact 480 adapted to be engaged by an armature 481 of a magnet 482, thence by a lead wire 483 to the lead wire 473, and thence back to the battery as before.

The magnet 467 has an armature 484 which constitutes a movable contact adapted to engage a fixed contact 485 when said magnet 467 is energized, to make a circuit, designated AA, through a selected magnet 302 of the group 453, said circuit being traced from the battery 129 through the lead wires 179, 196 and 130 to the contact 127 of a tumbler 68, thence to the corresponding contact 128 and through the lead wire 219 and a selected lead wire 486 to the corresponding magnet 302 in said group 453, thence through a lead wire 487 to a magnet 488, thence through said magnet 488 and a lead wire 489 to one of the windings of a magnet 490 having a double winding, thence through a lead wire 491 to the contact 485, thence through the armature or contact 484 to the lead wire 214, and thence through said lead wire 214, the contacts 198 and 197, the lead wires 215, 195 and 181, the contacts 182 and 140, and the lead wire 141 back to the battery.

The magnet 468 has an armature 492 which constitutes a movable contact adapted to engage a fixed contact 493 when said magnet 468 is energized, to make a circuit, designated BB, through a selected magnet 302 of the group 454, said circuit being traced from the battery 129 through the lead wires 179, 196 and 130 to the contact 127 of a tumbler 68, thence to the corresponding contact 128 and through the lead wire 219 and a selected lead wire 494 to the corresponding magnet 302 in said group 454, thence through a lead wire 495 to a magnet 496, thence through said magnet 496 and through a lead wire 497 to a magnet 498, thence through said magnet 498 and a lead wire 499 to one of the windings of a magnet 500 having a double winding, thence through a lead wire 501 to the contact 493, thence through the armature or contact 492 to the lead wire 483, thence through said lead wire 483 to the lead wire 473, thence to the contacts 474 and 475, thence through the lead wire 477 to the lead wire 214, and thence back to the battery as before.

When the contacts 484 and 485 are in engagement, a circuit, designated CC, is made through the posting magnet 305 of group 453, said circuit being traced from the battery 129 through the lead wire 179 to the contacts 205 and 207, thence through the lead wire 210 to said magnet 305 of group 453, thence through a lead wire 502 and the lead wire 491 to the contact 485, and thence through the armature or contact 484 and the lead wire 214 back to the battery in the same manner as in circuit AA.

When the contacts 492 and 493 are in engagement, a circuit, designated DD, is made through the posting magnet 305 of group 454, said circuit being traced from the battery 129 through the lead wire 179 to the contacts 205 and 207, thence through the lead wire 210 to said magnet 305 of group 454, thence through a lead wire 503 to the lead wire 501, thence through said lead wire 501 to the contacts 493 and 492, and thence back to the battery over the same route as in circuit BB.

The magnet 469 has an armature 504 which constitutes a movable contact adapted to engage a fixed contact 505 when said magnet 469 is energized, to make a circuit, designated EE, through a selected magnet 302 of the group 455, said circuit being traced from the battery 129 through the lead wires 179, 196 and 130 to the contact 127 of a tumbler 68, thence to the corresponding contact 128 and through the lead wire 219 and a selected lead wire 506 to the corresponding magnet 302 in said group 455, thence through a lead wire 507 to a magnet 508, thence through said magnet 508 and a lead wire 509 to a lead wire 511, thence through said lead wire 511 to said contact 505, thence through the contact 504 and a lead wire 512 to the lead wire 479, and thence through the contacts 480 and 481 and the lead wires 483 and 473 and the contacts 474 and 475 back to the battery over the same route as before.

When the contacts 504 and 505 are in engagement, a circuit, designated FF, is made through the posting magnet 305 of group 455, said circuit being traced from the battery 129 through the lead wire 179 to the contacts 205 and 207, thence through the lead wire 210 to said magnet 305 of group 455, and thence through a lead wire 513 to a fixed contact 514, thence through a movable contact 515 and a lead wire 516 to the lead wire 511, thence through said lead wire 511 to the contacts 505 and 504, thence through the lead wires 512 and 479, the contacts 480 and 481 and the lead wire 483 and the lead wire 473 to the contacts 474 and 475, and thence back to the battery as before.

Figure 27:
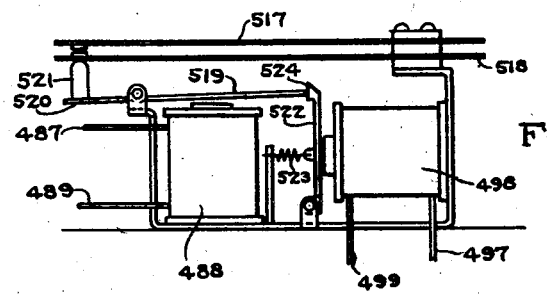

The magnets 488 and 498 are elements of a unit more clearly disclosed in Fig. 27. The magnets 496 and 510 are elements of a unit which is a duplicate of the unit of Fig. 27, and the magnet 508, which corresponds to the magnets 488 and 496 is an element of a unit which is also a duplicate of said unit of Fig. 27. A description of the unit of Fig. 27, including the magnets 488 and 498, will suffice for a description of the other two similar units of the apparatus. Said unit of Fig. 27 includes a fixed contact 517 and a movable contact 518 suitably mounted upon the magnet 498 adjacent the magnet 488. An armature 519 for the magnet 488 includes an extension 520 supporting an insulating post 521 adapted to engage the movable contact 518 when the magnet 488 is energized to cause the contacts 518 and 517 to engage. Said movable contact 518 is of resilient nature to become disengaged from the fixed contact 517 when the magnet 488 is deenergized. The end of the armature 519 opposite the extension 520 is arranged adjacent a suitably pivoted armature 522 of the magnet 498 of said unit of Fig. 27, and said armature 522 has attached thereto a coil spring 523 for urging the armature 522 away from the magnet 498 and toward the armature 519. The parts of the unit of Fig. 27 are positioned as shown in Fig. 3a and in said Fig. 27 when the magnets 488 and 498 are deenergized, the coil spring 523 holding a shoulder 524 of the armature 522 in engagement with the adjacent end of the armature 519. The first action upon the unit of Fig. 27 during the operation of the apparatus, is energization of the magnet 488, in a manner to be made clear, to cause said magnet to attract its armature 519 and thus move the contacts 518 and 517 into engagement and cause the end of said armature 519 to move toward the axis of the armature 522, off of the shoulder 524. Immediately, the coil spring 523 acts to move the armature 522 a further distance away from the magnet 498 and toward the armature 519, so that the adjacent end of said armature 519 is locked in position back of said shoulder 524. It will be obvious that the shoulder 524 will thus maintain the contacts 518 and 517 in engagement. The magnet 498 is energized at a later period during the operation of the apparatus, in a manner to be set forth, and when energized said magnet 498 attracts the armature 522 against the action of the coil spring 523, to thus release the armature 519, in a manner which will be apparent, and allow the contacts 518 and 517 to become disengaged.

Figure 34:
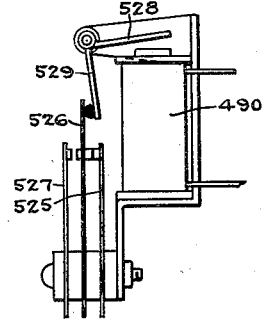

The double winding magnet 490 is an element of a unit more clearly disclosed in Fig. 34. The double winding magnet 500 is in element of a unit which is a duplicate of the unit of Fig. 34, and a description of said unit of Fig. 34 will suffice to describe both of these units. The unit of Fig. 34 includes a fixed contact 525, a movable contact 526, and a fixed contact 527, all of said contacts being suitably mounted, and the movable contact 526 being arranged between the fixed contacts 525 and 527. An armature 528 for said magnet 490 includes an angular extension 529 adapted to engage the movable contact 526 when said magnet 490 is energized to disengage the contacts 525 and 526 and engage the contacts 526 and 527, and the movable contact 526 is of resilient nature to reengage the fixed contact 525 and disengage the fixed contact 527, as shown in said Fig. 34, when said magnet 490 is deenergized. The magnet 490 is energized and deenergized during the operation of the apparatus in the manner as will be made clear.

Figure 33:
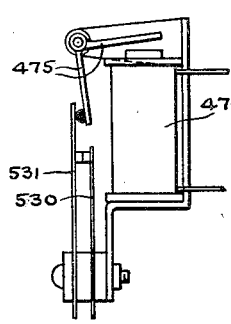

The magnet 476 and its armature 475 are elements of a unit of the apparatus more clearly disclosed in Fig. 33. The magnet 482 and its armature 481 are elements of a unit which is a duplicate of the unit of Fig. 33, and a description of the unit of Fig. 33 will suffice as a description of the other similar unit. The unit of Fig. 33 includes a fixed contact 530 and a movable contact 531 suitably mounted adjacent the magnet 476. The movable contact 531 is of resilient nature to engage the fixed contact 530 when the magnet 476 is deenergized. The armature 475 is adapted to disengage the contacts 530 and 531 when said magnet 476 is energized. The magnet 476 is energized and deenergized in a manner which will become apparent.

The fixed contact 514 and the movable contact 515 are elements of a unit more clearly disclosed in Fig. 30. Said contacts 514 and 515 are suitably mounted adjacent a magnet 532 of said unit having an armature 533 pivoted at 534. An arm 535 integral with said armature 533 pivotally supports, as at 536, the midlength of a lever 537. One end of said lever 537 is arranged adjacent an end portion of the movable contact 515 to be capable of engaging said movable contact. The other end of the lever 537 is arranged adjacent an arm 538 integral with a suitably pivoted armature 539 of a magnet 540 of said unit of Fig. 30. A coil spring 541 is attached to the armature 533 and to a fixed part to urge said armature away from its magnet 532, and a coil spring 542 is attached to the arm 538 and to a fixed part to urge the armature 539 away from its magnet 540. The parts of the unit of Fig. 30 are normally positioned as in Fig. 3a. The first action upon said unit during the operation of the apparatus, is energization of the magnet 540, in a manner to be made clear, to cause the free end portion of the arm 538 to move toward the adjacent end of the lever 537 against the action of the coil spring 542, and to engage against said adjacent end at the side of a shoulder 543 of said arm 538 opposite the axis of the armature 539. Later, while the magnet 540 remains energized, the magnet 532 is energized, also in a manner to be made clear, to cause said magnet 532 to attract its armature 533 and thus move the end of the lever 537 adjacent the arm 538 to engaging position back of the shoulder 543 upon said arm 538, so that the parts will be positioned as in said Fig. 30. Thereafter, the magnet 532 is deenergized, while the magnet 540 remains energized, and the coil spring 541 acts in conjunction with the shoulder 543 to cause the end of said lever 537 adjacent the movable contact 515 to engage said movable contact, disengage it from the fixed contact 514, and cause it to engage a suitably supported fixed contact 544 of said unit of Fig. 30 arranged adjacent the movable contact 515 at the side thereof opposite the fixed contact 514. Then, later, when the magnet 540 is deenergized, the coil spring 542 acts upon the arm 538 to remove the shoulder 543 from the lever 537, and the parts of the unit return to their normal positions, as in Fig. 3a.

The connection of each magnet 302 of the hundreds group 453 between the corresponding lead wire 486 and the lead wire 487 is such that the circuit through a magnet 302 of said group 453 corresponding to a digit of particular value is also sequentially through the contacts 462 and 461 of each magnet 302 of the group 453 corresponding to a digit of higher value, but through the contacts 462 and 461 of no magnet 302 of said group 453 corresponding to a digit of lower value. That is to say, the circuit from a lead wire 486 to the lead wire 487 including the magnet 302 of the group 453 corresponding to the numeral 1 is through the contacts 462 and 461 of all of the magnets 302 of said group 453, (only three magnets of the group being shown), the circuit including the magnet 302 of the group 453 corresponding to the numeral 2 is through the contacts 462 and 461 of all of the magnets 302 of said group 453 except the magnet 302 of said group 453 corresponding to the numeral 1, and so on, the circuit through the contacts 462 and 461 of the magnet 302 of the group 453 corresponding to the highest numeral in said group being through said contacts 462 and 461 of this last mentioned magnet only. What has been said about the connections of the magnets 302 of group 453 between the lead wires 486 and 487 is also true concerning the connections of the magnets 302 of each of groups 454, 455 and 456 between their lead wires corresponding to the lead wires 486 and 487, as will be understood. The connection of each magnet 302 of each of the groups 453, 454, 455 and 456 between a lead wire 486 and the lead wire 487, or between lead wires the equivalents of these mentioned lead wires, is from a lead wire such as 486 directly to the magnet, thence through the magnet, thence by a lead wire 545 to the contact 462, and thence through the contact 461, eventually to a lead wire such as 487.

During the operation of the apparatus, when the circuit X is closed to actuate the armature 484 to make the circuits AA and CC through the corresponding magnets 302 and 305 of the group 453, said magnets 302 and 305 operate in the manner as hereinbefore set forth to light the corresponding lamps of the composite character 303, and to simultaneously engage the corresponding contacts 458 and 459, disengage the corresponding contacts 462 and 461, thus disconnecting the contacts 460 and 462, and engage the corresponding contacts 462 and 463. Then, when the movable contact 329 is caused to become disengaged from the fixed contact 330 and to engage the fixed contact 341, the circuit through the magnet 467 is broken to break the circuits AA and CC through the magnets 302 and 305 of said group 453. Concurrently, the circuit Y is made through the magnet 468 as described. Said magnet 468 attracts its armature 492 and makes the circuits BB and DD through the magnets 302 and 305 of group 454, which now operate in the manner as set forth. When then the movable contact 329 moves from the fixed contact 341 to the fixed contact 344, the magnet 468 is deenergized to break the circuits BB and DD, and the magnet 469 is energized to attract its armature 504 to make the circuits EE and FF through the magnets 302 and 305 of group 455.

It will be apparent that after a magnet 302 of the group 453 corresponding to a particular digit has been energized to disengage its contacts 462 and 461, a circuit AA cannot pass from a lead wire 486 to the lead wire 487 through the magnet 302 corresponding to a digit of lower value, but a circuit AA can pass from a lead wire 486 to the lead wire 487 through a magnet 302 corresponding to a digit of higher value. Thus, it will be seen, that after the first quotation is made in the group 453, no further quotation can be made by a magnet in this group corresponding to a digit of value lower than the quoted digit, and said quoted digit will remain visible upon the composite character 303 until a higher digit is quoted and the before quoted digit is simultaneously destroyed, in the manner as hereinbefore set forth. What has just been stated in connection with the magnets 302 of the group 453 is equally so with respect to the magnets 302 of each of the other groups 454, 455 and 456, except that in the instance of the magnets of each of said groups 454, 455 and 456 there is an arrangement of interconnection between the contacts of the magnets 302 of each group 454, 455 and 456 and the preceding group, whereby directly after any quotation is made in a group, which will of necessity be a part of a new maximum quotation, a selection of the digit transmitted by the sending instrument can be made in the group immediately succeeding a group which has posted a selection, no matter whether said transmitted digit is of higher or lower value than the one which stands posted in said succeeding group.

When current flows through the circuit AA past a magnet 302 of the group 453 to post a maximum "hundreds" digit, the magnet 488, included in said circuit AA, is energized to attract its armature 519 and engage the contacts 517 and 518. When said contacts 517 and 518 are in engagement, circuits can be made through the contacts of the magnets 302 of the group 454 in either sequence. That is to say, circuits BB, corresponding to the circuits AA, can be made through contacts of said magnets 302 of the group 454 sequentially through contacts of each magnet corresponding to a digit of lower value to contacts of a magnet corresponding to a digit of higher value, as already described, and circuits, traced along the circuits BB through lead wires 494 to the magnets 302 of the group 454 and the contacts 462 of said magnets 302, can be made through said magnets 302 of said group 454 sequentially through contacts of each magnet 302 of this group corresponding to a digit of higher value to contacts of a magnet 302 corresponding to a digit of lower value, these latter circuits taking routes through contacts of said magnets 302 of the group 454 which are the reverse of the routes of the circuits BB, and one of them being traced from a magnet 302 of the group 454 corresponding to the digit of highest value in said group 454 through its contacts 462 and 460, thence sequentially through the contacts 462 and 460 of each magnet 302 of the group 464 corresponding to a digit of lower value, thence by a lead wire 546 to the contact 517, thence to the contact 518 and through a lead wire 547 which joins the lead wire 495 of the circuit BB. Thus, it will be apparent, that immediately after the posting of a "hundreds" digit, which will be a new maximum digit, the particular digit next selected at the sending instrument can be posted in the "tens" group 454, whether said next selected digit is of higher or lower value than one already posted in said "tens" group 454. What has been said in the present paragraph concerning the groups 453 and 454 of magnets, and their relation to each other, is equally so with respect to the groups 454 and 455, and the groups 455 and 456, respectively, and their relation to each other, there being units as in Fig. 27 associated with each of said groups 454 and 455, and 455 and 456, respectively, in approximately the same manner (as so far described in connection with Fig. 3a) in which said unit of Fig. 27 is associated with the groups 453 and 454.

As has been stated, upon the posting of a digit in the group 453, the corresponding magnet 302 becomes energized to cause its contacts 462 and 463 to engage. When during a later quotation this same posted digit is selected at the sending instrument, the selecting impulse travels through the circuit AA along the appropriate lead wire 486 to the corresponding magnet 302 of the group 453, and thence through the contacts 462 and 463 and a lead wire 548 which joins the lead wire 489 of said circuit AA beyond the magnet 488, to thus shunt the selecting impulse around said magnet 488 to leave the contacts 517 and 518 disengaged, and thus render the contacts of the magnets 302 of the group 454 liable to receive one of the various circuits BB only, and not one of the reverse circuits which the contacts 517 and 518 provide when engaged, during the next succeeding impulse at said group 454. Each group 454 and 455 includes shunt means more or less similar to the shunt means described in the present paragraph, and for a like purpose.

When, during the operation of the apparatus, there is no digit to be quoted in the group 453, the magnet 467 is not energized, and nothing will happen in said group 453. Likewise, when there is no digit to be quoted in the group 454, the magnet 468 will not be energized, and nothing will happen in this group.

When there is a selection at the sending instrument of a digit lower than one posted at the group 453, there will be no circuit AA through the contacts 462, 461 and 460, the circuit being broken at the contacts 462, 461 and 460 of the higher digit. The contacts 459 of each magnet 302 of group 453 are arranged upon a lead wire 549 which is attached to the lead wire 130, extends to the second winding of the magnet 490, and thence to the contact 527. When the contacts 527 and 526 are in engagement, the circuit from the lead wire 549 is continued to the lead wire 214 through said contact 526 and a lead wire 550 attached to said contact 526 and to the lead wire 477. When there is a selection at the sending instrument of a digit lower than one posted at said group 453, there will also be no circuit through said lead wire 549, because the magnet 490 is not connected in the circuit AA, and the circuit through the lead wire 549 and said magnet 490 is through the disengaged contacts 527 and 526. When, however, there is a posting circuit made from a lead wire 486 through said magnet 490 to attract its armature or contact 526, the lead wire 549, being now connected across the lead wires 130 and 214, remains in circuit to hold said magnet 490 energized as long as the corresponding tumbler 134 remains dropped, as will be evident. The contacts 458, which are adapted to engage the contacts 459, are attached to a lead wire 551 extending to the magnet 476, and a lead wire 552 extends from said magnet 476 to the contact 525. When there is a selection at the sending instrument of a digit lower than one posted at said group 453, there will be a circuit from the lead wire 130 through the lead wire 549 to the contacts 459 and 458 which are then in engagement, and thence through the lead wire 551, the magnet 476, the lead wire 552, the contacts 525 and 526 and the lead wires 550 and 477 to the lead wire 214. This circuit through said magnet 476 will cause the armature or contact 475 to be attracted, to thus break the circuits Y and Z, through the magnets 468 and 469, respectively, and preclude the possibility of making a posting, which will of necessity be a lower posting, in any of the groups 454, 455 and 456. It will be apparent that the circuit across the lead wires 130 and 214, through the magnet 476, will remain made to hold said magnet 476 energized as long as the corresponding tumbler 134 remains dropped. Whenever there is energization of the magnet 490, either to post a maximum digit or repeat a posted digit in group 453, there can be no energization of the magnet 476. Consequently, immediately after posting or repeating a digit in the group 453, there can be a digit posted in the group 454.

The group 454 of magnets includes units, as in Figs. 33 and 34, which may be approximate duplicates of these same units as described in connection with group 453, and said units of Figs. 33 and 34 are applied to the groups 454 and 455 in about the same manner as the units of said Figs. 33 and 34 as described in connection with group 453 are applied to the groups 453 and 454, and with approximately similar results which it is believed need not be herein repeated in connection with said groups 454 and 455.

When the magnet 469 is energized to attract the armature 504, an additional circuit, designated GG is made, said circuit GG being traced from the battery 129 through the lead wires 179, 196 and 130 to the corresponding contact 127, thence to the corresponding contact 128 and through a fractions lead wire 451 and one of lead wires 553 to the corresponding magnet 302 of group 456, thence through a lead wire 554 to a lead wire 555, thence through said lead wire 555 to the lead wire 511, and thence back to the battery over the same route as is taken by the circuit EE. The magnet 532 of Fig. 30 is included in the circuit EE when closed, a lead wire 556 extending from the lead wire 509 to said magnet 532, and a lead wire 557 extending from said magnet 532 to the lead wire 511. When the contacts 515 and 544 are in engagement, a circuit, designated HH, is made through the posting magnet 305 of group 456, said circuit being traced from the battery 129 through the lead wire 179 to the contacts 205 and 207, thence through the lead wire 210 to said magnet 305 of group 456, thence through a lead wire 558 to the contact 544, thence to the contact 515 and through the lead wire 516 to the lead wire 511 and thence back to the battery through the armature 504 over the same route as the circuit FF.

The magnet 540 is connected across the lead wires 346 and 214 by means of lead wires 559 and 560, the former extending from the lead wire 478 to said magnet 540, and the latter extending from said magnet 540 to the lead wire 214. Consequently, when the circuit Z is closed the magnet 540 is energized. Assuming that the parts of the unit of Fig. 30 are in their normal positions as in Fig. 3a, energization of the magnet 540 will cause the free end portion of the arm 538 to engage the end of the lever 537, said lever engaging said arm at the side of the shoulder 543 opposite the axis of the armature 539. When then the circuit EE is made, the magnet 532 attracts its armature 533 to position said lever 537 back of the shoulder 543, as shown in Fig. 30. The magnet 532 will remain energized until the circuit EE is broken. At this time, the coil spring 541 will act to remove the armature 533 from the magnet 532, to thus swing the lever 537 about the shoulder 543 as an axis, and cause the contact 515 to become disengaged from the contact 514 and to engage the contact 544.

In order that the posting magnet 305 of each of the groups 453, 454, 455 and 456 may operate only when this is intentional, each of the lead wires 489, 499, 511 and 555 is provided with a magnet 561, and each of the lead wires 502, 503, 513 and 558 is provided with a switch including a movable contact 562, said movable contacts 562 constituting armatures for the magnets 561, respectively, of the different lead wires 489, 499, 511 and 555. That is to say, the posting magnet 305 of each group 453, 454, 455 and 456, must only be actuated when a quotation is to be made or repeated at a magnet 302 of the corresponding group, with the exception that the magnet 305 of the group 456 is sometimes actuated, in a manner to be set forth, when no quotation is to be made or repeated at a magnet 302 in said group 456, to take care of a special condition in the apparatus. Otherwise, each magnet 305 of the different groups 453, 454, 455 and 456 would, when no quotation was to be made at a group, return the corresponding composite character 303 to zero position. It will be evident that energization of each magnet 561 is only accomplished when a quotation is made or repeated in the corresponding group 453, 454, 455, or 456, as the case may be. Energization of a magnet 561 causes the corresponding armature 562 to be attracted to make a wire 489, 499, 511, or 555 continuous to close the corresponding circuit including a magnet 305 of a group 453, 454, 455 or 456, and deenergization of a magnet 561 allows the corresponding circuit to be open, as will be understood.

A lead wire 563 extends from the lead wire 210 to a magnet 564 of a unit, similar to the unit of Fig. 27, including the magnet 508, a lead wire 565 extends from said magnet 564 to a magnet 510 of a unit, similar to the unit of said Fig. 27, including the magnet 496, and a lead wire 566 extends from said magnet 510 to the lead wire 558.

Upon a key lever 15 corresponding to a "fractions" digit to be posted by magnets 302 and 305 of group 456 being depressed, and the circuits GG and HH being thereafter closed, in a manner as will be apparent from the description given, said magnets 302 and 305 of said group 456 operate in the manner as stated to post said "fractions" digit. When thereafter the circuit Z having the magnet 469 is broken, in the manner as already described, the magnet 540 is deenergized, and the coil spring 542 acts to return the elements of the unit of Fig. 30 to their normal positions as in Fig. 3a.

When the corresponding circuits having the magnets 498, 510 and 564 are made, each armature, such as 522, is attracted, to release the corresponding armature, such as 519, and to allow the corresponding contacts, such as 517 and 518 to become disengaged. When later, the armatures, such as 522, are released, these assume the position as in Figs. 3a and 27, by reason of the action of the coil springs, such as 523.

A maximum quotation may not include a "fractions" digit, and the apparatus cares for such condition. A movable contact 567, arranged to be actuated by an armature 568, generally similar to the armature 519, for the magnet 508, is attached to a lead wire 569 which extends to the portion of the lead wire 558 at the side of the armature or switch arm 562 opposite the magnet 305 of the group 456. A fixed contact 570 adjacent the movable contact 567 is attached to a lead wire 571 which extends from the portion of the lead wire 558 at the side of the armature or switch arm 562 adjacent to said magnet 305 of the group 456. A movable contact 572, arranged to be actuated by an armature 573, similar to the armature 568, for the magnet 496, is attached to a lead wire 574 which extends from the lead wire 571. A fixed contact 575 adjacent the movable contact 572 is attached to a lead wire 576 which extends to the lead wire 569. In the event that a maximum quotation includes no "fractions" digit, the circuit through the magnet 469 will be broken immediately after the posting of the "units" digit, by actuation of the magnets 302 and 305 of the group 455, at the commencement of the selection of the next succeeding tumbler 134. It is to be remarked that when a maximum quotation is made, either or both of the sets of contacts 567, 570 and 572, 575, respectively, are in engagement. When the circuit through said magnet 469 was made, the circuit through the magnet 532 was also made to position the parts of the unit of Fig. 30 as in said Fig. 30, and when said circuit through the magnet 469 is broken, the circuit through said magnet 532 is also broken to cause the contact 515 to engage the contact 544 in the manner as already set forth. Thus the posting magnet 305 of the "fractions" group 456, included in the circuit having the contacts 514 and 544, and also having a set of contacts 567, 570 or 572, 575, is energized to actuate its armature 306, which, in turn, causes the "fractions" zero to be posted on the "ticker board", for the reason that at this time no magnet 302 in said group 456 has been selected. The magnet 305 of the group 456 will operate under the present condition at the same instant in the sequence of operations in the apparatus at which it will operate to post a selected "fractions" digit, and upon deenergization of said magnet 305 of the group 456 and deenergization of the magnets 469 and 540 under the condition as set forth in the present paragraph, all of the parts of the unit of Fig. 30 will have the same positions as after posting a "fractions" digit by operation of magnets 302 and 305 in said group 456. It will be understood that when no "fractions" digit is posted in the group 456, the corresponding switch arm or armature 562 will be in open position, this being necessary to meet a condition in the apparatus as already described. The purpose of the two sets of contacts 567, 570 and 572, 575 is to make provision for closing a circuit through the magnet 305 of the group 456, when no quotation is made at this group, no matter whether a digit of increased value is quoted in either or both of the "tens" and "units" groups 454 and 455. That is to say, the "units" group 455 only may quote a digit of increased value, or the "tens" group 454 only may quote a digit of increased value, the digit in the "units" group repeating its posted quotation, as when a stock increase is ten points, exclusive of the fraction. Obviously, if a digit of increased value is quoted in neither the "tens" group nor the "units" group, there is no occasion for returning the composite character 303 of the "fractions" group to zero position.

In Fig. 3a we have disclosed a switch button 577 which is illustrative of a means for extinguishing the number or character upon each composite character 303, as at the close or beginning of a day's stock-market quotations. As shown, said switch button 577 is attached to the part of the lead wire 502 adjacent to the magnet 305 and to plus battery. Upon depression of a switch button such as 577, the corresponding switch button of each different group 453, 454, 455 and 456 closes a circuit through the magnet 305 of the group, and the armature 306 of said magnet 305 causes zero to be posted at the corresponding composite character on the "ticker board", for the reason that at this time no magnet 302 in any group 453, 454, 455 or 456 has been selected. Upon return of each switch button 577 to normal position, the circuit through the corresponding magnet 305 is broken, and the apparatus is ready to start a day's operations. Obviously, a single switch button, such as 577, could be employed to simultaneously operate the magnets 305 of all of the groups 453, 454, 455 and 456 in the manner as just stated, provided there is included no interconnection between lead wires of the magnets 305 of the different groups of magnets.

In Fig. 3b we have disclosed a diagram of the mechanism for posting the minimum quotation opposite each designated stock receiving a selected quotation exhibiting the market trend. We have hereinbefore fully described the features of the mechanism of Figs. 49, 50, 51 and 52 for indicating maximum and/or minimum quotations, and have set forth how these features are employed to indicate maximum quotations. It will suffice now to detail the manner in which the features of said Figs. 49, 50, 51 and 52 are employed to indicate minimum quotations in the apparatus.

As shown more clearly in Fig. 3b, the mechanism for indicating minimum quotations includes four groups of magnets, one group designated 578 corresponding to hundreds, a second group 579 corresponding to tens, a third group 580 corresponding to units, and a fourth group 581 corresponding to fractions. The individual magnets of the various groups 578, 579, 580 and 581 are also indicated 302 and 305 in Figs. 3b, 22, 49, 50 and 51. In said Fig. 3b we have shown magnets 302 of the groups 578, 579, 580 and 581 of magnets each associated with contacts such as 458, 459, 460, 461, 462 and 463 of Figs. 22 and 50, and said mentioned contacts are disclosed in said Fig. 3b in their normal positions, as in said Figs. 22 and 50.

Referring more particularly to Fig. 3b, 582 denotes a magnet for controlling circuits through the magnets 302 and 305 of the hundreds group 578, 583 denotes a magnet for controlling circuits through the magnets 302 and 305 of the tens group 579, and 584 denotes a magnet for controlling circuits through the magnets 302 and 305 of the units group 580, and for assisting in the control of circuits through the magnets 302 and 305 of the fractions group 581.

Referring more particularly to Figs. 3 and 3b, a circuit, designated II, is traced through the magnet 582 from the battery 129 through the lead wire 179 and the lead wire 196 to the fixed contact 326 of the digits position selector of the apparatus, thence to the movable contact 327 and through the lead wire 328 to the movable contact 329, thence to the fixed contact 330 and through the lead wire 331 to a lead wire 585, thence through one of the windings of a double winding magnet 586, thence through a lead wire 587 to the magnet 582, thence through a lead wire 588 to a fixed contact 589, thence to a movable contact 590, thence through a lead wire 591 to a fixed contact 592, thence to a movable contact 593, thence through a lead wire 594 to a movable contact 595, thence to a fixed contact 596, thence through a lead wire 597 to the lead wire 214, and thence through the contacts 198 and 197, the lead wire 215, the lead wire 195, the lead wire 181, the contacts 182 and 140, and the lead wire 141 back to the battery.

A circuit, designated JJ, is traced through the magnet 583 from the battery 129 through the lead wire 179 and the lead wire 196 to the fixed contact 326, thence to the movable contact 327 and through the lead wire 328 to the movable contact 329, thence to the fixed contact 341 and through the lead wire 342 to a lead wire 598, thence through one of the windings of a double winding magnet 599, thence through a lead wire 600 to the magnet 583, thence through a lead wire 601 to the lead wire 591, and back to the battery as before.

A circuit, designated KK, is traced through the magnet 584 from the battery 129 through the lead wire 179 and the lead wire 196 to the fixed contact 326, thence to the movable contact 327 and through the lead wire 328 to the movable contact 329, thence to either the fixed contact 344 or the fixed contact 345 and through the lead wire 346 to a lead wire 602, thence through the magnet 584, thence through a lead wire 603 to the lead wire 594, and back to the battery as before.

Figure 35:
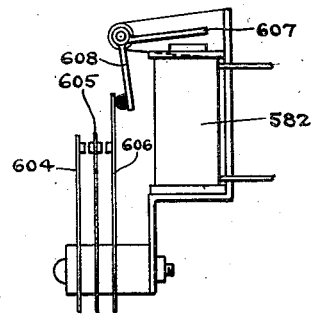

The magnet 582 is an element of a unit more clearly disclosed in Fig. 35. The magnets 583 and 584 are, respectively, elements of units which are duplicates of said unit of Fig. 35. A description of the unit of Fig. 35 will suffice for a description of the other two similar units of the apparatus. Said unit of Fig. 35 includes a fixed contact 604 and a pair of movable contacts 605 and 606 suitably mounted adjacent said fixed contact 604 upon the magnet 582. An armature 607 for said magnet 582 includes an angular extension 608 adapted to cause the contact 606 to engage the contact 605 and the contact 605 to engage the contact 604 when said magnet 582 is energized. When said magnet 582 is deenergized, said contacts 604, 605 and 606 assume separated positions, as they are shown in Figs. 3b and 35.

When the magnet 582 is energized and the corresponding contacts 604, 605 and 606 are in engagement, a circuit, designated LL, is made through a selected magnet 302 of the group 578, said circuit being traced from the battery 129 through the lead wires 179, 196 and 130 to the contact 127 of a tumbler 68, thence to the corresponding contact 128 and through the lead wire 219 and a selected lead wire 609 to the corresponding magnet 302 in said group 578, thence through a lead wire 610 to a magnet 611, thence through a lead wire 612 to one of the coils of a magnet 613, thence through a lead wire 614 to the contact 605, thence through the contact 606 and a lead wire 615 to the lead wire 588, and thence back to the battery over the same route as the circuit II.

When the magnet 583 is energized and the corresponding contacts 604, 605 and 606 are in engagement, a circuit, designated MM, is made through a selected magnet 302 of the group 579, said circuit being traced from the battery 129 through the lead wires 179, 196 and 130 to the contact 127 of a tumbler 68, thence to the corresponding contact 128 and through the lead wire 219 and a selected lead wire 616 to the corresponding magnet 302 in said group 579, thence through a lead wire 617 to a magnet 618, thence through a lead wire 619 to a magnet 620, thence through a lead wire 621 to one of the coils of a double winding magnet 622, thence through a lead wire 623 to the corresponding contact 605, and thence through the corresponding contact 606 and a lead wire 624 to the lead wire 601 and back to the battery over the same route as the circuit JJ.

When the magnet 584 is energized and the corresponding contacts 604, 605 and 606 are in engagement, a circuit, designated NN, is made through a selected magnet of the group 580, said circuit being traced from the battery 129 through the lead wires 179, 196 and 130 to the contact 127 of a tumbler 68, thence to the corresponding contact 128 and through the lead wire 219 and a selected lead wire 625 to the corresponding magnet 302 in said group 580, thence through a lead wire 626 to a magnet 627, thence through a lead wire 628 to a magnet 629, thence through a lead wire 630 to a magnet 631, thence through a lead wire 632 to one of the coils of a double winding magnet 633, thence through a lead wire 634 to the contact 605, and thence through the contact 606 and a lead wire 635 to the lead wire 603 and back to the battery over the same route as the circuit KK.

When the contacts 604, 605 and 606 adjacent the magnet 582 are in engagement, a circuit, designated OO, is made through the posting magnet 305 of the group 578, said circuit being traced from the battery 129 through the lead wire 179 to the contacts 205 and 207, thence through the lead wire 210 to said magnet 305 of group 578, thence through a lead wire 636 to the contact 604, and thence through the contacts 605 and 606 and back to the battery over the same route as the circuit LL.

When the contacts 604, 605 and 606 adjacent the magnet 583 are in engagement, a circuit, designated PP, is made through the posting magnet 305 of the group 579, said circuit being traced from the battery 129 through the lead wire 179 to the contacts 205 and 207, thence through the lead wire 210 to said magnet 305 of group 579, thence through a lead wire 637 to the contact 604, and thence through the contacts 605 and 606 back to the battery over the same route as the circuit MM.

When the contacts 404, 405 and 406 adjacent the magnet 584 are in engagement, a circuit, designated QQ, is made through the posting magnet 305 of the group 580, said circuit being traced from the battery 129 through the lead wire 179 to the contacts 205 and 207, thence through the lead wire 210 to said magnet 305 of group 580, and thence through a lead wire 638 to a movable contact 639, thence to a fixed contact 640 and through a lead wire 641 to the contact 604, and thence through the contacts 605 and 606 back to the battery over the same route as the circuit NN.

The magnets 611, 620, the magnets 618, 629, and the magnets 627, 642, are elements of separate units each a duplicate of the unit of Fig. 27, the construction and mode of operation of which unit have already been described.

The double winding magnet 586 is an element of a unit more clearly disclosed in Fig. 23. The double winding magnet 599 is an element of a unit which is a duplicate of the unit of Fig. 23, and a double winding magnet 643 is an element of a unit also a duplicate of said unit of Fig. 23. A description of the unit of Fig. 23 will suffice to describe all three of these units. The unit of Fig. 23 includes a movable contact 644, a fixed contact 645, a fixed contact 646, a movable contact 647, a fixed contact 648, and a movable contact 649, all of said contacts being suitably mounted in the manner as shown. An armature 650 for said magnet 586 includes an angular extension 651 adapted to engage an insulating member 652 attached to all of the movable contacts 644, 647 and 649, to move the contacts 644, 645 into engagement and the contacts 646, 647 and 648, 649, respectively, out of engagement when said magnet 586 is energized. The movable contacts 644, 647 and 649 are of resilient nature to cause the contacts 644, 645 to be disengaged and the contacts 646, 647 and 648, 649, respectively, to be engaged when said magnet 586 is deenergized, as said contacts are shown in Fig. 23. The magnet 586 is energized and deenergized during the operation of the apparatus in the manner as will be made clear.

The magnet 631 is an element of a unit which is a duplicate of the unit disclosed in Fig. 30, except that the present unit has no contact such as 514. The remainder of the elements of said unit having the magnet 631 includes a movable contact 653, a fixed contact 654, a magnet 655, an armature 656, an arm 657, an arm 658, and an armature 659 all corresponding to similar parts in said Fig. 30. The unit having said parts as described operates in the manner as already stated in connection with the disclosure of said Fig. 30.

The movable contact 595 and the fixed contact 596 are elements of a unit which is a duplicate of the unit disclosed in Fig. 33, said unit including a magnet 660 corresponding with the magnet 476 and an armature 661 corresponding with the armature 475.

The fixed contact 589 and the movable contact 590 are elements of a unit more clearly disclosed in Figs. 25 and 26. The fixed contact 592 and the movable contact 593 are elements of a unit which is a duplicate of the unit of Figs. 25 and 26, and a description of the unit of Figs. 25 and 26 will suffice as a description of the other similar unit. Said unit of Figs. 25 and 26 includes, in addition to the fixed contact 589 and the movable contact 590, a fixed contact 662, a movable contact 663, and a fixed contact 664. This unit also includes a magnet 665 having an armature 666 with an angular extension 667 adapted to engage an insulating member 668 attached to the movable contacts 590 and 663. When the magnet 665 is energized to attract its armature 666, the arm 667 is actuated to move the movable contacts 590 and 663 to cause the contacts 589 and 590 to disengage, the contacts 590 and 662 to engage, and the contacts 663 and 664 to engage, as shown in Fig. 26. The movable contacts 590 and 663 are of resilient nature to cause the contacts 589 and 590 to engage, the contacts 590 and 662 to disengage, and the contacts 663 and 664 to disengage when said magnet 665 is deenergized, as shown in Fig. 25. The magnet 665 is energized and deenergized in the manner which will be hereinafter fully described.

Figure 36:
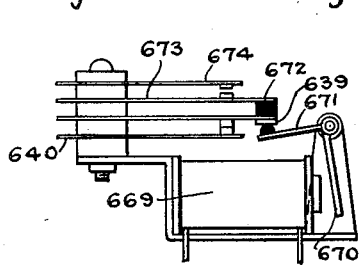

The movable contact 639 and the fixed contact 640 are elements of a unit more clearly disclosed in Fig. 36. Said unit of Fig. 36 additionally includes a magnet 669 having an armature 670 with angular extension 671 which engages an insulating member 672 attached to the movable contact 639 and to a movable contact 673 adjacent a fixed contact 674. When the magnet 669 is deenergized, the contacts 639 and 640 are in engagement and the contacts 673 and 674 are out of engagement by reason of the resiliency of the movable contacts 639 and 673. When said magnet 669 is energized, the contacts 639 and 640 are disengaged and the contacts 673 and 674 are engaged. The magnet 669 is energized and deenergized in the manner as will be made clear.

The double winding magnet 613 is an element of a unit more clearly disclosed in Fig. 24. The double winding magnet 622 and the double winding magnet 633 are each elements of separate units which are duplicates of the unit of Fig. 24, and a description of said unit of Fig. 24 will suffice to describe all three of these units. An insulating member 675 which is supported upon the magnet 613 carries spaced apart contacts including a fixed contact 676, a movable contact 677, a movable contact 678, and a fixed contact 679. An armature 680 for the magnet 613 includes an angular extension 681 which engages the movable contact 677. When the magnet 613 is deenergized, the contacts 676 and 677 are engaged and the contacts 677, 678 and 679 are disengaged, as these parts are shown in said Fig. 24, by reason of the natural resiliency of the movable contacts 677 and 678. When said magnet 613 is energized, the contacts 676 and 677 are disengaged, and the contacts 677, 678 and 679 are engaged. A magnet 682 adjacent the magnet 613 supports an insulating member 683 which carries spaced apart contacts including a fixed contact 684, a movable contact 685, and a fixed contact 686. An armature 687 for the magnet 682 includes an angular extension 688 which engages the movable contact 685. When the magnet 682 is deenergized, the contacts 684 and 685 are engaged and the contacts 685 and 686 are disengaged, as these parts are shown in Fig. 24, by reason of the natural resiliency of the movable contact 685. When said magnet 682 is energized, the contacts 684 and 685 are disengaged, and the contacts 685 and 686 are engaged. The magnets 613 and 682 are energized and deenergized in the manner to be made clear.

The connection of each magnet 302 of the hundreds group 578 between the corresponding lead wire 609 and the lead wire 610 is such that the circuit through a magnet 302 of said group 578 corresponding to a digit of particular value is also sequentially through the contacts 462 and 461 of each magnet 302 of the group 578 corresponding to a digit of lower value, but through the contacts 462 and 461 of no magnet 302 of said group 578 corresponding to a digit of higher value. That is to say, the circuit from a lead wire 609 to the lead wire 610 including the magnet 302 of the group 578 corresponding to the numeral 9 is through the contacts 462 and 461 of all of the magnets 302 of said group 578, (only three magnets of the group being shown), the circuit including the magnet 302 of the group 578 corresponding to the numeral 8 is through the contacts 462 and 461 of all of the magnets 302 of said group 578 except the magnet 302 of said group 578 corresponding to the numeral 9, and so on, the circuit through the contacts 462 and 461 of the magnet 302 of the group 578 corresponding to the lowest numeral in said group being through said contacts 462 and 461 of this last mentioned magnet only. What has been said about the connections of the magnets 302 of the group 578 between the lead wires 609 and 610 is also true concerning the connections of the magnets 302 of each of groups 579, 580 and 581 between the lead wires corresponding to the lead wires 609 and 610, as will be understood. The connection of each magnet 302 of each of the groups 578, 579, 580 and 581 between a lead wire 609 and the lead wire 610, or between lead wires the equivalents of these mentioned lead wires, is from a lead wire such as 609 directly to the magnet, thence through the magnet, thence by a lead wire such as 545 to the contact 462, and thence through the contact 461, eventually to a lead wire such as 610.

During the operation of the apparatus, when the circuit II is closed to make the circuits LL and OO through the corresponding magnets 302 and 305 of the group 578, said magnets 302 and 305 operate in the manner as hereinbefore set forth to light the corresponding lamps of the composite character 303, and to simultaneously engage the corresponding contacts 458 and 459, disengage the corresponding contacts 462 and 461, thus disconnecting the contacts 460 and 462, and engage the corresponding contacts 462 and 463. Then when the movable contact 329 is caused to become disengaged from the fixed contact 330 and to engage the fixed contact 341, the circuit through the magnet 582 is broken to break the circuits LL and OO through the magnets 302 and 305 of said group 578. Concurrently, the circuit JJ is made through the magnet 583 as described. Said magnet 583 attracts its armature and makes the circuits MM and PP through the magnets 302 and 305 of the group 579 which now operate in the manner as set forth. When then the movable contact 329 moves from the fixed contact 341 to the fixed contact 344, the magnet 583 is deenergized to break the circuits MM and PP, and the magnet 584 is energized to attract its armature to make the circuits NN and QQ through the magnets 302 and 305 of the group 580.

It will be apparent that after a magnet 302 of the group 578 corresponding to a particular digit has been energized to disengage its contacts 462 and 461, a circuit LL cannot pass from a lead wire 609 to the lead wire 610 through the magnet 302 corresponding to a digit of higher value, but a circuit LL can pass from a lead wire 609 to the lead wire 610 through a magnet 302 corresponding to a digit of lower value. Thus, it will be seen, that after the first quotation is made in the group 578, no further quotation can be made by a magnet in this group corresponding to a digit of value higher than the quoted digit, and said quoted digit will remain visible upon the composite character 303 until a lower digit is quoted and the before quoted digit is simultaneously destroyed, in the manner as hereinbefore set forth. What has just been stated in connection with the magnets 302 of the group 578 is equally so with respect to the magnets 302 of each of the other groups 579, 580 and 581, except that in the instance of the magnets of each of said groups 579, 580 and 581 there is an arrangement of interconnection between the contacts of the magnets 302 of each group 579, 580 and 581 and the preceding group, whereby directly after any quotation is made in a group, which will of necessity be a part of a new minimum quotation, a selection of the digit transmitted by the sending instrument can be made in the group immediately succeeding a group which has posted a selection, no matter whether said transmitted digit is of lower or higher value than the one which stands posted in said succeeding group. When current flows through the circuit LL past a magnet 302 of the group 578 to post a minimum "hundreds" digit, the magnet 611, included in said circuit LL, is energized to attract its armature and engage the contacts 517 and 518. When said contacts 517 and 518 are in engagement, circuits can be made through the contacts of the magnets 302 of the group 579 in either sequence. That is to say, circuits MM, corresponding to the circuit LL, can be made through contacts of said magnets 302 of the group 579 sequentially through contacts of each magnet corresponding to a digit of higher value to contacts of a magnet corresponding to a digit of lower value, as already described, the circuits, traced along the circuits MM through lead wires 616 to the magnets 302 of the group 579 and the contacts 462 of said magnets 302, can be made through said magnets 302 of said group 579 sequentially through contacts of each magnet 302 of this group corresponding to a digit of lower value to contacts of a magnet 302 corresponding to a digit of higher value, these latter circuits taking routes through contacts of said magnets 302 of the group 579 which are the reverse of the routes of the circuits MM, and one of these being traced from a magnet 302 of the group 579 corresponding to the digit of lowest value in said group 579 through its contacts 462 and 460, thence sequentially through the contacts 462 and 460 of each magnet 302 of the group 579 corresponding to a digit of higher value, thence by a lead wire 689 to the contact 517, thence to the contact 518 and through a lead wire 690 which joins the lead wire 617 of the circuit MM. Thus, it will be apparent, that immediately after posting a "hundreds" digit, which will be a new minimum digit, the particular digit next selected at the sending instrument can be posted in the tens group 579, whether said next selected digit is of lower or of higher value than one already posted in said tens group 579. What has been said in the present paragraph concerning the groups 578 and 579 of magnets, and their relation to each other, is equally so with respect to the groups 579 and 580, and the groups 580 and 581, respectively, and their relation to each other, there being units as in Fig. 27 associated with each of said groups 579 and 580, and 580 and 581, respectively, in approximately the same manner (as so far described in connection with Fig. 3b) in which said unit of Fig. 27 is associated with the groups 578 and 579.

As has been stated, upon the posting of a digit in the group 578, the corresponding magnet 302 becomes energized to cause its contacts 462 and 463 to engage. When during a later quotation this same posted digit is selected at the sending instrument, the selecting impulse travels through the circuit LL along the appropriate lead wire 609 to the corresponding magnet 302 of the group 578, and thence through the contacts 462 and 463 and a lead wire 691 which joins the lead wire 612 of said circuit LL beyond the magnet 611, to thus shunt the selecting impulse around said magnet 611 to leave the contacts 517 and 518 disengaged, and thus render the contacts of the magnets 302 of the group 579 liable to receive one of the various circuits MM only, and not one of the reverse circuits which the contacts 517 and 518 provide when engaged, during the next succeeding impulse at said group 579. Each group 579 and 580 includes shunt means more or less similar to the shunt means described in the present paragraph, and for a like purpose.

When, during the operation of the apparatus, there is no digit to be quoted in the group 578, the magnets 302 of the group 579 must connect in either direction, in order that either a higher or a lower digit, which will of necessity be a part of the minimum quotation, may be posted in said group 579. Likewise, when there is no digit to be quoted in the group 579, the magnets 302 of the group 580 must connect in either direction, in order that either a higher or a lower digit, which will of necessity be a part of the minimum quotation, may be posted in said group 589.

When there is a selection at the sending instrument of a digit higher than one posted at the group 578, there will be no circuit LL through the contacts 462, 461 and 460, the circuit being broken at the contacts 462, 461 and 460 of the lower digit. The contacts 459 of each magnet 302 of the group 578 are arranged upon a lead wire 692 which is attached to the lead wire 130. A lead wire 693 which carries the contacts 458 extends to the second winding of the magnet 586 and thence by a lead wire 694 to the fixed contact 645. When the contacts 645 and 644 are in engagement, the circuit from the magnet 586 is continued to the lead wire 214 through said contact 644 and a lead wire 695 attached to said contact 644 and to a lead wire 696 itself connected with the lead wire 214. Said lead wire 693 is also connected to a lead wire 697 which is attached to a magnet 698 itself connected to the lead wire 696.

The magnet 698 is an element of a unit which is a duplicate of the units of Figs. 25 and 26, except that the present unit does not include a contact such as 589 in said Figs. 25 and 26. The movable contact 699 of the unit including the magnet 698 corresponds to the movable contact 590 of the unit of Figs. 25 and 26, the fixed contact 700 corresponds to the fixed contact 662, the fixed contact 701 corresponds to the fixed contact 664, and the movable contact 702 corresponds to the movable contact 663.

Whenever there is a selection at the sending instrument of a digit to be posted at the group 578, there will be a circuit through the winding of the magnet 586, which circuit includes the magnet 582, as will be obvious, and said magnet 586 will attract its armature to cause the contacts 644, 645 to engage, and the contacts 646, 647 and 648, 649, respectively, to disengage. Thus, whenever there is a quotation made or standing in the group 578 and said group is entered, there is a holding circuit made through said magnet 586, said holding circuit being traced from the lead wire 130 through the lead wire 692, engaging contacts 459 and 458, the lead wire 693, the magnet 586, the lead wire 694, the contacts 645 and 644, the lead wire 695, and the lead wire 696 to the lead wire 214. It will be obvious that this holding circuit will remain closed as long as the corresponding tumbler remains dropped. When no quotation is made in the group 578 while a digit stands posted in said group, there will be no circuit including the magnet 582 and the coil of the magnet 586 in this circuit, and there will, consequently, be no holding circuit through said magnet 586, because this holding circuit includes the contacts 644 and 645. When no quotation is made in the group 578 there will nevertheless be a circuit through the magnet 698 provided there is a digit standing posted in said group 578, said circuit being traced from the lead wire 130, through the lead wire 692, engaging contacts 459 and 458, the lead wire 693, the lead wire 697, the magnet 698, and the lead wire 696 to the lead wire 214.

When the magnet 698 is energized and the magnet 586 is deenergized, the condition which exists when no quotation is to be made in the group 578, the contacts 699, 700 and 701, 702 and 646, 647 and 648, 649, respectively, are in engagement. Thus, when the group 578 is entered and no quotation is made in said group, connection is made across the contacts 517 and 518 through the lead wire 689 attached to said contact 517, a lead wire 703 extending from said lead wire 689 to the contact 649, said contacts 649 and 648, a lead wire 704 extending from said contact 648 to the contact 702, said contacts 702 and 701, a lead wire 705 extending from said contact 701 to the lead wire 690, and said lead wire 690 attached to the contact 518. It will be evident that thus circuits can be made in the manner as hereinbefore fully set forth through the contacts of the magnets 302 of the group 579 in either sequence when no quotation is made in the group 578. Also, when no quotation is made in said group 578, the posting magnet 305 of this group should remove a posted digit at the corresponding composite character. Removal of said posted digit occurs by the making of a circuit, which includes the contacts 646 and 647, at a later stage in the operation of the apparatus. An equivalent circuit will be hereinafter described in connection with the fractions group 581 and the units group 580 and the relation of these groups to each other. When a digit is selected at the sending instrument which is of higher value than one posted at the group 578, the posting magnet 305 of said group 578 cannot be operated through the circuit including the contacts 646 and 647 for the reason that the magnet 586 is at this time energized and said contacts 646 and 647 are disengaged. When there is no quotation standing in the group 578, and this group is not entered, the magnet 698 is not energized. But there is no necessity for energizing this magnet at this time, because there is, evidently, nothing to be done at this group, the minimum quotation commencing at the group 579.

When there is an impulse to quote a digit at the group 578, all of the magnets 586, 698, 613, and 682 are energized. Likewise, when there is an impulse to repeat a digit at said group 578, all of said mentioned magnets are energized. When there is no quotation at said group 578, the magnet 586 is not energized, the magnet 698 is energized, the magnet 613 is not energized, and the magnet 682 is not energized. When there is an attempt to post a higher digit at said group 578, the magnet 586 is not energized, the magnet 698 is energized, the magnet 613 is not energized, and the magnet 682 is energized.

The magnet 613 is connected in circuit between the lead wires 219 and 214 through a lead wire 609, the magnets 302 of the group 578, the lead wire 610 and the magnet 611, or the lead wire 691, the lead wire 612, said magnet 613, the lead wire 614, the contacts 605 and 606, the lead wire 615, the lead wire 588, the contacts 700 and 699, the lead wire 695, and the lead wire 696. A branch circuit extends from the lead wire 588 through the contacts 589 and 590, the lead wire 591, the contacts 592 and 593, the lead wire 594, the contacts 595 and 596, and the lead wire 597 to said lead wire 214. A holding circuit through said double winding magnet 613 extends between the lead wires 130 and 214 through the lead wire 692, the contacts 459 and 458, the lead wire 693, the lead wire 697, said magnet 613, a lead wire 706, the contacts 678 and 677, and a lead wire 707.

A circuit is traced through the double winding magnet 682 from the lead wire 331 to the lead wire 214, through a lead wire 708, said magnet 682, a lead wire 709, the contacts 676 and 677, and the lead wire 707. A holding circuit through said magnet 682 extends between the lead wires 130 and 214 through the lead wire 692, the contacts 459 and 458, the lead wire 693, the lead wire 697, a lead wire 710, said magnet 682, a lead wire 711, the contacts 686 and 685, a lead wire 712 and the lead wire 707.

The lead wire 594, in all of the circuits LL, MM, NN, OO, PP, and QQ, is also connected to the lead wire 214 through a lead wire 713, the lead wire 603, the contacts 684 and 685 in the group 580, a lead wire 714, the contacts 684 and 685 in the group 579, a lead wire 715, the contacts 684 and 685 in the group 578, the lead wire 712, and the lead wire 707.

It will be evident from Fig. 3b and from the description as made, that when a digit is posted or repeated at the group 578, the contacts 678 and 679 will be engaged, so that quotations can be later made in the groups 579, 580 and 581. It will also be evident that when there is no posting to be done in said group 578, the appropriate and proper contacts of the unit of Fig. 24 will also be in engagement so that quotations can be later made in said groups 579, 580 and 581. But that when there is a failure to post a digit in said group 578 because said digit is of higher value, the appropriate and proper contacts of said unit of Fig. 24 will be disengaged so that the possibility of making quotations in said later groups will be precluded. Also by the arrangement as illustrated and described, once the group 578 is passed when a quotation is not made therein, no further quotation, which would of necessity be a quotation of higher value, can be made in said group 578, as will be obvious from the disclosure and description given.

Each of the groups 579 and 580 of magnets includes units such as in Figs. 24 and 25 which may be the equivalents of the units as described in connection with the group 578, and said units of said groups 579 and 580 are applied to the groups 579 and 580 in about the manner as already described and with approximately similar results which it is believed need not herein be repeated in connection with said groups 579 and 580.

When the magnet 584 is energized to cause the corresponding contacts 604, 605 and 606 to be engaged, an additional circuit, designated RR, is made, said circuit being traced from the battery 129 through the lead wires 179, 196 and 130 to the corresponding contact 127, thence to the corresponding contact 128 and through a fractions lead wire 451 and one of lead wires 716 to the corresponding magnet 302 of the group 581, thence through a lead wire 717 to the magnet 642, thence through a lead wire 718 to the magnet 669, thence through a lead wire 719 to a magnet 720, thence through a lead wire 721 to the lead wire 597, and thence back to the battery over the same route as the circuit NN. The magnet 631 is included in the circuit NN when closed, and upon energization of the magnet 669 the contacts 673 and 674 are brought into engagement. When said contacts 673 and 674 engage, a circuit designated SS, is made through the posting magnet 305 of the group 581, said circuit being traced from the battery 129 through the lead wire 179 to the contacts 205 and 207, thence through the lead wire 210 to said magnet 305 of the group 581, thence through a lead wire 722 to the contact 674, thence through the contact 673 and a lead wire 723 to the lead wire 721, and back to the battery over the same route as the circuit RR.

The magnet 655 is connected across the lead wires 721 and 602 by means of lead wires 724 and 725, the former extending from the lead wire 721 to said magnet 655, and the latter extending from said magnet 655 to the lead wire 602. Consequently, when the circuit NN is closed and the fractions wire 346 is entered, the magnet 655 is energized. Assuming the parts of the unit including the magnets 631 and 655 are in their normal positions as in Fig. 3b, energization of the magnet 655 will cause the free end portion of the arm 637 to engage the end of the lever adjacent said arm, said lever engaging said arm at the side of the shoulder thereon opposite the axis of the armature 656. When then the circuit NN having the magnet 631 is energized, this magnet attracts its armature 659 to position said lever back of said shoulder, as shown in Fig. 30. The magnet 631 will remain energized until the circuit NN is broken. At this time the appropriate coil spring will act to remove the armature 659 away from the magnet 631 to thus swing the lever about the shoulder as an axis to cause the contacts 653 and 654 to engage. When said contacts 653 and 654 are in engagement, said magnet 305 of the group 581 is connected across the lead wires 210 and 214 through a lead wire 726 attached to the lead wire 722, said contacts 653 and 654, and a lead wire 727 extending from the contact 654 to said lead wire 214.

In order that the posting magnet 305 of each of the groups 578, 579 and 580 may operate only when this is intentional, each of the lead wires 612, 621, and 630 is provided with a magnet 728, and each of the lead wires 636, 637 and 638 is provided with a switch including a movable contact 729, said movable contacts 729 constituting armatures for the magnets 728, respectively, of the different lead wires 612, 621 and 630. In the instance of the group 581, the magnet 669 and the contacts 673 and 674 function in the same manner and for the same purpose as do the magnets 728 and their contacts. That is to say, the posting magnet 305 of each group 578, 579, 580 and 581 must only be actuated when a quotation is to be made or repeated at a magnet 302 of the corresponding group, with the exception that the magnet 305 of each of said groups is sometimes actuated, in a manner to be set forth, when no quotation is to be made or repeated at the magnet 302 in the group 581, or when a quotation is to be destroyed at a magnet 302 in the groups 578, 579 and 580, to take care of special conditions in the apparatus. Otherwise, each magnet 305 of the different groups 578, 579, 580 and 581 would, when no quotation was to be made at a group, return the corresponding composite character 303 to zero position. It will be evident that energization of each of the magnets 728 and 669 is only accomplished when a quotation is made or repeated in the corresponding group of magnets.

The unit having the magnets 631 and 655 is returned to its normal position in precisely the same manner as is the unit of Fig. 30, all fully explained in connection with the disclosure of Fig. 3a. When the corresponding circuits having the magnets 620, 629, and 642 are made, each armature, such as 522, is attracted, to release the corresponding armature, such as 519, and to allow the corresponding contacts, such as 517 and 518, to become disengaged. When later, the armatures, such as 522, are released, these assume the position as in Figs. 3b and 27, by reason of the action of the coil springs, such as 523.

A minimum quotation may not include a "fractions" digit, and the apparatus cares for such condition. When the circuit through the magnet 584 was made to thus make the circuit NN, including the magnets 302 of the group 580 and the magnet 631, the parts of the unit having said magnet 631 were positioned as in Fig. 30, and when said circuit NN is broken, the circuit through said magnet 631 is also broken to cause the contact 653 to engage the contact 654 in the manner as already set forth. Thus the posting magnet 305 of the fractions group 581, included in the circuit having the contacts 653 and 654, is energized to actuate its armature, which, in turn, causes the fractions zero to be posted on the "ticker board", for the reason that at this time no magnet 302 in said group 581 has been selected. The magnet 305 of the group 581 will operate under the present condition in precisely the manner as before described in connection with the magnet 305 of the group 456 of magnets. It will be understood that when no "fractions" digit is posted in the group 581, the contacts 673 and 674 will be disengaged, this being necessary to meet a condition in the apparatus as already described.

As will be apparent from Fig. 3b, whenever the contacts 653 and 654, or the contacts 673 and 674, are in engagement, there will be provided a connection across the lead wires 210 and 214 for the magnet 305 of any group 578, 579, or 580 in which attempt was not made to post a digit. Either the contacts 653 and 654, or the contacts 673 and 674, will be engaged at some time during the operation of the apparatus past the group 581, as has already been shown. Accordingly, the magnet 305 of any group 578, 579, or 580 which was not entered to post a digit will be energized when the apparatus is passing said group 581, to in turn actuate its armature to cause zero to be posted at the corresponding group 578, 579, or 580, or at a plurality of these groups, for the reason that at this time no magnet 302 in said groups, or one or more of said groups has been selected.

The magnet 720 is an element of a unit more clearly disclosed in Figs. 37 and 38. In addition to said magnet 720, said unit includes a fixed contact 730 and a movable contact 731 which are suitably insulatively mounted adjacent the magnet. An armature 732 for said magnet 720 has an angular extension 733 which is pivotally mounted at 734. A bell crank lever is pivoted to the angular extension 733 at 735 and includes an arm 736 which is parallel with the magnet 720 and an arm 737 which is perpendicular to said magnet. The arm 737 has an enlarged outer end portion providing a shoulder 738. A coil spring 739 attached to the armature 732 and to a fixed part urges said armature away from the magnet as in Fig. 37 when said magnet is deenergized. At this time, the enlarged outer end portion of the arm 735 bears against the outer end of the movable contact 731 at the side of the shoulder 738 opposite the pivot 735. Upon energization of the magnet 720, the parts assume the positions as in Fig. 38, the contact 731 being engaged back of the shoulder 738. Then upon deenergization of said magnet 720, the coil spring 739 acts to rotate the angular extension 733 upon its axis to thus cause the arm 737 to disengage the contacts 730 and 731 and to then release said contact 731 from the shoulder 738, to allow the parts to be positioned as in said Fig. 37. The magnet 720 is energized when there is a quotation impulse at the magnets 302 of the group 581, and said magnet 720 is deenergized at the completion of the quotation impulse at the magnets 302 of said group 581. It may be desired to remain at a selected stock to repeat a quotation before passing to the selection of a new stock. The contacts 730 and 731 are in the holding circuit for the double winding magnet 643 of the units group 580. Upon energization and deenergization of said magnet 720, to cause the contacts 730 and 731 to be temporarily disengaged, said mentioned holding circuit is, obviously, broken, and a digit of lower value can be viously posted at the group 580. Thereafter, a fraction of higher or lower value can be posted at the group 581. Were attempt made to post a digit of higher value at the group 580, such attempt would fail, because the magnets 631 and 669 would not be energized and the contacts 653, 654 and 673, 674 would not be engaged. Should it be desired to post a digit of lower value in the fractions group 581 only while the holding circuit through the magnet 643 is broken, such a posting would, of course, place the composite character at the group 580 at zero, as will be understood. It should be noted that the unit of Figs. 37 and 38 may ordinarily perform no function in the apparatus as disclosed, but said unit and its mode of operation have been included herein merely to make plain that it is possible in the apparatus to post a plurality of separate and succeeding quotations, either maximum or minimum, at a selected stock upon a single entry to the unit having said stock.

In Fig. 3b we have disclosed a switch button 740 attached to a lead wire adjacent the magnet 305 of each of the groups 578, 579, 580 and 581 for extinguishing the letter, number, or character upon each composite character 303, as at the close or beginning of a day's stock market quotations. Upon depression of a switch button 740, a circuit is closed through the magnet 305 of the corresponding group, and the armature of said magnet causes zero to be posted at the corresponding composite character on the "ticker board", for the reason that at this time no magnet in any group 578, 579, 580, or 581 has been selected. Upon return of each switch button 740 to normal position, the circuit through the corresponding magnet 305 is broken, and the apparatus is ready to start a day's operations. Obviously, a single switch button, such as 740, could be employed to simultaneously operate the magnets 305 of all of the groups 578, 579, 580 and 581 in the manner as just stated, provided there is included no interconnection between lead wires of the magnets 305 of the different groups of magnets.

It will be apparent that in the present apparatus, printing can be accomplished in any selected stock after its tumbler 134 has dropped and before the digits selector is placed into operation. That is to say, any preferred letters, figures, numbers, or other characters, can be posted in a stock after said stock has been selected and before the digits selector is caused to start to operate in the manner as hereinbefore fully described.

It will also be apparent that the number of the selecting keys 19 can be increased to provide any additional and preferred number of sending combinations at the instrument of Fig. 1 so that any desired number of different letters, figures, numbers, or characters can be transmitted. With an increase of letters, figures, numbers, or characters transmitted at the sending instrument, the number of keys 15 would, naturally, also be increased to a corresponding extent.

In Figs. 56 and 57 we have disclosed a composite character having the general outlines of the composite character of Fig. 49, but which is actuated in the general manner as disclosed in Figs. 39 to 42. More specifically, the composite character 741 of Figs. 56 and 57 consists of a plurality of separate pieces 742 each of the same shape as a separately lighted part in Fig. 49, but instead of being lighted, each piece 742 is carried by a rod 743. The rods 743 pass through openings in a plate 744. Each plate 744 is arranged on the rods 743 transversely thereof and is capable of being separately actuated in direction toward the pieces 742 to distend its own particular combination of rods to provide a letter, figure, number, or other character, there being as many plates 744 along the rods as there are characters to be printed. The rods 743 are freely slidable in the plates, with the exception that rods which are to be manipulated by a plate to provide its print character are equipped with fixed collars, designated 745, which are engaged by said plate when moved toward said pieces 742. That is to say, each plate 744 upon being actuated, toward the right in Figs. 56 and 57, carries with it a combination of rods 743 to distend a combination of pieces 742 by engagement of a collar fixed upon each rod of said combination at position adjacent to or contiguous with said mentioned plate. Coil springs 746 upon said rods and between the heads 747 of the rods and a support 748 for said rods hold the unactuated rods in receded position, no matter what combination of rods is distended, and the rods of a distended combination return to receded position upon release of the corresponding plate 744. In said Fig. 56 we have shown a magnet 302 with associated parts similar to the parts shown in Fig. 49 and including a yoke 749 similar to the yoke 318 upon a shaft 750 which carries a cam element 751 which is more or less similar to the cam elements 319. Upon actuation of the yoke 749, the shaft 750 and the cam 751 in the manner as will be understood from the description already given, the corresponding plate 744 will be actuated in the fashion as stated to distend its corresponding pieces 742. Said pieces 742 will remain distended until said yoke 749 is actuated, as described in connection with Fig. 49, to release said plate 744. It is to be understood that there is a separate magnet 302 with associated parts, including the elements 749, 750 and 751, for each plate 744. It is also to be understood that each magnet 302 as in Fig. 56 will have associated therewith a unit as disclosed in Figs. 22 and 50.

In Figs. 58, 59 and 60 we have disclosed a device similar to the device of Figs. 56 and 57 and including a unit simlar to the one of Figs. 22 and 50. The disclosure of said Figs. 58, 59 and 60 is about the same as the disclosure of said Figs. 56 and 57, but in Figs. 58, 59 and 60 we have shown pieces 742 which are adapted to print upon a supported and fed tape 752. The printing in said Figs. 58 to 60 is accomplished by engagement of the pieces 742 against the back of the tape 752 to force the opposite face of said tape against an inked ribbon to thus cause a distended character to be placed upon said opposite face of said tape. In the disclosure of Figs. 58 to 60 there is employed a modified type of cam 753, instead of cams such as 751, constructed to allow distended pieces 742 which print a character to return to receded position immediately after said character is printed, as will be understood. To this end, L-pieces such as 754, are substituted for the yokes such as 749 in Fig. 55. Said L-pieces 754, obviously, return to the normal position as shown in said Fig. 58 after each printing operation. The arm of a yoke such as 749 in Fig. 56 which is struck to return the cam such as 751 to normal position is evidently not required in the disclosure as in Figs. 58 and 59, the L-pieces such as 754 being all that is necessary.

In Figs. 61 to 66 we have shown a composite character 755 consisting of separate pieces 756 having sharp line printing edges 757. Said pieces 756 are supported by rods 758 which may be the equivalents of the rods 743 and similarly mounted. In Fig. 62 we have shown a composite character 759 which resulted from simultaneously printing all of the pieces 756, and in Fig. 64 we have shown a single character 760, which is the number 8, printed by said composite character. It will be understood that the composite character 755 is constructed to be capable of printing a great many different letters, figures, numbers, and characters.

What we claim is:

1. In a system for posting quotations in regard to stocks or other items, a transmitter for transmitting quotations comprising item selection and price signals, a quotation receiver, a communication circuit interconnecting said transmitter and receiver, said receiver comprising a quotation display board including a plurality of groups of indicators, each of said groups corresponding to one of the stocks or items to be posted and comprising indicators for posting the high and low prices of the item, means in said receiver responsive to said item selection signals for selecting the group of indicators corresponding to the item concerning which a quotation is to be posted, settable means responsive to said price signals and operable thereby to different settings in accordance with the numerical value of the price signals received, and circuit connections including electrical relay comparing means in the receiver operatively associated with said settable means for automatically comparing the instant price set up on said settable means with the high and low prices previously set up on the high and low indicators of the selected item, and means controlled by said relay comparing means for actuating said high or low indicators when the instant price is a new high or a new low quotation.

2. In a system for posting quotations in regard to stocks or other items, a transmitter for transmitting quotations comprising item selection and price signals, a quotation receiver, a communication circuit interconnecting said transmitter and receiver, said receiver comprising a quotation display board including a plurality of groups of posting devices, each of said groups corresponding to one of the stocks or items to be posted and comprising a plurality of means respectively for posting the high, low and last prices of the item, means in said receiver responsive to said item selection signals for selecting the group of posting devices corresponding to the item concerning which a quotation is to be posted, settable means responsive to said price signals and operable thereby to different settings in accordance with the numerical value of the price signals received, means responsive to said price signals for actuating the means for posting the last price of the item, circuit connections including electrical relay comparing means in the receiver operatively associated with said settable means for automatically comparing the instant price set up in said settable means with the high and low prices previously posted by the high and low posting means of the selected item, and means controlled by said relay comparing means for actuating said high or low posting means when the instant price is a new high or a new low quotation.

3. In a system for posting market quotations in regard to stocks or other items, a transmitter for transmitting quotations comprising item selection and price signals, a quotation receiver, a communication circuit interconnecting said transmitter and receiver, said receiver comprising a quotation board including a plurality of groups of posting devices, each of said groups corresponding to one of the stocks or items to be posted and comprising a plurality of means respectively for posting the high, low, and for successive last prices of the item, said means for posting the successive last prices including means for causing a plurality of said successive last prices to be displayed concurrently thereby to indicate the trend of the market, means in said receiver responsive to said item selection signals for selecting the group of posting devices corresponding to the item concerning which a quotation is to be posted, settable means responsive to said price signals and operable thereby to different settings in accordance with the numerical value of the price signals received, means including said settable means responsive to said price signals for actuating the last posting means to indicate the trend of the market, comparing means operatively associated with said settable means for automatically comparing the instant price set up in said settable means with the high and low prices previously posted by the high and low posting means of the selected item, and means controlled by said comparing means for actuating said high or low posting means when the last price is a new high or a new low quotation.

4. In a system for posting market quotations in regard to stocks or other items, a transmitter for transmitting quotations comprising item selection and price signals, a quotation receiver, a communication circuit interconnecting said transmitter and receiver, said receiver comprising a quotation board including a plurality of groups of posting devices, each of said groups corresponding to one of the stocks or items to be posted and comprising a plurality of means respectively for posting the high and low prices and for printing the successive last prices of the item to indicate the trend of the market, means in said receiver responsive to said item selection signals for selecting the group of posting devices corresponding to the item concerning which a quotation is to be posted, settable means responsive to said price signals and operable thereby to different settings in accordance with the numerical value of the price signals received, means including said settable means responsive to said price signals for actuating said printing means to indicate the trend of the market, comparing means operatively associated with said settable means for automatically comparing the instant price set up in said settable means with the high and low prices previously posted by the high and low posting means of the selected item, and means controlled by said comparing means for actuating said high or low posting means when the last price is a new high or a new low quotation.

5. In a system for posting quotations in regard to stocks or other items, a transmitter for transmitting quotations comprising item selection and price signals, a quotation receiver, a communication circuit interconnecting said transmitter and receiver, said receiver comprising a plurality of groups of quotation display devices, each of said groups corresponding to one of the stocks or items to be posted and comprising indicators for posting the high and low prices and means for printing the successive last prices of the item to indicate the trend of the market, means in said receiver responsive to said item selection signals for selecting the group of display devices corresponding to the item concerning which a quotation is to be posted, settable means responsive to said price signals and operable thereby to different settings in accordance with the numerical value of the price signals received, means including said settable means responsive to said price signals for actuating said printing means to indicate the trend of the market, comparing means operatively associated with said settable means for automatically comparing the instant price set up in said settable means with the high and low prices previously displayed by the high and low groups of indicators, and means controlled by said comparing means for actuating the high or low indicators when the instant price is a new high or a new low quotation.

6. In a system for posting quotations in regard to stocks or other items, a transmitter for transmitting quotations comprising item selection and price signals, a quotation receiver, a communication circuit interconnecting said transmitter and receiver, said receiver comprising a plurality of groups of quotation posting devices, each of said groups corresponding to one of the stocks or items to be posted and comprising indicators for posting the high and low prices and means for posting a plurality of successive last prices of the item, and for causing said plurality of successive last prices to be displayed concurrently thereby to indicate the trend of the market, means in said receiver responsive to said item selection signals for selecting the group of posting devices corresponding to the item concerning which a quotation is to be posted, settable means responsive to said price signals and operable thereby to different settings in accordance with the numerical value of the price signals received, means including said settable means responsive to said price signals for actuating said posting means to indicate the trend of the market, comparing means in said receiver operatively associated with said settable means for automatically comparing the instant price set up in said settable means with the high and low prices previously posted on the high and low groups of indicators, and means controlled by said comparing means for actuating the high or low indicators when the instant price is a new high or a new low quotation.

7. In a system for posting quotations of stocks or other items, a source of electrical signals comprising item selection and price signals, a receiving mechanism having a plurality of groups of posting devices, each of said groups corresponding to one of the items to be posted, the posting devices of each group being settable in accordance with the high, low and last values of the corresponding item, means responsive to said selection signals for completing a circuit to a selected group of posting devices, means responsive to said price signals for actuating the device for posting the last value of the item, and comparing means comprising groups of electrical circuit controlling members connected in series chain relationship and responsive to said price signals for controlling the settings of the high and low posting devices depending upon the last value of the item.

8. In a receiving and posting mechanism comprising a plurality of groups of devices for posting information in regard to stocks or other items, means included in each of said groups of devices for posting the digits of a number representative of said information concerning one of said items, a source of signals including item selection and posting signals, means responsive to said signals for selecting one of said groups of posting devices and for causing one of the devices of the selected group to post the digits of a number transmitted by said posting signals, means including a plurality of relays controlled by said posting signals and having contact elements for controlling circuits in accordance with the value of the number transmitted for comparing the number posted on said one of the devices with the number posted on another of the devices of the selected group, and means for causing said another of the posting devices to post the number last posted on said one of the devices when said number is numerically greater than the number previously posted on said another of the devices.

9. In a receiving and posting mechanism comprising a plurality of groups of devices for posting information in regard to stocks or other items, means included in each of said groups of devices for posting the digits of a number representative of said information concerning one of said items, a source of signals including item selection and posting signals, means responsive to said signals for selecting one of said groups of posting devices and for causing one of the devices of the selected group to post the digits of a number transmitted by said posting signals, means including a plurality of relays controlled by said posting signals and having contact elements for controlling circuits in accordance with the value of the number transmitted for comparing the number posted on said one of the devices with the number posted on another of the devices of the selected group, and means for causing said another of the posting devices to post the number last posted on said one of the devices when said number is numerically less than the number previously posted on said another of the devices.

10. In a stock quotation system, a receiving board provided with an indicating mechanism for each stock posted thereon, each mechanism having low and last price posting means, storage means comprising electrical circuit controlling contact elements associated with the low price posting means and settable in accordance with a low price, a transmitter, selective means at said board comprising electrical circuit controlling contact elements controlled by said transmitter for storing impulses, in accordance with a predetermined quotation, to be utilized in setting the last price posting means of a particular indicating mechanism to display said quotation, price comparison means in said receiving board including circuits controlled by said contact elements for comparing the settings of said settable storage means and said selective means to determine whether said predetermined quotation is a new low, and additional selective means at said board under control of said price comparison means when said predetermined quotation is a new low to cause the low price posting means of the particular mechanism to post said predetermined quotation.

11. In a stock quotation system, a receiving board provided with an indicating mechanism for each stock posted thereon, each mechanism having high and last price posting means, storage means comprising electrical circuit controlling contact elements associated with the high price posting means and settable in accordance with a high price, a transmitter, selective means at said board comprising electrical circuit controlling contact elements controlled by said transmitter for storing impulses, in accordance with a predetermined quotation, to be utilized in setting the last price posting means of a particular indicating mechanism to display said quotation, price comparison means in said receiving board including circuits controlled by said contact elements for comparing the settings of said settable storage means and said selective means to determine whether said predetermined quotation is a new high, and additional selective means at said board under control of said price comparison means when said predetermined quotation is a new high to cause the high posting means of the particular mechanism to post said predetermined quotation.

12. In a stock quotation system, a receiving board provided with an indicating mechanism for each stock, each mechanism having high, low and last posting devices, means in said receiving board comprising electrical circuit controlling contact elements associated with the high posting device and settable in accordance with a high price and means in said receiver comprising electrical circuit controlling contact elements associated with the low posting device and settable in accordance with a low price, a transmitter, selective means at said board comprising electrical circuit controlling contact elements controlled by said transmitter for storing, in accordance with a predetermined price, impulses to be utilized in setting the last posting device of a particular indicating mechanism to display said price, price comparison means in said board including circuits controlled by said contact elements for comparing the settings of each of said high and low settable means with the impulses stored by said selective means to determine when said predetermined price is a new high and when said predetermined price is a new low, high posting device selection means and low posting device selection means at said board, said high posting device selection means being operable by said stored impulses under control of said price comparison means when said predetermined price is a new high to cause the high posting device of a particular mechanism to post said predetermined price, and said low posting device selection means being operated by said stored impulses under control of said price comparison means when said predetermined price is a new low to cause the low posting device of a particular mechanism to post said predetermined price.

13. In a stock quotation system, a receiving board provided with an indicating mechanism for each stock, each mechanism having groups of high and low indicators, each group comprising a plurality of said indicators for indicating the several orders of digits and the fractions of the price, and means for posting the last price, means in said receiving board comprising electrical circuit controlling contact elements associated with the group of high indicators and settable according to a high price and means in said board comprising electrical circuit controlling contact elements associated with the group of low indicators and settable according to the low price, a transmitter, selective means at the board comprising electrical circuit controlling contact elements controlled by said transmitter for storing, in accordance with a predetermined price, impulses to be utilized in setting the last price posting means of a particular indicating mechanism to post said price, price comparison means including circuits controlled by said contact elements for comparing the settings of each of the high and low settable means with the impulses stored by said price selective means, high and low indicator selection means for preparing the groups of high and low indicators, respectively, to post said predetermined price, and means whereby said price comparison means controls said high indicator selection means when the highest order of said predetermined price exceeds the corresponding order of the previous high price, and to control the low indicator selection means when the highest order of the predetermined price is lower than the corresponding order of the previous low price.

14. In a stock quotation system, a receiving board provided with an indicating mechanism for each stock, each mechanism having groups of high and low indicators, each group comprising a plurality of said indicators for indicating the several orders of digits and the fractions of the price, and means for posting the last price, means in said receiving board comprising electrical circuit controlling contact elements associated with the group of high indicators and settable according to a high price and means in said board comprising electrical circuit controlling contact elements associated with the group of low indicators and settable according to the low price, a transmitter, selective means at the board comprising electrical circuit controlling contact elements controlled by said transmitter for storing, in accordance with a predetermined price, impulses to be utilized in setting the last price posting means of a particular indicating mechanism to post said price, price comparison means including circuits controlled by said contact elements for comparing the settings of each of the high and low settable means with the impulses stored by said price selective means, high and low indicator selection means for preparing the groups of high and low indicators, respectively, to post said predetermined price, and means whereby said price comparison means controls said high indicator selection means when the highest order of said predetermined price exceeds the corresponding order of the previous high price, and to control the low indicator selection means when the highest order of the predetermined price is lower than the corresponding order of the previous low price, and circuit means for rendering the remainder of said predetermined price stored by said price selective means ineffective to control the price comparison means.

15. In a system for posting information in regard to a plurality of items, a transmitter for transmitting information comprising item selection and price signals, a plurality of receiving stations, communication circuit means interconnecting said transmitter and said receiving stations, said receiving stations comprising groups of devices corresponding to the various items for posting the high, low and the successive last prices of the items, each of said devices for posting the successive last prices of one of the items including means for causing a plurality of successive last prices of the item to be displayed concurrently, thereby to indicate the trend of the market, means responsive to said item selection signals for selecting the posting devices corresponding to the items concerning which information is to be posted, settable means responsive to said price signals and operable thereby to different settings in accordance with the numerical values of the price signals received, means including said settable means responsive to said price signals for actuating the devices for posting the successive last prices of the items, comparing means operatively associated with said settable means for automatically comparing the instant prices of the items set up in said settable means with the high and low prices previously posted by the high and low posting means, and means controlled by said comparing means for actuating said high or low posting means when the last prices are new high or new low prices.

16. In a system for posting information in regard to a plurality of items, a transmitter for transmitting information comprising item selection and price signals, a plurality of receiving stations, communication circuit means interconnecting said transmitter and said receiving stations, said receiving stations comprising groups of devices corresponding to the various items for posting the high and low prices and for printing the successive last prices of the items to indicate the trend of the market, means responsive to said item selection signals for selecting the posting and printing devices corresponding to the items concerning which information is to be posted, settable means responsive to said price signals and operable thereby to different settings in accordance with the numerical values of the price signals received, means including said settable means responsive to said price signals for actuating the devices for printing the successive last prices of the items, comparing means operatively associated with said settable means for automatically comparing the instant prices of the items set up in said settable means with the high and low prices previously posted by the high and low posting means, and means controlled by said comparing means for actuating said high or low posting means when the last prices are new high or new low prices.

17. The combination with mechanism for successively transmitting different sets of impulses, each set consisting of positive and negative impulses and different sets corresponding to the designation of items and information as to said items, and separate mechanisms for posting different ones of said items, of mechanism responsive in step-by-step manner to sets of positive and negative impulses successively emanating from said transmitting mechanism and corresponding to the designation parts of said different sets for selecting a posting mechanism corresponding to a particular item and for operating the selected posting mechanism in accordance with the information part of said different sets, said selecting mechanism including a circuit closing member for each posting mechanism to be selected, each circuit closing member having an arm for each character of the designation part of an item to which said member corresponds, a group of slotted selecting members associated with each of said arms, electromagnets for operating said selecting members, a device operated in synchronism with said transmitting mechanism to energize one of said electromagnets to actuate a selecting member in each of the plurality of groups of selecting members to first align a slot in the selecting member with each arm of a circuit closing member and to then allow the latter member to move into circuit closing position, and mechanism for causing one of said posting mechanisms to be in electrical connection with said transmitting mechanism when said circuit closing member moves into circuit closing position.

18. The combination with mechanism for successively transmitting different sets of impulses, each set consisting of positive and negative impulses and different sets corresponding to the designation of items and information as to said items, and separate mechanisms for posting different ones of said items, of mechanism responsive in step-by-step manner to sets of positive and negative impulses successively emanating from said transmitting mechanism and corresponding to the designation parts of said different sets for selecting a posting mechanism corresponding to a particular item and for operating the selected posting mechanism in accordance with the information part of said different sets, said selecting mechanism including a tumbler for each posting mechanism to be selected, each tumbler having an arm for each character of the designation part of an item to which said tumbler corresponds, a group of keys under each of said arms, a magnet for each key, a device operated in synchronism with said transmitting mechanism to successively and temporarily energize a magnet to actuate a key in each of the plurality of said groups of keys to first align a slot in a key with each arm of a tumbler and to then allow said tumbler to drop, and mechanism for causing one of said posting mechanisms to be in electrical connection with said transmitting mechanism when said tumbler drops.

LOUIS L. RUSTAD.
VICTOR E. EXTROM.